(12) United States Patent
De Gaudenzi et al.

(10) Patent No.: US 12,155,436 B2
(45) Date of Patent: Nov. 26, 2024

(54) PRAGMATIC SOLUTIONS FOR MASSIVE MIMO FOR BROADBAND TELECOMMUNICATION SYSTEMS

(71) Applicant: EUROPEAN SPACE AGENCY, Paris (FR)

(72) Inventors: Riccardo De Gaudenzi, Noordwijk (NL); Piero Angeletti, Noordwijk (NL)

(73) Assignee: EUROPEAN SPACE AGENCY, Paris (FR)

( * ) Notice: Subject to any disclaimer, the term of this patent is extended or adjusted under 35 U.S.C. 154(b) by 13 days.

(21) Appl. No.: 18/011,100

(22) PCT Filed: Jun. 17, 2020

(86) PCT No.: PCT/EP2020/066730
§ 371 (c)(1),
(2) Date: Dec. 16, 2022

(87) PCT Pub. No.: WO2021/254607
PCT Pub. Date: Dec. 23, 2021

(65) Prior Publication Data
US 2023/0261710 A1    Aug. 17, 2023

(51) Int. Cl.
*H04L 5/12* (2006.01)
*H04B 7/0452* (2017.01)
(Continued)

(52) U.S. Cl.
CPC ......... *H04B 7/0617* (2013.01); *H04B 7/0452* (2013.01); *H04B 7/18513* (2013.01); *H04B 7/18539* (2013.01)

(58) Field of Classification Search
CPC ............... H04B 7/0617; H04B 7/0452; H04B 7/18513; H04B 7/18539
(Continued)

(56) References Cited

U.S. PATENT DOCUMENTS

2019/0053286 A1\*  2/2019  Cho .................. H04B 7/04
2019/0207672 A1   7/2019  Arora et al.

FOREIGN PATENT DOCUMENTS

EP     2958249 A1    12/2015
EP     3266117 A1    1/2018

OTHER PUBLICATIONS

Patent Cooperation Treaty, International Search Report and Written Opinion, Application No. PCT/EP2020/066730, dated Mar. 2, 2021, in 40 pages.

\* cited by examiner

*Primary Examiner* — Zewdu A Kassa
(74) *Attorney, Agent, or Firm* — Procopio, Cory, Hargreaves & Savitch LLP

(57) ABSTRACT

This application relates to a method of performing wireless communications between a hub station and a plurality of user terminals. The method comprises transmitting radio signals to subsets of user terminals among the plurality of user terminals with sets of active beams, wherein the active beams have beam centers that are determined based on locations of the user terminals. The method further comprises, for each of a plurality of radio resource blocks: selecting a subset of user terminals among the plurality of user terminals; for each user terminal among the subset of user terminals, determining a beam center based on a location of the respective user terminal; and transmitting, using the respective radio resource block, radio signals to the user terminals among the selected subset of user terminals, in beams corresponding to the determined beam centers. The method further relates to a corresponding hub station for performing wireless communications with a plurality of user terminals, and to a method of determining antenna parameters and a beam pattern for a hub station.

18 Claims, 34 Drawing Sheets

(51) Int. Cl.
*H04B 7/06* (2006.01)
*H04B 7/185* (2006.01)

(58) Field of Classification Search
USPC ........ 375/262, 261, 260, 259, 219, 295, 316
See application file for complete search history.

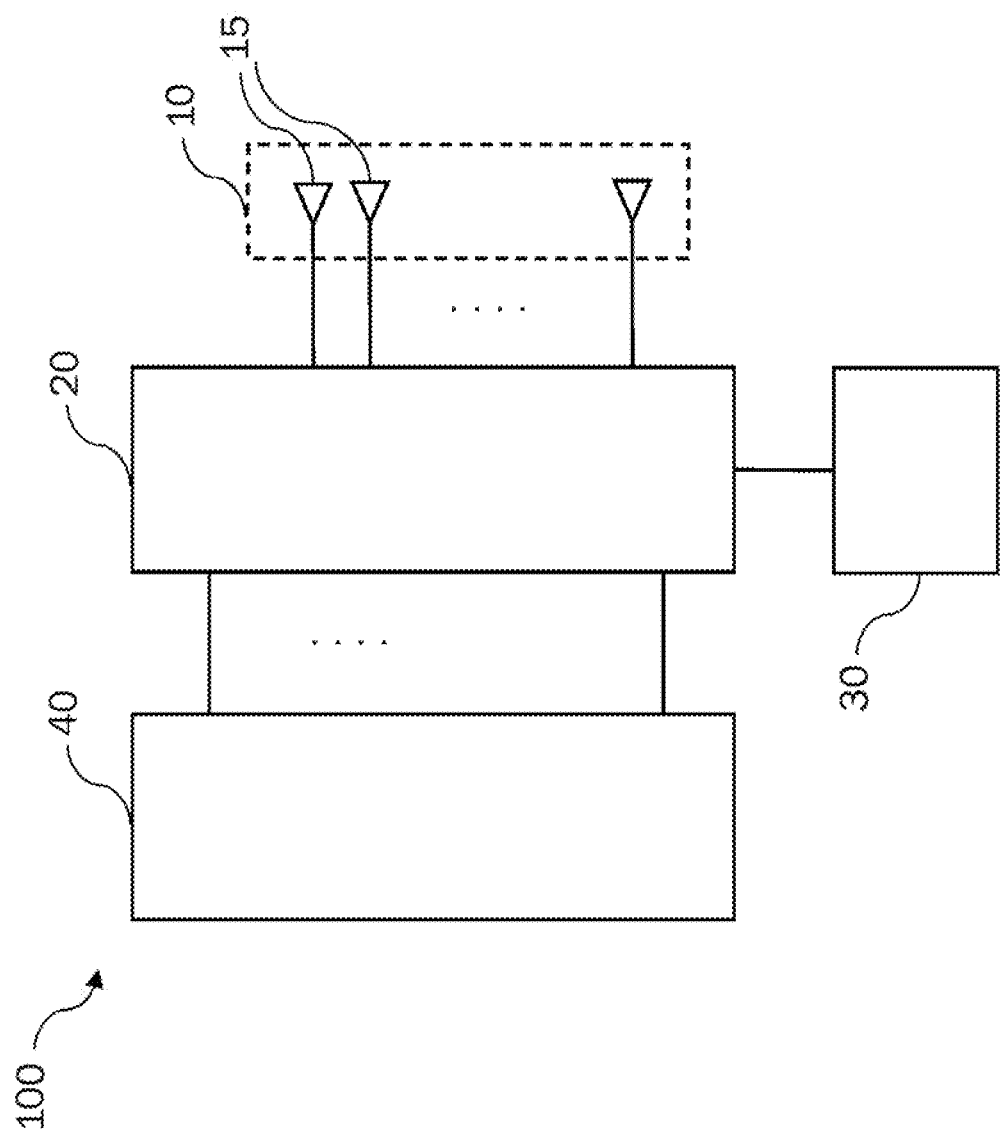

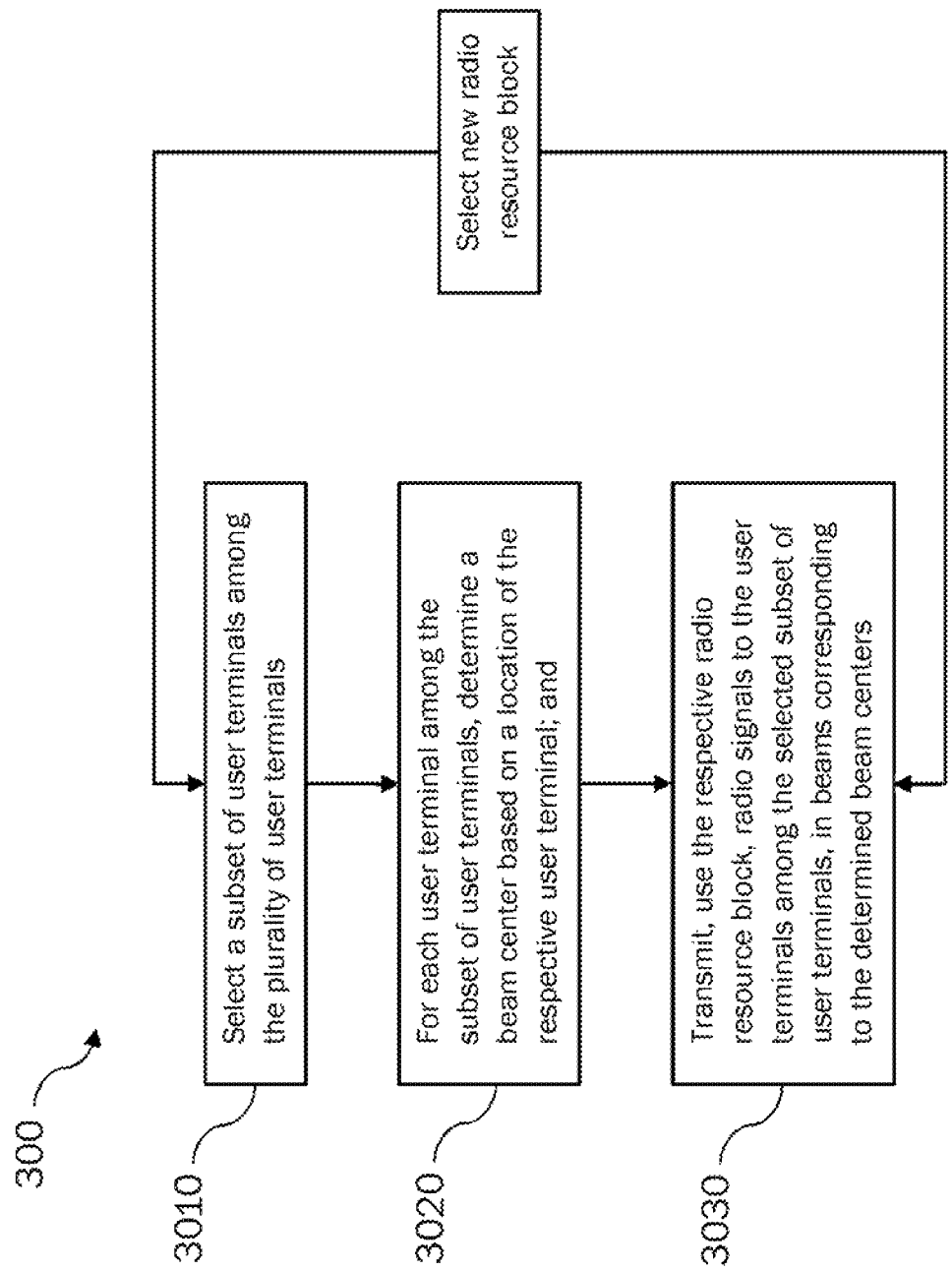

PRAGMATIC SOLUTIONS FOR MASSIVE MIMO FOR BROADBAND TELECOMMUNICATION SYSTEMS

CROSS-REFERENCE TO RELATED APPLICATIONS

This application is US National Stage of International Patent Application PCT/EP2020/066730, filed Jun. 17, 2020, the contents of both of which are incorporated herein by reference.

TECHNICAL FIELD

This application relates to methods of performing wireless communications. In particular, the application relates to practical techniques for implementing solutions approaching the Massive Multiple-Input Multiple-Output (Massive MIMO, or M-MIMO) performance with much lower complexity in telecommunication broadband access networks. Such networks are using line of sight telecommunication between the user terminals and a multitude of ground-based cells generated by (terrestrial) base stations or beams generated by satellites connected to terrestrial hub stations. The base/hub stations are linking the user terminals to the terrestrial networks. The application further relates to corresponding apparatus for performing wireless communications.

BACKGROUND

Recent years have witnessed a strong impulse in adopting M-MIMO in wireless networks. Despite the wide research related to M-MIMO for terrestrial networks, much less attention has been devoted to its possible exploitation in the forward link of satellite systems.

So far the satellite communication research has been largely focused on the applicability of MIMO precoding techniques to current satellite payloads characterized by single feed per beam architectures. In particular, satellite-specific issues like multicasting, multiple gateways, channel estimation have been reported in the literature. The fact that current satellite forward link standards like DVB-S2X (ETSI EN 302 307-2 V1.1.1 (2014-10) Digital Video Broadcasting (DVB); Second generation framing structure, channel coding and modulation systems for Broadcasting, Interactive Services, News Gathering and other broadband satellite applications; Part 2: DVB-S2 Extensions (DVB-S2X)) require multiplexing packets belonging to different users in the same physical layer frame has an important impact on precoding performance due to the "multicasting" effect.

Another issue is related to the fact that high throughput broadband satellite networks need a large number of user beams that are mapped in the feeder link on a number of spatially separated gateways. Due to satellite payload complexity limitations, precoding is assumed to be implemented at the gateway. Consequently, each gateway will only be able to precode the assigned subset of users' beams. Thus precoding from separated gateways turns out to be less effective in mitigating co-channel interference. In addition, precoding requires keeping the satellite payload beam chains controlled in relative phase and amplitude. This makes the payload implementation more complex compared to conventional systems.

Another satellite-specific effect is related to the delay in channel reports due to the intrinsic propagation delay which is particularly large for geostationary satellites. Furthermore, for satellites in non-geostationary orbit (e.g., mega-constellations) the fast orbit dynamic makes the adoption of conventional precoding techniques even more challenging.

Thus, there is a need for improved techniques for adopting M-MIMO in communication networks, such as broadband satellite networks. There is particular need for such techniques that improve throughput/capacity and/or that may be implemented also under footprint and mass constraints. There is yet further need for methods of designing antenna arrays suitable for M-MIMO in communication networks.

SUMMARY

In view of some or all of these needs, the present disclosure proposes a method of performing wireless communications between a hub station and a plurality of user terminals and a hub station for performing wireless communications with a plurality of user terminals, having the features of the respective independent claims. Examples of such methods are termed pragmatic M-MIMO (Multi Beam (MB) M-MIMO) or optimized Color Frequency Reuse (CFR), i.e., CFR++.

An aspect of the disclosure relates to a method of performing wireless communications between a hub station (communication node) and a plurality of user terminals. Communication may be in the forward link, for example, since this case is typically more critical in terms of required throughput. The hub station may be a gateway linked to a satellite by a feeder link (e.g., radio frequency or optical) or a terrestrial (ground-based) base station, for example. The hub station may also be a (communication) satellite. The user terminals may be terrestrial (ground-based) terminals. Wireless communications using the proposed techniques may best relate to line-of-sight communications. The method may include transmitting radio signals to subsets of user terminals among the plurality of user terminals with sets of active beams (i.e., using sets of active beams). Therein, the active beams may have beam centers that are determined based on (geometric/geographical) locations of the user terminals. The method may further include, for each of a plurality of radio resource blocks, selecting a subset of user terminals among the plurality of user terminals. For example, the radio resource blocks may be either time slots, frequency slots, pseudo-random spreading sequences, polarization modes, or combinations thereof. The selected subset of terminals may consist of the user terminals to be served using the current radio resource block. The method may further include, for each user terminal among the selected subset of user terminals, determining a beam center based on a location of the respective user terminal. The locations of the user terminals may be geometric (or equivalently, geographical) locations.

Determining a beam center based on the location of a user terminal may involve determining a beam center, possibly from a predefined set of beam centers, that is close (e.g., closest) to the location of the user terminal. The method may yet further include transmitting, using the respective radio resource block, radio signals to the user terminals among the selected subset of user terminals, in beams corresponding to the determined beam centers.

The proposed method allows to approach optimum M-MIMO performance with affordable system and payload complexity, without requiring users' feedback (except for a raw estimate of their geographical location). In particular, the selection of subsets of user terminals and the determination of beams based on their respective locations can significantly reduce co-channel interference effects in a simple and efficient manner. Thus, configured as described above, the proposed method allows to achieve quasi optimum throughput performance at acceptable system complexity, employing a simplified beamforming scheme.

In some embodiments, the method may further include switching between different sets of active beams from one radio resource block to another, in accordance with subsets of user terminals selected for respective radio resource blocks.

Thereby, different sets of user terminals can be contemporarily served, while minimizing co-channel interference effects between the selected user terminals.

In some embodiments, the method may further include generating the beams among a set of active beams by means of beamforming, using an active antenna array. Therein, the active antenna array may include a plurality of antenna elements. Further, the antenna elements of the active antenna array may be driven in accordance with a mapping matrix that maps signals intended for user terminals among the selected subset of user terminals to signals for transmission by respective antenna elements. The antenna elements may be independently controllable (drivable). The mapping matrix may also be referred to as a beamforming matrix or precoding matrix.

In some embodiments, the mapping matrix for mapping the signals intended for the selected subset of user terminals to the signals for transmission by respective antenna elements may have dimension (size) ($N_T \times N_U$) and may include one complex coefficient entry per pair of a given user terminal and a given antenna element. Here, $N_T$ indicates the number of antenna elements and $N_U$ indicates the number of user terminals in the selected subset of user terminals. Further, the coefficient entries of the mapping matrix may include phase factors that are based on locations of the antenna elements and the locations of the user terminals with respect to the hub station.

Thereby, the mapping matrix can be constructed in a particularly simple manner, without requiring feedback from the user terminals (apart from a rough estimate of their locations).

In some embodiments, the mapping matrix for mapping the signals intended for the selected subset of user terminals to the signals for transmission by respective antenna elements may have dimension ($N_T \times N_U$), where $N_T$ indicates the number of antenna elements and $N_U$ indicates the number of user terminals in the selected subset of user terminals. Accordingly, $N_U$ signals intended for the selected subset of user terminals may be mapped to $N_T$ signals for transmission by respective antenna elements. Then, generating the beams among the set of active beams may involve selecting a subsets of active beams among a plurality of $N_B$ fixed beams, each beam having a respective beam center, where $N_B$ indicates the number of fixed beams. Further, the coefficient entries of the mapping matrix of dimension (size) ($N_T \times N_U$) may include phase factors that are based on a location of the respective antenna element and an indication of that beam center that is closest to the location of the respective user terminal. The indication of the beam center may be a vector indicating the beam center, such as a lattice vector, for example.

In some embodiments, the beams among the plurality of $N_B$ fixed beams may have respective beam centers arranged at the vertices of a regular lattice. The beam centers may be indicated by lattice vectors that are (integer) linear combinations of two (linearly independent) lattice base vectors. Further, the plurality of fixed beams may have a normalized beam spacing between adjacent beams that is (typically) smaller than 0.6. The aforementioned phase factors may be based on respective scalar products between the (geometric) location of the antenna element and the lattice vector indicating the beam center. The (geometric) location of the respective antenna element may be a location relative to the active antenna array (or any suitable reference location that is fixed with respect to the active antenna array). The mapping matrix (e.g., beamforming matrix or precoding matrix) may be obtained by appropriate normalization of a pure phase matrix. As such, the beamforming may be said to relate to a Fast Fourier Transform (FFT). The proposed method may be said to include a step of determining the pure phase matrix. The proposed method may further include a step of normalizing the pure phase matrix. The lattice (grid) may be a hexagonal lattice, for example. For pragmatic M-MIMO, the normalized beam spacing may be in the range from 0.10 to 0.25 depending on affordable complexity. For Color Frequency Reuse (CFR) M-MIMO (e.g., 4CFR M-MIMO, CFR++), the normalized beam spacing may be in the range from 0.45 to 0.55.

This normalized beam spacing is significantly smaller than in conventional schemes and has been found to allow for optimized throughput/capacity when employed in conjunction with the proposed radio resource management, i.e., in conjunction with appropriate selection of subsets of user terminals.

In some embodiments, the method may further include selecting the subset of active beams by selecting a respective one among the plurality of $N_B$ beams for each of the user terminals among the subset of user terminals, based on the locations of the user terminals among the subset of user terminals. Therein, the mapping matrix of dimension ($N_T \times N_U$) may be a beamforming matrix that is obtainable based on a fixed beamforming matrix of dimension ($N_T \times N_B$) for generating the $N_B$ fixed beams with the array of $N_T$ antenna elements, by mapping signals intended for the $N_B$ fixed beams to the signals for transmission by respective antenna elements, and a beam switching matrix of dimension ($N_B \times N_U$) for selecting the beams in the subset of active beams by interconnecting each signal intended for a user terminal among the subset of user terminals to a respective input of the fixed beamforming matrix corresponding to that beam that has its beam center closest to the respective user terminal. This description of the beamforming matrix by a cascade of the beam switching matrix (beam selection matrix) and the fixed beamforming matrix may relate to the transmission mode.

By this cascading of the beam switching matrix (beam selection matrix) and the fixed beamforming matrix, the mapping matrix can be implemented at low computational complexity, which is of great advantage especially for spaceborne applications.

In some embodiments, the fixed beamforming matrix may be implemented by one of an oversized Butler matrix circuit, a discrete lens array, an oversized Fast Fourier Transform circuit, or a combination thereof. The discrete lens array may be a bootlace lens, for example. Implementation by the FFT circuit may be performed in the digital domain. This allows for a simple and efficient implementation of the fixed beamforming matrix.

In some embodiments, selecting the subset of user terminals may include obtaining a set of quantities indicating mutual radio interferences between pairs of user terminals among the plurality of user terminals. Selecting the subset of user terminals may further include determining a radio resource mapping for mapping the plurality of user terminals to a set of radio resource blocks, based on said set of quantities, applying the constraint that each user terminal is mapped to exactly one among the set of radio resource blocks. The set of quantities indicating mutual radio interferences may be determined based on mutual distances on ground between the terminals among the plurality of terminals, for example.

Thereby, a selection of subsets of user terminals can be achieved that minimizes the co-channel interference among the user terminals in each subset, thereby improving overall throughput performance. Notably, channel feedback from the user terminals is not required for the selection.

In some embodiments, selecting the subset of user terminals may include obtaining an interference matrix that indicates mutual radio interferences between pairs of user terminals among the plurality of user terminals. Selecting the subset of user terminals may further include determining a radio resource mapping matrix that maps the plurality of user terminals to a set of radio resource blocks, by minimizing a quantity derivable from a matrix product of a transpose of the radio resource mapping matrix, the interference matrix, and the radio resource mapping matrix, applying the constraint that each user terminal is mapped to exactly one among the set of radio resource blocks. The aforementioned quantity may be the trace. The elements of the radio resource mapping matrix may be either 0 or 1.

Thereby, a selection of subsets of user terminals can be achieved that minimizes the co-channel interference among the user terminals in each subset, thereby improving overall throughput performance.

In some embodiments, the method may further include determining the interference matrix based on mutual distances on ground between the user terminals among the plurality of terminals. This may further involve a step of obtaining information on respective locations on ground of the terminals among the plurality of terminals. This allows to determine the interference matrix in a particularly simple manner, independently of any channel feedback from the user terminals.

In some embodiments, the selected subset of user terminals for a given radio resource block may include those user terminals that are mapped to the given radio resource block by the determined radio resource mapping matrix. The selected subset of user terminals for the given resource blocks may consist of those user terminals that are mapped to the given radio resource block by the determined radio resource mapping matrix, for example. The selected subset may relate to (e.g., include or consist of) the user terminals that are to be served using the current radio resource block.

In some embodiments, the radio resource blocks may be time slots, frequency slots, pseudo-random spreading sequences, polarization modes, or combinations thereof. For example, the radio resource blocks may relate to consecutive or non-consecutive time slots. The frequency of transmission may be fixed for each beam. In some implementations, the same frequency of transmission may be used for all beams. In some other implementations, a frequency reuse scheme may be applied so that adjacent beams are used for transmission at different frequencies. For example, a four color frequency reuse scheme (4CFR) may be applied.

In some embodiments, a size of the radio resource blocks may be spatially non-uniform. The size of the radio resource blocks may relate to a length (duration) of time slots, or a width of frequency slots, or combinations thereof. The size may depend, assuming that a region of interest of the hub station is subdivided into a plurality of areas, on spatial densities of user terminals in respective areas.

In some embodiments, the method may further include applying a frequency reuse scheme, such that pairs of adjacent beams among the plurality of fixed beams are assigned to different transmission frequencies. The frequency reuse scheme may be a three-color or a four-color frequency reuse scheme, for example. In a satellite network, this approach has the advantage of reducing the bandwidth required by the gateway to satellite feeder link by a factor of 3 or 4.

Another aspect of the disclosure relates to a hub station for performing wireless communications with a plurality of user terminals. The hub station may include an active antenna array with a plurality of antenna elements. The hub station may further include a beamforming unit that is coupled to the active antenna array, for emitting sets of active beams. The active beams may have beam centers that are determined based on locations of the user terminals. The hub station may further include a radio resource management unit for selecting, for each of a plurality of radio resource blocks, a respective subset of user terminals among the plurality of user terminals that shall be served using the radio resource block. The hub station may yet further include a beam switching unit for switching between sets of active beams to enable transmission, using the respective radio resource block, of radio signals to the user terminals among the selected subset of user terminals, in those beams whose beam centers are determined based on respective locations of the user terminals among the selected subset of user terminals. The hub station may be a terrestrial satellite gateway (satellite system) or a terrestrial base station (terrestrial system), for example. The hub station may also be a (communication) satellite itself. The satellite or the terrestrial base station may include a transmitter for transmitting radio signals to the terminals among the selected subset, in the beams whose beam centers are closest to respective locations of the terminals among the selected subset of terminals. The satellite or terrestrial base station may further include a processing unit for obtaining a beamforming or precoding matrix (mapping matrix) as detailed above.

In some embodiments, the beamforming unit may implement a fixed beamforming matrix for emitting a plurality of fixed beams with beam centers arranged at the vertices of a regular lattice. The beams among the plurality of fixed beams may have a normalized beam spacing between adjacent beams that is smaller than 0.6. Further, the beams in the sets of active beams may be selected from the plurality of fixed beams. The fixed beams may be fixed equidistant beams, for example.

In some embodiments, the hub station may be connected via radio frequency or optical links to a satellite. Also, the hub station may be a (communication) satellite itself. Then, a ratio between the spacing of the antenna elements of the active antenna array and a wavelength of the lowest transmission frequency may be in the range from 1.6 to 2.6 and/or a ratio between the number of antenna elements of the active antenna array and the number of terminals in the selected subset of terminals may be equal to or below 2.5. The satellite may be a satellite (satellite system) in geostationary orbit (GEO) or other orbits (i.e., Medium Earth Orbit (MEO) or Low Earth Orbit (LEO)) and the region of interest (ROI) may correspond to the full or partial Earth. The following examples will focus on the GEO case, but embodiments of the disclosure are likewise applicable to MEO or LEO orbits, with proper system parameters adaptations. The dimension of the active antenna array may be an edge length thereof (for a square array, rectangular array, or linear array) or a diameter (for a circular array), for example. The ratio between the number of antenna elements of the active antenna array and the number of terminals in the selected subset of terminals may be denoted by $N_T/N_U$, e.g., with $N_T/N_U \leq 2.5$ where $N_U$ indicates the number of active terminals (users) in the selected subset of terminals and $N_T$ indicates the number of antenna elements. In particular, $N_T/N_U$ may be around 2 for pragmatic M-MIMO, and around 1 for CFR M-MIMO (e.g., CFR++). Although this value may appear to be comparatively low value for a M-MIMO application, it allows to limit the active antenna complexity with minimum performance loss.

Another aspect of the disclosure relates to a method of determining antenna parameters and a beam pattern for a hub station including an active antenna array with a plurality of antenna elements and performing wireless communications with a plurality of user terminals. The method may be a design method, for example. The hub station may be intended to transmit radio signals in subsets of beams among a plurality of fixed equidistant beams with a beam pattern in which beam centers are arranged at the vertices of a regular lattice, and may be further intended, for each of a plurality of radio resource blocks, to select a subset of user terminals among the plurality of user terminals. The hub station may be further intended to, for each user terminal among the selected subset of user terminals, determine a beam center that is closest to a location of the respective user terminal. The hub station may be yet further intended to transmit radio signals to the user terminals among the selected subset of user terminals, in the beams corresponding to the determined beam centers. The method may include setting a ratio between a number of the plurality of antenna elements and a number of user terminals in the selected subset of user terminals to a predefined initial value for the ratio. The method may further include setting a normalized beam spacing of the beam pattern to an initial value for the normalized beam spacing. The method may further include, when assuming a given set of RF transmission parameters, determining throughput for a plurality of antenna element spacings between adjacent ones among the plurality of antenna elements for the set ratio and set normalized beam spacing. Therein, the antenna element spacings may be selected from a predefined range of antenna elements spacings. The RF transmission parameters may include a maximum available user link bandwidth, an overall payload RF power, a maximum carrier baud rate, a transmit filter roll-off factor, and/or a number of carriers, for example. The step of determining throughput may further assume a Radio Resource Management (RRM) scheme and/or a CFR scheme. Depending on the assumed scheme(s), the aforementioned initial values may be different. The method may further include selecting an antenna element spacing from the predefined range of antenna element spacings that results in the largest throughput. The method may further include determining an optimized value of the ratio between the number (count) of the plurality of antenna elements and the number (count) of user terminals in the selected subset of user terminals that maximizes throughput for the set normalized beam spacing. Therein, the optimized value of the ratio may be chosen from a predefined range that includes the initial value of the ratio. The method may further include determining an optimized value of the normalized beam spacing that maximizes throughput for the optimized ratio. Therein, the optimized value of the normalized beam spacing may be chosen from a predefined range that includes the initial value of the normalized beam spacing.

It will be appreciated that apparatus features and method steps may be interchanged in many ways. In particular, the details of the disclosed apparatus (e.g., hub station) can be realized by the corresponding method of operating the apparatus (e.g., communication method), and vice versa, as the skilled person will appreciate. Moreover, any of the above statements made with respect to the apparatus are understood to likewise apply to the corresponding method, and vice versa.

BRIEF DESCRIPTION OF THE FIGURES

Example embodiments of the disclosure are explained below with reference to the accompanying drawings, wherein FIG. 1A and FIG. 1B schematically illustrate an example of forward-link payload and satellite-user geometry;

FIG. 31 schematically illustrates an example of a hub station according to embodiments of the disclosure; and FIG. 32 shows, in flowchart form, an example of a method of performing wireless communications between a hub station and a plurality of user terminals according to embodiments of the disclosure.

DETAILED DESCRIPTION

Figure 1B:
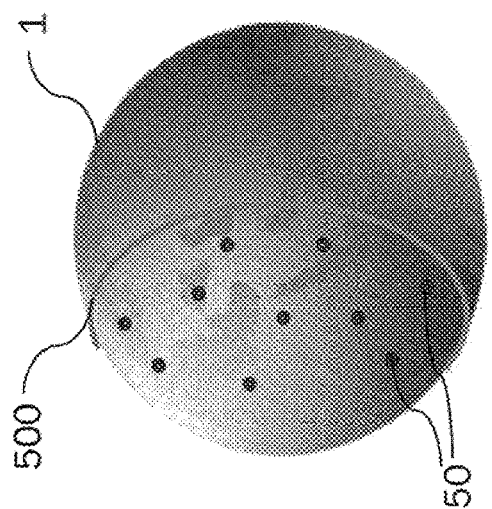

In the following, example embodiments of the disclosure will be described with reference to the appended figures. Identical elements in the figures may be indicated by identical reference numbers, and repeated description thereof may be omitted for reasons of conciseness.

The present disclosure includes an analysis of the performance of M-MIMO techniques aiming at increasing the throughput of broadband communication systems (e.g., broadband satellites). In particular, a "pragmatic" approach to the design of the M-MIMO is proposed to ease its implementation both at system and satellite payload level. The performance of the M-MIMO approach (also referred to as fixed Multi-Beam (MB) M-MIMO) is compared to optimized, yet very complex to implement, classical Minimum Mean Square Error (MMSE), Zero Forcing (ZF), and Matched Filter (MF) schemes to prove good performance of the proposed approach. To further boost the M-MIMO performance, a novel radio resource management approach, for example based on Mixed Integer Quadratic Programming (MIQDP-RRM) is proposed. The adoption of RRM (e.g., MIQDP-RRM) is shown to greatly enhance the M-MIMO throughput performance. It is further shown that the MB M-MIMO scheme can closely approximate the MF, ZF and MMSE performances with a much simpler active antenna-based payload architecture and without requiring any user channel estimation. The MB MIQDP-RRM M-MIMO pragmatic solution allows to achieve higher satellite broadband throughput compared to a conventional four colors frequency reuse (4CFR) scheme with affordable complexity for both space and ground segments. At the same time it is shown that by non-conventional CFR multibeam array design, the performance gap compared to MB MIQDP-RRM M-MIMO can be significantly reduced.

I. INTRODUCTION AND MOTIVATION

The present disclosure aims at exploring opportunities for exploiting M-MIMO in satellite communications and to investigate the potential advantages. More importantly, the present disclosure aims at devising practical ways to implement solutions optimizing the M-MIMO performance, paying attention also to system complexity. The key challenges in adopting M-MIMO for broadband satellite networks can be summarized as follows:

1) Difficulties in the practical implementation of M-MIMO technology because:
   a) Wide adoption of transparent payloads with distributed gateways and four color frequency reuse schemes not compatible with M-MIMO.
   b) Very limited adoption of active array antennas with a large number of radiating elements.
   c) Impossibility to use Time Division Duplexing (TDD) schemes to ease channel estimation because of satellite frequency regulation restrictions in millimeter wave bands.
   d) Cumbersome implementation of precoding schemes requiring user feedback in satellite Frequency Division Duplexing (FDD) schemes.
   e) Limitations in the digital processing implementable on-board satellites.

2) Benign channel model (essentially Additive White Gaussian Noise (AWGN) with no multipath fading) reducing the potential M-MIMO performance gain.

Concerning points 1-a) and 1-b), these challenges are mainly related to the legacy systems design and technological issues implementing active antennas at millimeter frequency bands. Point 1-c) is particularly critical as TDD cannot be used in the Ku/Ka/Q-band satellite bands commonly adopted by broadband systems. Point 1-d) is related to the difficulty in performing FDD channel estimation with FDD as well as the non-scalability of M-MIMO pilot-based channel estimations. As a consequence, the FDD scheme adopted in these bands is not compatible with M-MIMO unless for very small-scale systems of no practical interest. Point 1-e) is related to the limited power and mass available on-board satellites for supporting the M-MIMO digital signal processing required for a high throughput satellite. While the implementation of adaptive wide-band digital beam forming is considered very challenging, on-board implementation of algorithms requiring matrix inversions is considered to be out of scope even in the medium term. Moving the M-MIMO signal processing to the gateway will require a very large increase of the feeder link bandwidth as well the previously mentioned need for high-speed gateway interconnections.

Point 2 is also considered a major drawback of broadband satellite systems operating in AWGN channel. In fact one of the M-MIMO advantages is to "transform" uncorrelated (Rayleigh) fading channels into an AWGN channel (e.g., the so called channel hardening). This property cannot be exploited in satellite broadband M-MIMO systems. However, the present disclosure seeks to circumvent this issue by proper system design.

In view of the above needs, the present disclosure particularly relates to
  properly modeling M-MIMO for broadband satellite networks,
  deriving an adequate, yet feasible, RRM strategy,
  identifying affordable complexity payload/system solutions allowing practical M-MIMO implementation with acceptable performance losses, and
  understanding the potential performances of M-MIMO for broadband satellite networks and comparing them to more conventional approaches.

Accordingly, section II of the disclosure describes the satellite M-MIMO system model. Section III summarizes the performance results of the various M-MIMO solutions investigated, section IV contains the results for a conventional frequency reuse scheme, section V provides a summary of the results corresponding to the optimized configurations, section VI describes the array optimization methodology for both M-MIMO and CFR, and section VII describes a pragmatic system and payload design achieving performance close to the ideal M-MIMO with affordable complexity. Finally, section VIII provides a summary and conclusions.

II. SYSTEM MODEL

To analyze the performance of the various M-MIMO schemes and to compare them with more conventional payload architectures, an overall system model encompassing the space and the user segments has been developed. To ease the comparison of results and to focus on the key sizing parameters, the following approximations will be made for the present disclosure:
  1) Global antenna coverage of the Earth above a minimum elevation angle,
  2) Linear payload characteristic,
  3) Negligible feeder uplink Additive White Gaussian Noise (AWGN) effect, and
  4) Ideal channel estimation for pre-coding.

While the present disclosure will frequently make reference to a communication satellite communicating with a plurality of user terminals (or simply "users" or "terminals" for short), it is understood that the disclosure generally relates to hub stations that perform wireless communication with user terminals either directly or via a satellite payload.

Figure 1A:
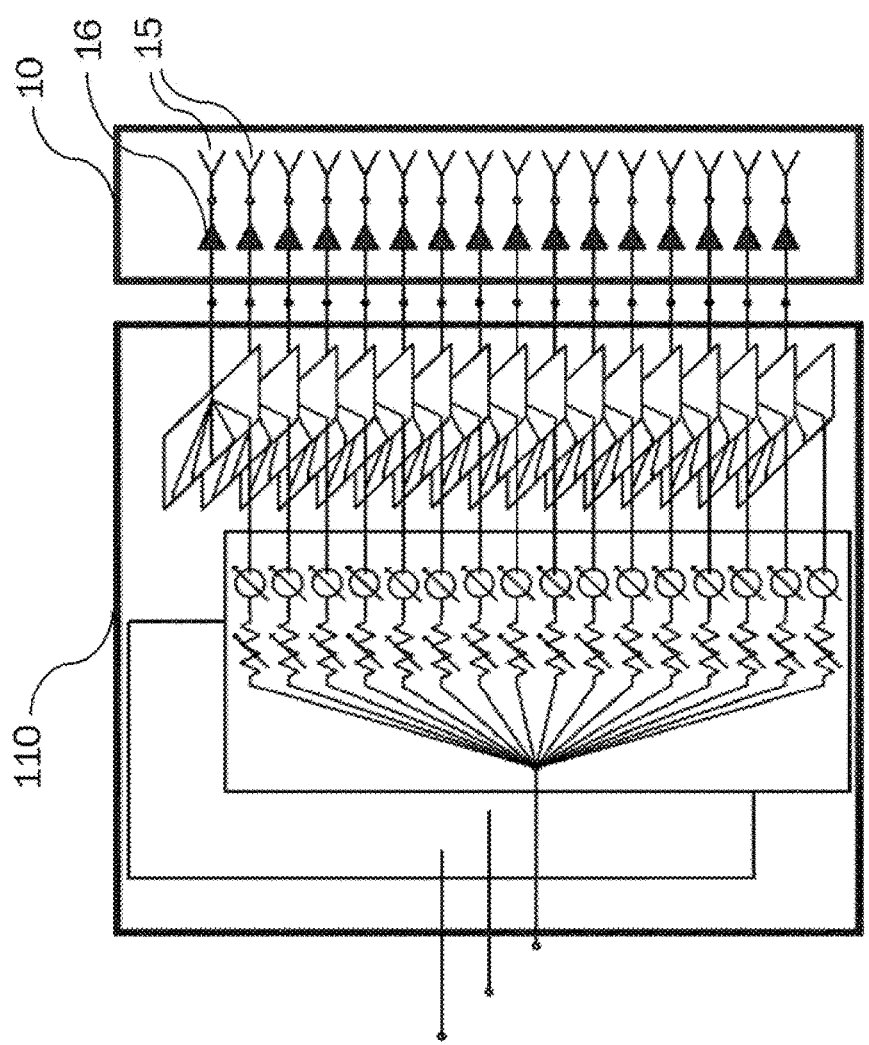

A high-level representation of an example of the forward-link payload and satellite-user geometry is schematically illustrated in FIG. 1A and FIG. 1B. The left inputs to the payload in FIG. 1A correspond to the $N_U$ user beam inputs entering the On-Board Processor (OBP) 110. These $N_U$ signals are received, for example, from the gateway's feeder uplink and may be down-converted to a frequency compatible with the OBP 110. The OBP 110 implements $N_U$ distinct beamforming networks (BFNs), one for each beam input. Each BFN has $N_T$ outputs (one for each antenna feed). For each of the $N_T$ RF feed chains, the $N_P$ BFN outputs are summed together before being converted to the user downlink frequency and amplified. The OBP 110 is coupled to an antenna 10, which is implemented by a Direct Radiating Active (DRA) antenna. The antenna 10 comprises a plurality of antenna elements 15 and, for each antenna element 15, a High Power Amplifier (HPA) 16. The antenna 10 simultaneously radiates the $N_T$ feed signals towards the satellite coverage region (or Region of Interest (ROI)). In general, the present disclosure relates to wireless communication (e.g., line-of-sight communication) between a hub station (e.g., satellite or ground based) and a plurality of users (user terminals) in a ROI of the hub station, and to transmitting signals (e.g., radio signals) to at least subsets of the plurality of users in sets of active beams. FIG. 1B schematically illustrates the (circular) ROI 520 on a portion of the Earth 1 that is visible from a viewpoint of the transmitter. The ROI 520 may include a plurality of user terminals 50.

Each antenna feed element contains a linear combination, properly weighted in amplitude and phase, of the $N_U$ beam signals. The circular ROI 520 as per point 1) simplifies the analysis while maintaining full generality. Arbitrary coverage patterns within this circular boundary are possible thanks to the payload resource allocation flexibility. The HPAs 16 present in the DRA antenna 10 adopted on-board will operate in multi-carrier mode, thus they will require to operate at a certain back-off from the maximum operating compression point. Hence, as for point 2) above, it is assumed that amplifiers are approximated by linear devices. Intermodulation effects, although mitigated by the DRA payload architecture, can be accounted for as additional AWGN. Finally, the feeder uplink is typically designed to make its noise contribution to the overall forward link negligible. Hence, the assumption as per point 3) above is well justified. The assumption as per point 4) above is certainly optimistic, although no satellite specific M-MIMO analysis of this effect can be found in open literature. While for single feed per beam payloads, pre-coding practical channel state information (CSI) in satellite has been estimated, such results are not available for M-MIMO with DRA architecture. In particular, the CSI phase errors will have a direct impact on the beam shape which was not the case in single-feed per beam precoding discussed in the literature. In any case, the present disclosure is interested in assessing practical and simplified M-MIMO solutions not requiring per-user CSI. In the following, an ideal pre-coding performance is taken as the upper bound for classical M-MIMO performance.

To simulate the random traffic distribution, a Monte Carlo approach has been implemented. At each iteration the $N_U$ simultaneous users' location are randomly generated over the satellite coverage region. More users than the value $N_U$ could be supported by using Time Division Multiplexing (TDM) as typically implemented in satellite broadband systems. Notably, the parameter $N_T/N_U$ where $N_T$ represents the number of the DRA antenna elements will be optimized to maximize the system throughput. At each iteration step the system performance (see section II.E) is computed. The process may be repeated $N_{iter}$ times to accumulate a sufficient number of independent statistics to properly characterize the system behavior.

II.A. Payload, Antenna, and Channel Model

To simplify the notation, the system analysis is initially focused on a payload sub-band occupied by a single TDM carrier. The extension to a payload using multiple sub-bands and carriers in a combined Frequency Division Multiplexing (FDM) and TDM manner is discussed in section V of the present disclosure. Further, an ideal payload composed of an on-board processor implementing the digital beamforming or pre-coding matrix mapping the $N_U$ active users per TDM carrier to the $N_T$ antenna radiating elements as shown in FIG. 1 is initially assumed.

The following notation will be used: vectors will be represented in bold lower-case and matrices in bold capital letters; bold italics will be used for vectors and matrices representing geometrical positions (in real and Fourier space). Superscripts T and H will indicate transpose and complex conjugate transpose matrix operators, respectively.

The input signals, the transmitted signals and the received signals can be collected in the column vectors $x=[x_1, \ldots, x_j, \ldots, x_{N_U}]^T$, $y=[y_1, \ldots, y_n, \ldots, y_{N_T}]^T$ and $z=[z_1, \ldots, z_i, \ldots, z_{N_U}]^T$, where $x_j$, $y_n$ and $z_i$ are the complex input signal for user j, the complex signals transmitted by radiating element n and the complex signal received by receiver i, respectively.

The transfer function between the input ports of the $N_T$ antenna radiating elements and the $N_U$ user receiver outputs can be described by a complex matrix H of dimensions $(N_U \times N_T)$ where the generic entry element $h_{i,n}$ describes the complex transfer function between the input of the transmitting radiating element n and the input of the user i receiver.

Similarly, the relationship between signals at the input ports and the signals at the output ports of the precoding/beamforming OBP can be expressed by means of a complex transfer matrix U of dimensions $(N_T \times N_U)$ where the generic matrix element $u_{n,j}$ describes the complex transfer function between the input port j and output port n.

Figure 2:
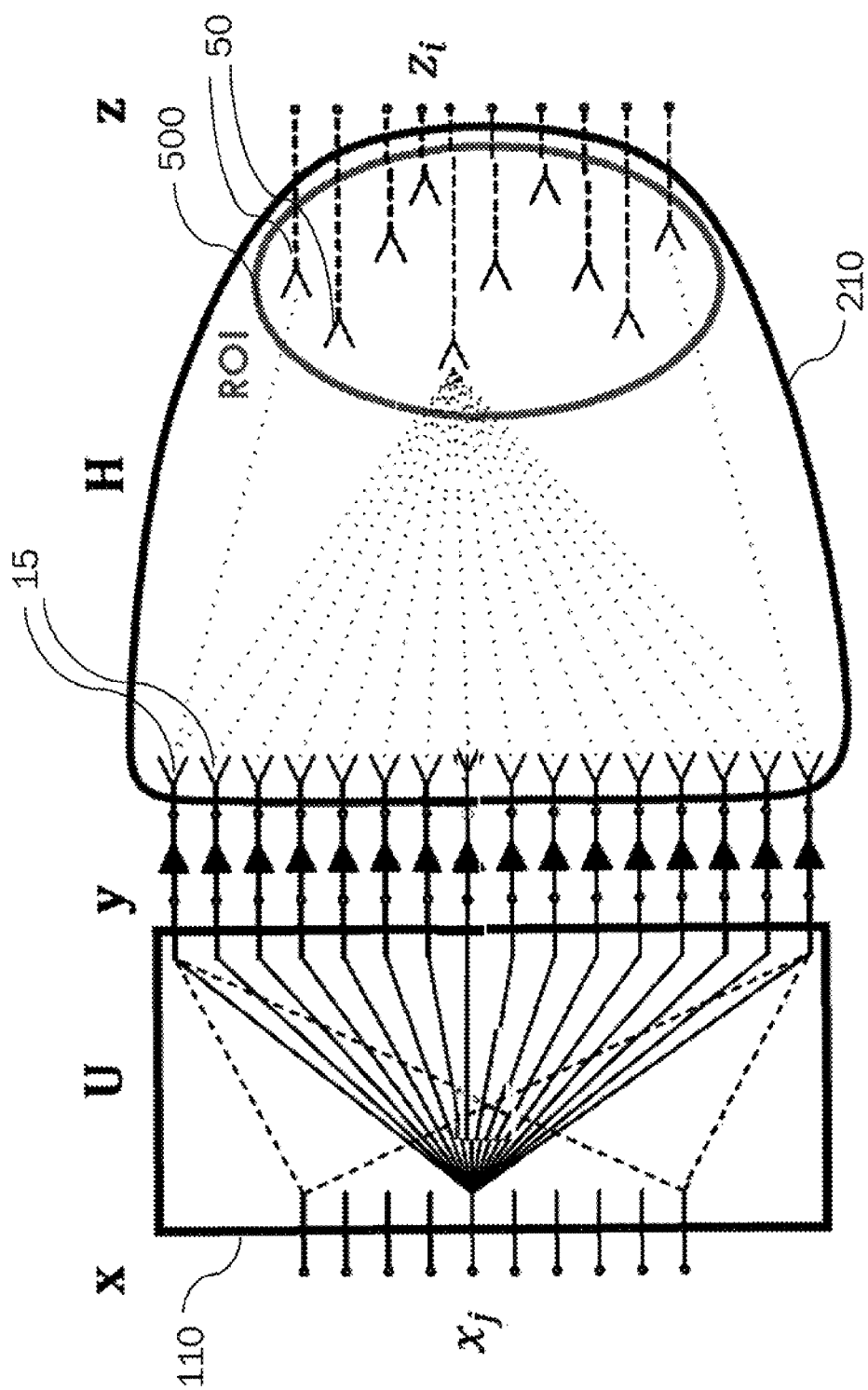
FIG. 2 schematically illustrates a signal flow graph from input signals, via transmitted signals, to received signals at a plurality of user terminals.

For simplicity, it is assumed that all the antenna power amplifiers are identical and do not introduce amplitude and phase errors so that their effect can be absorbed in a single scaling constant proportional to the overall RF payload power $P_T$. Relevant normalization of the precoding/beamforming matrix $Û$ is discussed in section II.D. An example of the resulting signal flow graph is shown in FIG. 2. The OBP 110 implements the complex transfer matrix U, which may also be referred to as a precoding/beamforming matrix. The antenna elements 15 transmit respective transmitted signals $y_n$, which undergo transformation as described by the complex matrix H before they are received as received signals $z_i$ by the users 50 in the ROI 500. The input-output representation is summarized by the equation $$y=\sqrt{P_T}Ûx, z=Hy+n=\sqrt{P_T}HÛ+n, \quad (1)$$

where n is a vector whose elements represents the random noise process (e.g., thermal plus possible external inter-system interference) experienced by the $N_U$ users.

Without loss of generality it can be assumed that all users have identical terminals (user terminals) and experience the same receive noise power. Scaling Equation (1) such that the noise random variables have unitary variance, the noise signal vector n can be represented as independent and identically distributed (IID) random variables with a circularly-symmetric complex Gaussian distribution of zero mean and unitary variance. The absorption of the noise standard deviation as scaling factor of the channel matrix is described in section II.B.4.

II.B. Channel Matrix

Figure 3:
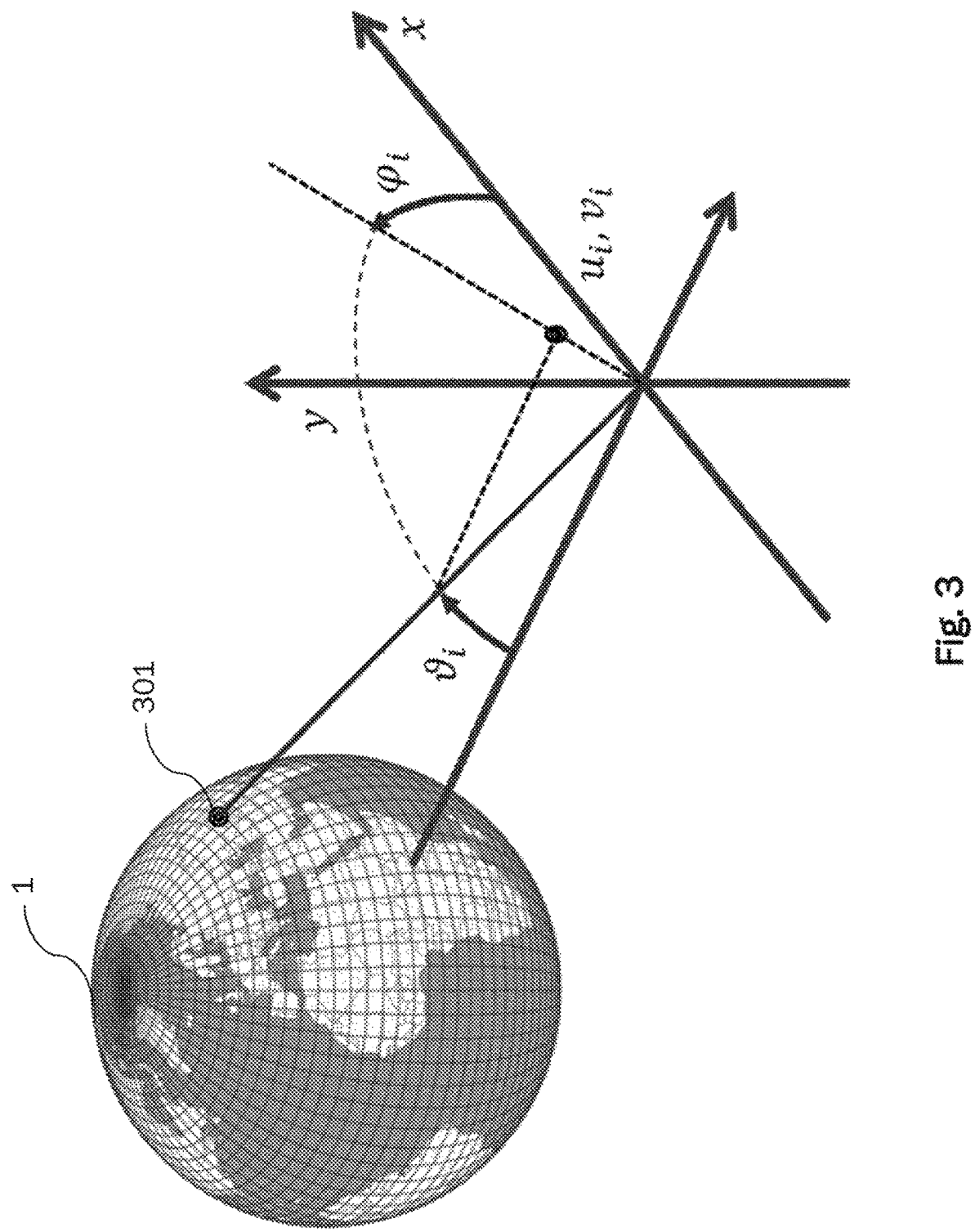
FIG. 3 schematically illustrates an example of the satellite-Earth geometry and relevant coordinate systems.

The channel matrix H represents the complex transfer function between each radiating element of the on-board antenna array and the user receivers. At each iteration, a distribution of users is generated over the region of interest defined by a minimum satellite elevation angle on Earth, which corresponds to a circle in the satellite [u,v] coordinates. The satellite-Earth geometry and relevant coordinate systems are depicted in FIG. 3, which shows the relationship between the transmitter (satellite) location and the location 301 of a user on the Earth 1. The locations satisfy the following relationships $$u_i = \sin(\vartheta_i)\cos(\phi_i), \quad (2)$$
$$v_i = \sin(\vartheta_i)\sin(\phi_i),$$
$$\vartheta_i = \sqrt{u_i^2 + v_i^2},$$
$$\phi_i = \tan^{-1}\left(\frac{v_i}{u_i}\right).$$

Two different spatial distribution statistics have been implemented and are shortly described hereafter.

1) Uniform Spatial Distribution in a Circle: The user distribution consists of $N_U$ realizations of two independent random variables $[\zeta_1, \zeta_2]$ each of them uniformly distributed in [0,1] and mapped in the u,v disk of radius $\sin(\vartheta_{max})$ by means of inverse transform sampling.

$$\rho_i = \sin(\vartheta_{max})\sqrt{\zeta_1}, \quad (3)$$
$$\phi_i = 2\pi\zeta_2, \quad (4)$$
$$\vartheta_i = \sin^{-1}(\rho_i), \quad (5)$$
$$u_i = \begin{bmatrix} u_i \\ v_i \end{bmatrix} = \begin{bmatrix} \rho_i \cos(\phi_i) \\ \rho_i \sin(\phi_i) \end{bmatrix}. \quad (6)$$

Figure 4B:
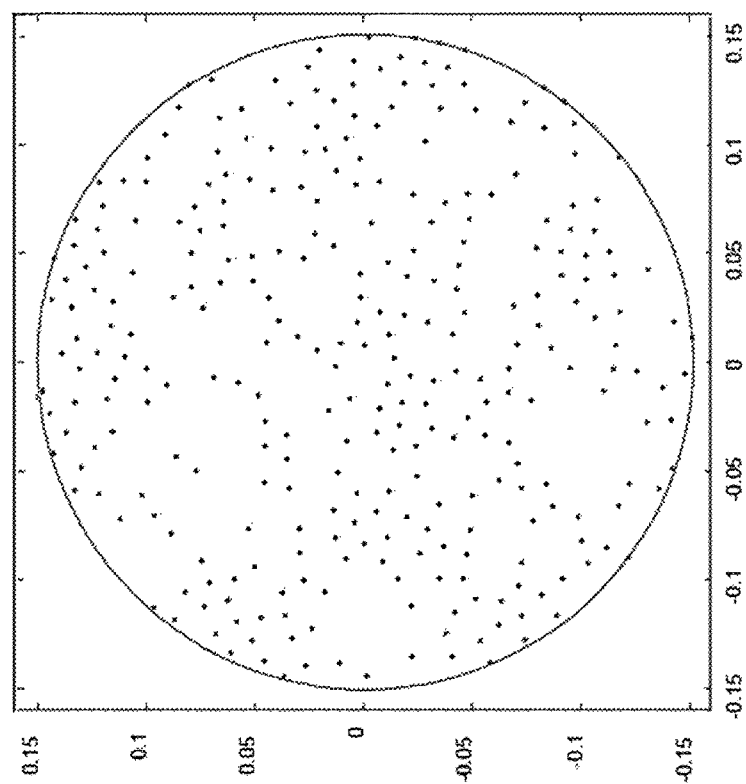
FIG. 4A and FIG. 4B schematically illustrate examples of a plurality of random points distributed uniformly and distributed according to a Poisson disk distribution, respectively.
Figure 4A:
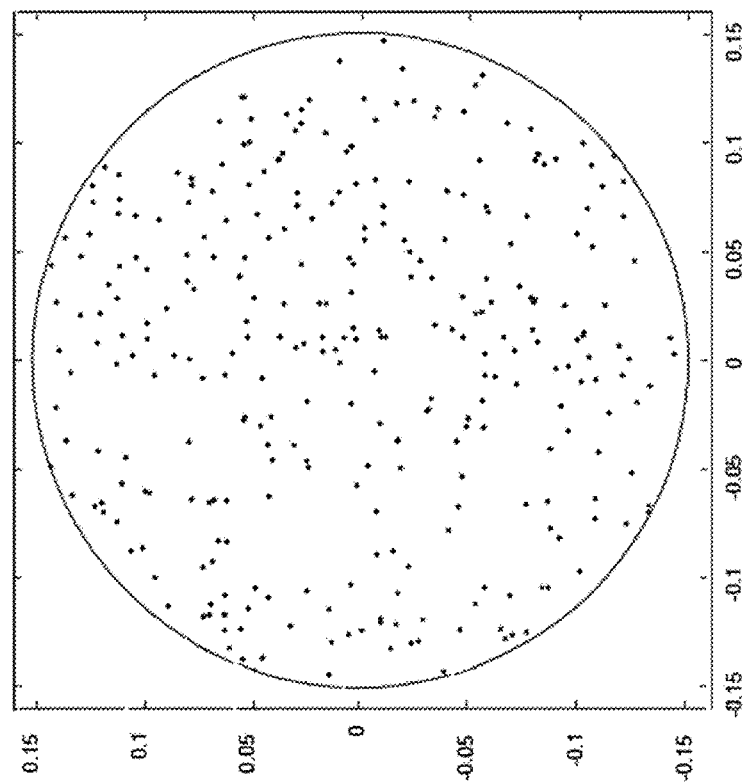

2) Poisson Disk Distribution in a Circle: In addition to uniformity within the circle defining the region of interest, the $N_U$ realizations must satisfy the constraint that each point is separated from the others by a minimum distance $2\rho$, where the parameter $\rho_{min}$ is called the Poisson disk radius. The advantage of the minimum distance distribution for M-MIMO will become apparent in section III.B. The implementation of the present disclosure starts from a uniform point distribution which is evolved in an iterative fashion to finally satisfy the minimum distance requirements to be representative of the RRM approach described in section II.G. The evolution may be performed according to molecular dynamics principles with a repulsive force that repels points closer than the Poisson disk radius. The difference between the two spatial distribution can be appreciated from FIG. 4A and FIG. 4B, for which 100 points are generated uniformly and according to a Poisson disk distribution with minimum separation of 0.5 degrees (i.e. Poisson disk radius of 0.25 degrees), respectively. The way to practically achieve this minimum distance distribution starting from a uniform user distribution applying a specific RRM solution is described in section II.G.

3) Active Antenna Channel Model: Without intended limitation, the on-board active antenna is modelled as a square planar array of size $D_A \times D_A$ composed of $N_T$ radiating elements placed on a square lattice with element spacing $d_A$. Let $r_n$ denote the position of the n-th array element, $g_n(\vartheta,\phi)$ the co-polar radiation pattern referred to the common antenna coordinate origin and $w_n$ the complex array excitation coefficients. Then, the total co-polar radiation pattern can be written as $$g(\vartheta,\phi)=\sum_{n=1}^{N_T} w_n g_n(\vartheta,\phi)=g(\vartheta,\phi)w, \quad (7)$$

where $w=[w_1, \ldots, w_n, \ldots, w_{N_T}]^T$ is the column vector of the array complex weights normalized to unit norm, $\|w\|^2=\sum_{n=1}^{N_T} w_n^2=1$, and $g(\vartheta,\phi)=[g_1(\vartheta,\phi), \ldots, g_n(\varepsilon,\phi), \ldots, g_{N_T}(\varepsilon,\phi)]$ is the array manifold row vector which incorporates all the spatial characteristics of the far-field radiation patterns of the array elements. Assuming that all the radiating elements are identical and equally oriented in space with a common element radiation pattern $g_E(\vartheta,\phi)$, the far-field approximation can be used to express the radiation pattern of the n-th element $g_n(\vartheta,\phi)$ with phase center corresponding to the position $r_n=x_n\hat{x}+y_n\hat{y}$, where $\hat{x}$ and $\hat{y}$ are the coordinate direction unit vectors. Thus, $$g_n(\vartheta,\phi)=g_E(\vartheta,\phi)\exp[jk_0(x_n \sin\vartheta \cos\phi+y_n \sin\vartheta \sin\phi)], \quad (8)$$

where $k_0=2\pi/\lambda$ is the free-space wave-number, $\lambda=f_0/c$ is the free-space wavelength, $f_0$ is the carrier frequency and c is the speed of light. Concerning the elementary radiation pattern $g_E(\vartheta,\phi)$, a simple rotationally symmetric model can be used so that $g_E(\vartheta,\phi)=g_E(\vartheta)$ defined as $$g_E(\vartheta) = \sqrt{G_E^{max}} \cos^{q_E}(\vartheta), \quad (9)$$

$$G_E^{max} = 4\pi A_E 10^{\frac{\eta_E(dB)}{10}}, \quad (10)$$

$$q_E = \frac{1}{4}G_E - \frac{1}{2}, \quad (11)$$

where $G_E^{max}$ is the peak gain of the radiating element and $A_E$ is the DRA elementary cell area normalized to the wavelength squared, $$A_E = \left(\frac{d_A}{\lambda}\right)^2$$

and $\eta_E(dB)$ is the radiating element efficiency expressed in dB. It is worth noting that efficiency affects the exponent and in turn the gain, so it should be considered an aperture efficiency.

While the above assumes a square shape of the antenna array, the present disclosure shall not be construed as limited to such array geometries. For example, the antenna array may have rectangular (non-square) shape, a linear shape, a circular shape, or an elliptic shape. In any of these cases, the array is characterized by one or two (length) dimensions that may correspond to edge length(s), diameter, or semi-axes.

4) Link Budget Model: The path from the satellite active array to the i-th user can be described by a "normalized" link budget parameter $L_B(\vartheta_i)$ defined as the signal gain from the satellite array center of coordinates to the user receiver antenna output over the noise power. In the following, for notation simplicity, it is assumed that the receiver noise temperature is independent from the atmospheric attenuation. Also the effect of atmospheric fading is neglected, which is has negligible impact on the average system throughput. With the above simplifications at hand, the $L_B(\vartheta_i)$ coefficient can be computed as $$L_B(\vartheta_i) = \frac{G_R^U}{L_{FS}(\vartheta_i)N_R^U}, \quad (12)$$

$$L_{FS}(\vartheta_i) = \left[\frac{4\pi r(\vartheta_i)}{\lambda}\right]^2, \quad (13)$$

$$r(\vartheta_i) = \sqrt{\frac{(R_E+H_S)^2+R_E^2-2R_E(R_E+H_S)}{\sin\left[\alpha_i+\sin^{-1}\left(\frac{R_E}{R_E+H_S}\right)\cos(\alpha_i)\right]}}, \quad (14)$$

$$\alpha_i = \cos^{-1}\left[\sin(\vartheta_i)\frac{(R_E+H_S)}{R_E}\right],$$

$$N_R^U = K_B T_R^U R_S,$$

where $G_R^U$ is the receive user terminal antenna gain, $T_R^U$ is the user antenna temperature, $K_B$ is the Boltzmann constant, $R_E$ is the Earth radius, $H_S$ is the satellite orbit altitude, $\vartheta_i$ and $\alpha_i$ are the off-nadir satellite angle and the over the horizon elevation angle, respectively, for the i-th user with $0\leq\vartheta_i\leq\vartheta_{max}$, with $\vartheta_{max}$ derived as $$\vartheta_{max}(\alpha_{min}) = \sin^{-1}\left(\frac{R_E}{R_E+H_S}\right)\cos(\alpha_{min}), \quad (15)$$

where $\alpha_{min}$ is the minimum allowed satellite elevation angle. The ROI's surface, dubbed $A_C$, can be computed as $$A_c(\alpha_{min}) = 2\pi R_E^2 \cos\left[\frac{\pi}{2} - \vartheta_{max}(\alpha_{min}) - \alpha_{min}\right]. \quad (16)$$

5) Channel Matrix Decomposition: Observing that the normalized link budget parameter $L_B(\vartheta_i)$ and the elementary radiation pattern $g_E(\vartheta_i)$ in Equation (9) depend only on the user index i, and that the phase of the n-th element pattern in Equation (8) depends on both the indices i and n, the channel matrix H can be decomposed as the element-wise product of an amplitude matrix $H_{AMP}$ and a phase matrix $H_{PH}$, both of size $(N_U \times N_T)$ as $$H=H_{AMP} \odot H_{PH}, \quad (17)$$

where $\odot$ indicates the Hadamard product and $$H_{AMP} = \begin{bmatrix} h_{AMP}(1) & \ldots & h_{AMP}(1) \\ \vdots & & \vdots \\ h_{AMP}(N_U) & \ldots & h_{AMP}(N_U) \end{bmatrix}, \quad (18)$$

$$H_{PH} = \begin{bmatrix} h_{PH}(1,1) & \ldots & h_{PH}(1,N_T) \\ \vdots & & \vdots \\ h_{PH}(N_U,1) & \ldots & h_{PH}(N_U,N_T) \end{bmatrix}, \quad (19)$$

with $$h_{AMP}(i)=g_E(\vartheta_i)L_B(\vartheta_i) \quad (20)$$

$$h_{PH}(n,i)=\exp[jk_0(x_n \sin\vartheta_i \cos\phi_i+y_n \sin\vartheta_i \sin\phi_i)]. \quad (21)$$

Using Equation (2), Equation (21) can be rewritten as $$h_{PH}(n,i)=\exp[jk_0(x_n u_i+y_n v_i)]=\exp(jk_0 r_n \cdot u_i), \quad (22)$$

where the operator • represents the scalar product between vectors.

II.C. Precoding and Beamforming Matrices

The complex matrix U represents the generic $(N_T \times N_U)$ precoding/beamforming matrix described as $$U = \begin{bmatrix} u(1,1) & \ldots & u(1, N_U) \\ \vdots & & \vdots \\ u(N_T, 1) & \ldots & u(N_T, N_U) \end{bmatrix}. \quad (23)$$

The j-th column vector of U represents the array beamforming complex weights for the j-th user (user terminal)

$$u_j^c = \begin{bmatrix} u(1, j) \\ \vdots \\ u(N_T, j) \end{bmatrix}. \quad (24)$$

The beamforming weight vector $u_j^C$ normalized to unit magnitude $w_j = u_j^C / \|u_j^C\|$ determines the "shape" of the relevant radiation pattern, $g(\vartheta, \phi) w_j$, for the j-th input.

The overall matrix U can be decomposed into a set of column vectors $$U = [u_1^C \ldots u_{N_U}^C]. \quad (25)$$

In general, the beamforming/precoding matrix U may be seen as a mapping matrix that maps signals intended for $N_U$ user terminals to $N_T$ signals for transmission by respective antenna elements among the $N_T$ antenna elements. The antenna elements of the active antenna array may then be said to be driven in accordance with the beamforming/precoding matrix. Needless to say, the individual antenna elements of the active antenna array may be drivable (controllable) independently of each other.

In the following, the various M-MIMO techniques may be identified by respective subscripts to the matrix U.

1) Matched Filter: The basic principle of the matched filter (MF), which may also be referred to by the term Maximal Ratio (MR), is derived from diversity combining techniques and corresponds to maximization of the realized gain of the array obtained as $$U_{MF} = H^H. \quad (26)$$

It can be observed that for a direct radiating array the i-th row of the phase matrix in Equation (19) corresponds to the array response vector in the i-th user direction. The transpose conjugate operation can be interpreted as the generation of a steering vector such that the corresponding array factor is pointed to the i-th user direction.

2) Switchable Fixed Multi-Beam: Bearing in mind the observation about the correspondence of the MF to beam steering, an approximation of the beamforming vectors can be based on the selection from a pre-defined set of the steering vector with the nearest bore-sight to the user direction. Different criteria can be used to define the set of beam positions uniquely determining the pre-defined steering vectors (e.g., uniform or non-uniform distribution). In the following, a regular sampling of the zone of interest is described based on a lattice of beam positions. As described in section VII, this approach has important implementation complexity advantages. The bi-dimensional lattice of beam positions can be defined in terms of basis vectors $s_1$ and $s_2$ which allow to represent any point of the lattice as a superposition of integer multiples of the basis vectors $s_1$ and $s_2$ defined as $$s_1 = \begin{bmatrix} s_{1u} \\ s_{1v} \end{bmatrix}, s_2 = \begin{bmatrix} s_{2u} \\ s_{2v} \end{bmatrix}, S = [s_1, s_2]$$

Figure 5B:
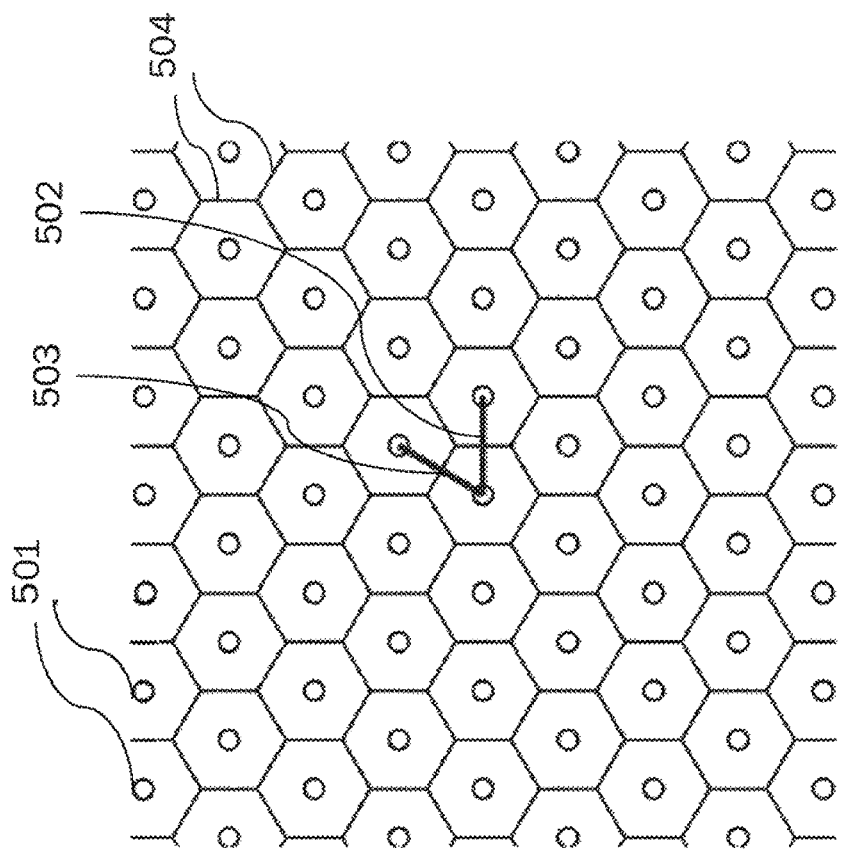
FIG. 5A and FIG. 5B schematically illustrate an example of a beam lattice geometry and a Voronoi tessellation thereof, respectively.
Figure 5A:
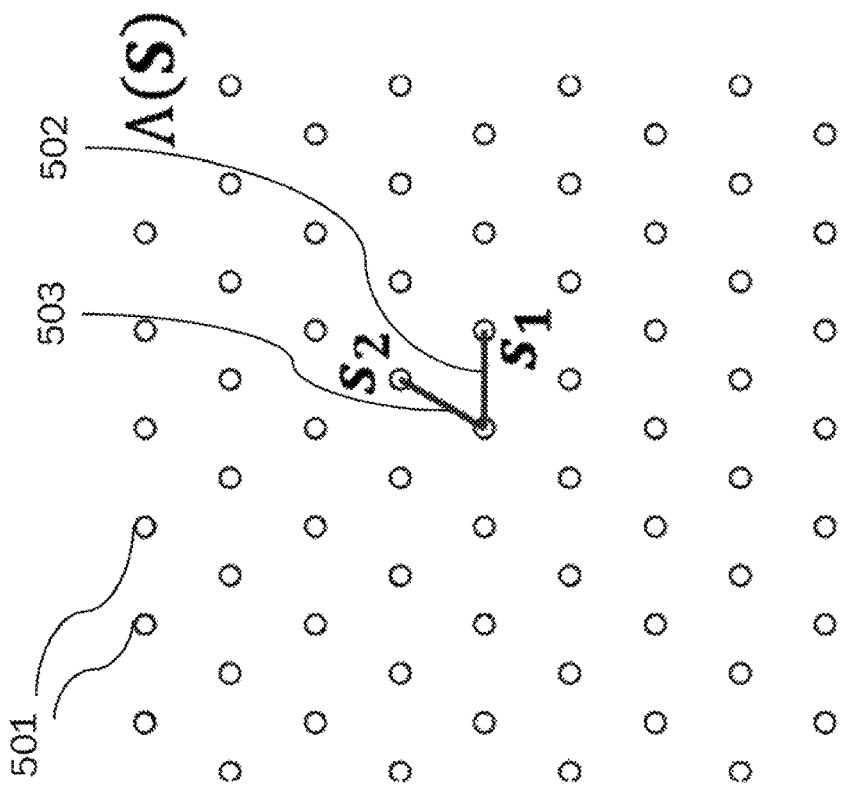

The column vectors $s_1$ and $s_2$ are linearly independent and the matrix S is non-singular. The set of all linear combinations of $s_1$ and $S_2$ with integer coefficients defines the bi-dimensional lattice $\Lambda(S)$. Considering that the main beam gain will decay proportionally to the squared distance from be beam center, the assignment of far field points in the region of interest to the beam with maximum gain will correspond to a Voronoi tessellation of the u,v plane. The concepts of the regular lattice and associated Voronoi tessellation are illustrated in FIG. 5A and FIG. 5B. As can be seen, the lattice $\Lambda(S)$ comprises a plurality lattice vertices 501 corresponding to respective beam centers (beam center locations). Each of these vertices can be characterized by a tuple of integers indicating multiples of the lattice basis vectors $s_1$, 502, and $s_2$, 503. Applying a Voronoi tessellation to the lattice $\Lambda(S)$ yields a plurality of cells 504, one for each lattice vertex 501. Considering that a hexagonal packing of beams offers optimal cross-over performance and reduction of number of beams for a target cross-over level, the lattice of beam centers can be generated by a hexagonal lattice base matrix $S_{MB}$ with beam-to-beam inter-distance controlled by a normalized beam spacing $S_{MB}^n$ referred to the array normalized angular beam-width $\lambda/D_A$ derived as $$S_{MB} = S_{MB}^n \frac{\lambda}{D_A} \begin{bmatrix} 1 & \frac{1}{2} \\ 0 & \frac{\sqrt{3}}{2} \end{bmatrix}. \quad (28)$$

Notably, $\lambda/D_A$ corresponds, for a uniformly excited linear array of size $D_A$, to the first null position and to about 4 dB beam-width (both in u space).

The pre-defined set of beams centers $s_k$ can be evaluated as the intersection of lattice of points $\Lambda(S_{MB})$ and the u,v disk of radius $\sin[\vartheta_{max}(\alpha_{min})]$ as $$\{s_k\} = \Lambda(S_{MB}) \cdot \{|u| \leq \sin[\vartheta_{max}(\alpha_{min})]\}. \quad (29)$$

The set of pre-defined beam centers $\{s_k\}$ plays the role of a code-book in a vector quantization of the u,v region of interest. The bi-dimensional quantizer is defined by the Voronoi partition of the space into non overlapping cells. A user position vector $u_i$ is encoded comparing it with the set of pre-defined beam centers which act as code vectors and assigning it to the closest. The assignment of $u_i$ to $S_k$ can be indicated as the quantization BEAM(i) derived as $$\text{BEAM}(i) = \underset{k}{\text{argmin}} \|s_k - u_i\|^2. \quad (30)$$

Although the process of performing the beam quantization and generation of the associated steering vector is better realized through the cascade of a beam selection matrix and fixed beamforming network or some hybrid beamforming structure (as described in section VII), the resulting precoding/beamforming matrix may be described by the phase matrix $$U_{MB} = \begin{bmatrix} u_{MB}(1,1) & \ldots & u_{MB}(1, N_U) \\ \vdots & & \vdots \\ u_{MB}(N_T, 1) & \ldots & u_{MB}(N_T, N_U) \end{bmatrix}, \quad (31)$$

where the generic (n,j) entry element is given by $$u_{MB}(n,j) = \exp(-jk_0 r_n \cdot s_{BEAM(j)}). \quad (32)$$

In accordance with the above, in embodiments of the disclosure the precoding/beamforming matrix (or mapping matrix) for mapping the signals intended for the selected subset of $N_U$ user terminals to the $N_T$ signals for transmission by respective antenna elements has dimension ($N_T \times N_U$) and comprises one complex (complex-valued) coefficient entry per pair of a given user terminal and a given antenna element. These coefficient entries comprise phase factors that are based on locations $r_n$ of the antenna elements and the locations of the user terminals with respect to the hub station (or with respect to the antenna). In particular, the coefficient entries of the mapping matrix may comprise phase factors that are based on the location of the respective antenna element and an indication of that beam center that is closest to the location of the respective user terminal. This indication may be a vector indicating the beam center, such as a lattice vector, for example.

According to embodiments of the disclosure, the hub station is capable of generating a plurality (e.g., $N_B$) fixed beams. This may be achieved by beamforming, transmitting the resulting signals via the antenna elements of an active array antenna. The beams may have beam centers corresponding to (e.g., arranged at) the vertices of a regular (e.g., hexagonal) lattice. As such, the beams may be equidistant beams. However, the fixed beams may have beam centers arranged in alternative, not lattice-based patterns as well in some implementations. Subsets of active beams, with potentially different subsets for different resource blocks of the RF bandwidth resource, may be selected from the plurality of fixed beams. In some embodiments, the plurality of fixed beams may have a normalized beam spacing between adjacent beams that is smaller than 0.6.

Selection of the subset(s) of active beams may be performed based on the location of user terminals to be served with a given resource block. The user terminals (e.g., a subset of user terminals) to be served may be selected, for example for each resource block, in accordance with a RRM technique (e.g., a RRM technique described in section II.G of the present disclosure). Then, for instance, appropriate beam centers may be determined based on the respective locations of the selected user terminals, and the selected active beams (e.g., one for each selected user terminal) may be those beams that have the determined beam centers. In some embodiments, the active beams (or correspondingly, their beam centers) may be selected from the plurality of fixed beams corresponding to the vertices of the lattice.

For $N_U$ selected user terminals (and correspondingly, $N_U$ selected active beams), the beamforming may be done by the beamforming matrix U, having dimension ($N_T \times N_U$). As an outcome, the hub station may transmit, using the respective radio resource block, radio signals to the $N_U$ selected user terminals, in beams corresponding to the determined beam centers.

3) Zero Forcing: The Zero Forcing (ZF) precoding approach corresponds to the search for the optimum transmit vector $\hat{y}$ at the output of the array which, once received by the users through the channel matrix H, returns the desired transmitted signal x. This can be formulated as the least squares solution to a system of linear equations $$\hat{y} = \operatorname*{argmin}_{y} \|Hy - x\|^2. \tag{33}$$

It is evident that if the channel matrix H is squared and invertible, the solution is obtained by matrix inversion $\hat{y} = H^{-1}x$, and the zero forcing precoding matrix is simply $U_{ZF} = H^{-1}$. The signal to be transmitted is multiplied by the inverse of the channel matrix; the precoding acts as a form of "spatial equalizer" such that the cascade of the precoder and channel matrix returns an equalized channel for each user. By doing so, the effect of noise is completely neglected, creating detrimental effects at low signal-to-noise ratios (SNRs). For non-squared channel matrices the solution of the optimization problem of Equation (33) can be obtained as the stationary point of the cost function to be minimized resulting in the linear solution $\hat{y} = U_{ZF} x$, where $$U_{ZF} = (H^H H)^{-1} H^H. \tag{34}$$

This expression is determined only in case the matrix H is "tall" (i.e., the number of rows exceeds the number of columns) and has full rank (i.e., the Gram matrix $H^H H$ is invertible). It is also known as the left pseudo-inverse of H, as it generalizes the inversion of "tall" full-rank matrices as solution of the least-squares overdetermined linear system in Equation (33). When the matrix H is not full-rank, it must be resorted to the more powerful Moore-Penrose pseudo inverse, which is a unique generalization of the matrix inversion operation. In the following, the Moore-Penrose pseudo inverse will be indicated with a + superscript. The general ZF precoding matrix can be thus expressed as the Moore-Penrose pseudo inverse of the channel matrix $$U_{ZF} = H+, \tag{35}$$

or derived following Equation (34) using the Moore-Penrose pseudo inverse for the inversion of the Gram matrix $H^H H$ $$U_{ZF} = (H^H H)^+ H^H. \tag{36}$$

While Equation (36) is well posed, it hides an intrinsic computational complexity due to the large size and rank deficiency of the Gram matrix $H^H H$. A more efficient form based on the right pseudo inverse and relevant regularization aspects is described in Annex C of the present disclosure.

4) Minimum Mean Square Error: Linear Minimum Mean Square Error (L-MMSE) methods have been first elaborated and developed in the area of linear detection. They are formulated as the solution to the problem of evaluating a linear matrix operator that minimizes some statistical error metrics between the transmitted quantities and their observations. Due to the statistical nature of the optimization problem, knowledge of the covariance matrices of the transmitted signal and noise is necessary. In the hypothesis of independent and identically distributed (IID) random variables, the optimal linear detector has the form $(H^H H + I)^{-1} H^H$. Broadly speaking, precoding matrices of the type $$U_{MMSE} = (H^H H + \lambda I)^{-1} H^H \tag{37}$$

are indicated as linear MMSE precoders. The derivation of Equation (37) and the choice of the optimal $\lambda$ parameter depends on the formulation of the optimization problem. In non-statistical terms, the solution given by Equation (37) can be considered a regularized version of the left pseudo-inverse of Equation (34) where the $\lambda I$ term is added as a perturbation to the Gram matrix $H^H H$ to render it invertible. The parameter $\lambda$ may be optimized according to a Signal to Noise plus Interference (SNIR) criterion. Equation (37) may also be derived as a power constrained MMSE transmit filter where $\lambda$ is the Lagrange multiplier associated to the power constraint. The close relationship to the MMSE detector can be demonstrated in the uplink-downlink duality framework developed for characterizing the sum capacity of the Gaussian Broadcast channel and the resulting optimality condition, $\lambda=1$, will be used in the remainder of the disclosure.

While the MMSE precoder according to Equation (37) does not suffer from rank deficiency, the complexity of its evaluation resides in the size and of the Gram matrix $H^H H$ which derives from a "fat" (i.e., the number of columns exceeds the number of rows) channel matrix H. An equivalent, yet more efficient form, is described in Annex C.

II.D. Precoding Matrices Normalization

The normalization of the precoding/beamforming matrix plays an important role in properly accounting for practical payload limitations such as the per antenna element power limitation affecting the DRA architecture (e.g., the DRA architecture illustrated in FIG. 1). The evaluation of matrix U according to the principles described in section II.C may not satisfy any normalization or power constraint criteria. A normalized precoding/beamforming matrix $\hat{U}$ can then be introduced as $$\hat{U} = \begin{bmatrix} \hat{u}(1,1) & \cdots & \hat{u}(1,N_U) \\ \vdots & & \vdots \\ \hat{u}(N_T,1) & \cdots & \hat{u}(N_T,N_U) \end{bmatrix}. \quad (38)$$

The normalized precoding/beamforming matrix $\hat{U}$, similarly to the un-normalized matrix U, can be decomposed into column vectors $$\hat{U}=[\hat{u}_1^C \ldots \hat{u}_{N_U}^C], \quad (39)$$

where the j-th column vector represents the array complex weights for the j-th user and is given by $$\hat{u}_j^c = \begin{bmatrix} \hat{u}(1,j) \\ \vdots \\ \hat{u}(N_T,j) \end{bmatrix}. \quad (40)$$

Alternatively, $\hat{U}$ can be decomposed into row vectors as $$\hat{U} = \begin{bmatrix} \hat{u}_1^R \\ \vdots \\ \hat{u}_{N_T}^R \end{bmatrix}, \quad (41)$$

where the n-th array component is given by $$\hat{u}_n^R = [\hat{u}(n,1) \ldots \hat{u}(n,N_U)]. \quad (42)$$

Assuming input signals of normalized unitary power, the beamforming delivered power for user j with $1 \leq j \leq N_U$ can be computed as $$\|\hat{u}_j^C\|^2 = \sum_{n=1}^{N_T} |\hat{u}(n,j)|^2. \quad (43)$$

Similarly, the beamforming delivered power for antenna element n with $1 \leq n \leq N_T$ can be computed as $$\|\hat{u}_n^R\|^2 = \sum_{j=1}^{N_U} |\hat{u}(n,j)|^2. \quad (44)$$

Depending on power constraints (e.g., per user or per antenna element constraints), normalization of the precoding/beamforming matrix columns or rows should be introduced. To have a common framework for the normalization, a normalization of the precoding/beamforming matrix to its Frobenius norm is introduced, defined as the square root of the sum of the absolute squares of its elements. The overall precoding matrix squared norm is then given by $$\|\hat{U}\|_F^2 = \sum_{i=1}^{N_T}\sum_{j=1}^{N_U} |\hat{u}(i,j)|^2 = \sum_{j=1}^{N_T} \|\hat{u}_j^R\|^2 = \sum_{i=1}^{N_U} \|\hat{u}_i^C\|^2 \leq 1, \quad (45)$$

such that for a total satellite DRA RF power per carrier $P_T^c$ (where it is assumed that the total DRA available RF power is equally distributed among the frequency slot carriers) the transmitted RF power per TDM carrier will be $$P^c = P_T^c \|\hat{U}\|_F^2 \leq P_T^c. \quad (46)$$

Similarly, the RF power for the j-th user transmitted by the array is given by $$P_j = P_T^c \|\hat{u}_j^C\|^2, \quad (47)$$

and the power transmitted by the n-th antenna element is given by $$P_n = P_T^c \|\hat{u}_n^R\|. \quad (48)$$

The evaluation of the precoding/beamforming matrix U according to the principles of section II.C may not satisfy normalization or power constraints criteria and different strategies can be applied to normalize it while enforcing relevant power constraints.

1) Taricco's per user and antenna element power normalization: The following MIMO precoding matrix normalization was proposed by Taricco for a more conventional single feed per beam payload in G. Taricco, "Linear Precoding Methods for Multi-Beam Broadband Satellite Systems", 20th European Wireless Conference, Barcelona, Spain, pp. 1-6, 14-16 May 2014. This normalization was inspired to ensure that all active users get the same RF power while the per radiating element power limitation is not violated. Analytically this can be formulated as a first normalization such that all the users are allocated an identical transmit power as $$\tilde{U} = \frac{1}{\sqrt{N_T}} U \, \text{diag}\left\{\frac{1}{\|u_1^C\|}, \ldots, \frac{1}{\|u_{N_U}^C\|}\right\}, \quad (49)$$

and as a second rescaling such that the power per row does not exceed the available power per antenna element $$\hat{U} = \text{diag}\{\sigma_1, \ldots, \sigma_{N_T}\}\tilde{U}, \quad (50)$$

with $\sigma_n$, $1 \leq n \leq N_T$ derived as $$\sigma_n = \begin{cases} 1 & \text{if } \|\tilde{u}_n^R\| \leq \frac{1}{\sqrt{N_T}} \\ \frac{1}{\sqrt{N_T} \|\tilde{u}_n^R\|} & \text{if } \|\tilde{u}_n^R\| > \frac{1}{\sqrt{N_T}} \end{cases}. \quad (51)$$

2) Taricco's modified per user and antenna element power normalization: This approach, proposed by the present disclosure, ensures that the DRA power per element is fully exploited at least for one element while the same power is assigned to each user. This was not the case for the original formulation by Taricco, at least for the case of M-MIMO where $N_T > N_U$. The first normalization step is the same as in the previous approach. Then, deviating from the previous approach, the second step of Equation (50) is implemented in two sub-steps as $$\sigma_n^* = \begin{cases} 1 & \text{if } \|\tilde{u}_n^R\| \le \frac{1}{\sqrt{N_T}} \\ \frac{1}{\sqrt{N_T}\|\tilde{u}_n^R\|} & \text{if } \|\tilde{u}_n^R\| > \frac{1}{\sqrt{N_T}} \end{cases},$$

$$\sigma_n = \begin{cases} \sigma_n^* & \text{if } \max_p \|\tilde{u}_p^R\| \ge \frac{1}{\sqrt{N_T}} \\ \frac{1}{\sqrt{N_T} \max_p \|\tilde{u}_p^R\|} & \text{if } \max_p \|\tilde{u}_p^R\| < \frac{1}{\sqrt{N_T}} \end{cases}. \quad (52)$$

In this way it is enforced that the $\hat{U}$ precoding/beamforming matrix largest antenna element norm is equal to $1/\sqrt{N_T}$. This ensures that the DRA power dynamic range is fully exploited.

3) CTTC's per user and antenna element power normalization: This approach was proposed in X. Artiga, M. A. Vazquez, A. Perez, "Large Scale Multi-Antennas over Satellite", ESA SatNex IV Report WI 4.5, May 2019 as a variation of Taricco's normalization proposal. The main difference is that after normalizing the U precoding matrix per user, this approach also normalizes per antenna element norm for all elements to exploit all the RF power available in the DRA, at the expense of co-channel interference mitigation. Also in this case the first step corresponds to a normalization of the columns to a constant power per user as done in Equation (49), while the second step of Equation (50) is implemented with $\sigma_n$, $1 \le n \le N_T$, derived as $$\sigma_n = \frac{1}{\sqrt{N_T} \|\tilde{u}_n^R\|}, \quad (53)$$

which corresponds to a normalization of all the row vectors to $1/\sqrt{N_T}$.

II.E. Figures of Merit Calculations

1) Power Transfer, SNR, INR, and SNIR Calculations: The units and the normalization of the channel matrix H and of the precoding/beamforming matrix $\hat{U}$ are such that the power transmitted for the user j and received by the user i, normalized to the noise power can be evaluated as the power transfer coefficient s(i,j) computed as $$s(i,j) = P_T^c |h_i^R \hat{u}_j^C|^2, \quad (54)$$

which can be arranged in a $(N_U \times N_U)$ normalized power transfer matrix S with elements $$S = \begin{bmatrix} s(1,1) & \cdots & s(1, N_U) \\ \vdots & & \vdots \\ s(N_U, 1) & \cdots & s(N_U, N_U) \end{bmatrix}. \quad (55)$$

Introducing the element-wise absolute square matrix operator $|\cdot|^2$ so that $B = |A|^2$ returns a matrix B of the same dimension as A and entries equal to the absolute square of the entries of A, $b(i,j) = |a(i,j)|^2$, the normalized power transfer matrix S can be written as $$S = P_T^c |H\hat{U}|^2. \quad (56)$$

Using Equation (1), the M-MIMO signal-to-noise, interference-to-noise, and signal-to-noise plus interference ratios for the i-th user can be derived from relevant entries of the matrix S, respectively, as $$SNR^M(i) = s(i,i), \quad (57)$$

$$INR^M(i) = \sum_{j=1, j \ne i}^{N_U} s(i,j), \quad (58)$$

$$SNIR^M(i) = \frac{s(i,i)}{1 + \sum_{j=1, j \ne i}^{N_U} s(i,j)} = \frac{SNR^M(i)}{1 + INR^M(i)}. \quad (59)$$

The diagonal entries of the matrix S thus represent the useful part of the transmission corresponding to the signal-to-noise-ratio. All the off diagonal elements are unwanted contributions that should be minimized. Taking the elements of the i-th row, with the exclusion of the diagonal element, the aggregate interference-to-noise ratio experienced by the i-th user can be obtained. On the other hand, taking the i-th column, the off-diagonal elements represent the power of the patterns for the i-th user leaking into undesired directions normalized to the noise power. The matrix S is generally non-symmetric.

2) Throughput Calculation: The system throughput can be evaluated from the signal-to-noise plus interference ratio experienced by user i derived in Equation (59). The average system throughput $\bar{T}$ is computed as the expectation over $N_{trials}$ users' realizations of the aggregated throughput $\Sigma_{i=1}^{N_U} T(i)$ summing all users' throughput contributions at each Monte Carlo realization of the users' distribution over the ROI. This can be formulated as $$\bar{T} = E\left\{\sum_{i=1}^{N_U} T(i)\right\}, \quad (60)$$

where the i-th user Shannon throughput can be computed as $$T^S(i) = R_s \log_2(1 + SNIR(i)). \quad (61)$$

Further, assuming the use of the DVB-S2X standard, the i-th user throughput is derived as $$T^{S2x}(i) = R_s \eta_{S2X}(SNIR(i)), \quad (62)$$

where the function $\eta_{S2X}$ maps the DVB-S2X standard spectral efficiency as a function of the individual user SNIR dubbed $SNIR_i$. Details about the $\eta_{S2X}$ function can be found in Annex A of the present disclosure.

3) Outage Probability Calculation: The outage probability for a specific M-MIMO or beamforming technique can be derived as $$P_{out} = \frac{N_{out}}{N_{TOT}}, \quad (63)$$

where $N_{out}$ corresponds to the number of events for which $SNIR_i < SNIR_{min}$. The minimum SNIR value $SNIR_{min}$ corresponds to the minimum signal-to-noise plus interference ratio at which the adaptive physical layer can decode a frame with acceptable frame error rate probability. $N_{TOT}$ represents the total number of simulated link events, i.e. $N_{TOT} = N_U \cdot N_{trials}$, where $N_{trials}$ corresponds to the number of Monte Carlo trials. Since the atmospheric fading attenuation is neglected as per section II.B.4, the M-MIMO outage refers to AWGN and co-channel interference effects only.

II.F. Color Frequency Reuse

In the above formulation applicable to the M-MIMO case it has been assumed that all the active users (user terminals) share the same frequency and polarization and said resource has been indicated as carrier. The active antenna RF power available for the carrier under consideration is termed $P_T^c$. In general, the satellite payload may transmit an integer number of carriers in the allocated bandwidth and polarization(s) and the total satellite RF power $P_T$ must be split between the carriers (see section VI for more details).

The beam assignment formulation of section II.C.2 can be extended to the use case of multibeam satellite systems with color frequency reuse, allowing a seamless assessment of system throughput and outage performance. As per section II.C.2, a hexagonal lattice of beams generated by a hexagonal lattice base matrix $S_{MB}$ with beam-to-beam interdistance defined by the normalized beam spacing $S_{MB}^n$ may be considered. While the overall lattice $\Lambda(S_{MB})$ is infinite, the $N_B$ useful beams (from which the active beams can be selected) are defined by the set of beams centers within the u,v disk of radius $\sin(\vartheta_{max})$ as per Equation (29).

Considering that the co-frequency beams satisfy periodicity conditions, the mathematical tool of sub-lattices can be used to identify co-frequency beams. A sub-lattice of $\Lambda(S_{MB})$ can be defined by mean of an integer non-singular matrix M and is given by $\Lambda(S_{MB}M)$ $$\Lambda(S_{MB}M) = \Lambda(S_{MB})M. \tag{64}$$

The matrix $S_{MB}M$ plays the role of a vectorial base for the lattice $\Lambda(S_{MB}M)$, which for the present purpose will identify the lattice of beams sharing the same frequency with the one at the origin. For simplicity, a lattice of beams having a central beam pointing at the center of the u,v coordinates may be considered. A different configuration is easily obtained by means of a trivial translation and will not be discussed further. Given $S_{MB}M$, it is possible to introduce the "vectorial modulo" operation described in P. Angeletti, "Simple Implementation of Vectorial Modulo Operation based on Fundamental Parallelepiped", Electronics Letters, Vol. 48, No. 3, pp. 159-160, February 2012. Two vectors in $\Lambda(S_{MB})$ are said to be congruent modulo $S_{MB}M$ if their difference belongs to $\Lambda(S_{MB})$. The vectorial modulo operation can be used to induce on $\Lambda(S_{MB})$ a set of equivalence classes in number equal to $|\det(M)|$, called the index of $\Lambda(S_{MB})$ in $\Lambda(S_{MB}M)$. Each equivalence class is a shifted version of $\Lambda(S_{MB}M)$. For further details reference is made to P. Angeletti, "Multiple Beams From Planar Arrays", IEEE Transactions on Antennas and Propagation, Vol. 62, No. 4, pp. 1750-1761, April 2014.

In the present context $|\det(M)|$ identifies the number of different colors $N_C$, $N_C = |\det(M)|$, and M the coloring base. Two beams of the lattice $\Lambda(S_{MB})$ with pointing direction $s_k$ and $s_l$ are co-frequency if and only if $$(s_k - s_l) \bmod (S_{MB}M) = 0. \tag{65}$$

As an example, the following non-unique coloring bases $M_3$ and $M_4$ generate 3 and 4 colors frequency reuse patterns, $$M_3 = \begin{bmatrix} 1 & -1 \\ 1 & 2 \end{bmatrix}, \tag{66}$$

$$M_4 = \begin{bmatrix} 2 & 0 \\ 0 & 2 \end{bmatrix}, \tag{67}$$

Figure 6B:
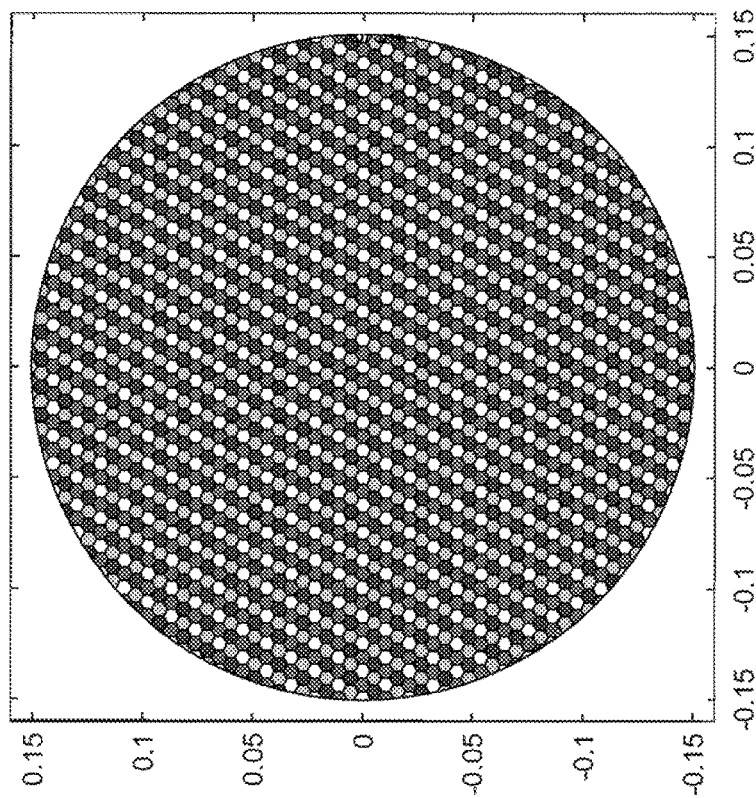
FIG. 6A and FIG. 6B show examples of coverage assignments for beam lattices associated with coloring bases for three and four colors frequency reuse schemes, respectively.
Figure 6A:
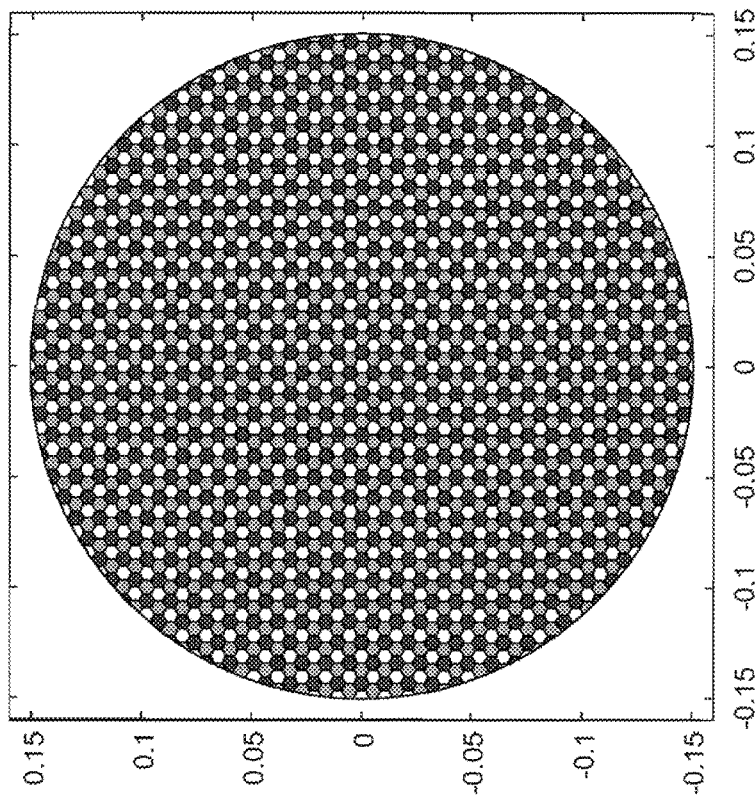

FIG. 6A and FIG. 6B show the relevant coverage assignment for beam lattices associated with the $M_3$ and $M_4$ coloring bases, respectively, based on best gain criteria.

The precoding/beamforming matrix generating the beam lattice is described by the $(N_T \times N_B)$ phase matrix $$U_{CFR} = \begin{bmatrix} u_{CFR}(1, 1) & \cdots & u_{CFR}(1, N_B) \\ \vdots & & \vdots \\ u_{CFR}(N_T, 1) & \cdots & u_{CFR}(N_T, N_B) \end{bmatrix} \tag{68}$$

where the generic (n,k) entry element is $$u_{CFR}(n,k) = \exp(-jk_0 r_n \cdot s_k). \tag{69}$$

It can now be assumed that for the k-th beam, COL(k) represents the assigned color number, $1 \leq c \leq N_C$, and a beam coloring matrix $C_B$ of size $(N_B \times N_C)$ can be introduced, with binary entries $$C_B = \begin{bmatrix} c_B(1, 1) & \cdots & c_B(1, N_C) \\ \vdots & & \vdots \\ c_B(N_B, 1) & \cdots & c_B(N_B, N_C) \end{bmatrix}, \tag{70}$$

where $$c_B(k, l) = \begin{cases} 1 & \text{if } COL(k) = l \\ 0 & \text{otherwise} \end{cases}. \tag{71}$$

The matrix product of $C_B$ with its transpose $C_B^T$ generates the co-frequency beam matrix $X_B$ of size $(N_B \times N_B)$ whose binary entries are true (e.g., "1") if the beams corresponding to the row and column indexes share the same frequency. The matrix $C_B$ can be computed as $$X_B = C_B C_B^T, \tag{72}$$

with $$X_B = \begin{bmatrix} x_B(1, 1) & \cdots & x_B(1, N_B) \\ \vdots & & \vdots \\ x_B(N_B, 1) & \cdots & x_B(N_B, N_B) \end{bmatrix}, \tag{73}$$

where $$x_B(p, q) = \begin{cases} 1 & \text{if } COL(p) = COL(q) \\ 0 & \text{otherwise} \end{cases}. \tag{74}$$

The matrix $X_B$ is symmetric with unit diagonal elements and can be used in conjunction with the user-to-beam assignment function BEAM(i) to identify co-frequency users. For this purpose, the co-frequency beam matrix $X_B$ of size $(N_B \times N_B)$ needs to be mapped to a co-frequency user matrix $X_U$ of size $(N_U \times N_U)$ described as $$X_U = \begin{bmatrix} x_U(1, 1) & \cdots & x_U(1, N_U) \\ \vdots & & \vdots \\ x_U(N_U, 1) & \cdots & x_U(N_U, N_U) \end{bmatrix}. \tag{75}$$

The mapping of $X_B$ to $X_U$ consists of assigning the value of $x_B(p,q)$ to $x_U(i,j)$, with p=BEAM(i) and q=BEAM(j), computed as $$x_U(i, j) = x_B(\text{BEAM}(i), \text{BEAM}(j)) \quad (76)$$

$$= \begin{cases} 1 & \text{if } COL(\text{BEAM}(i)) = COL(\text{BEAM}(j)) \\ 0 & \text{otherwise} \end{cases}.$$

In other words, the element $x_U(i,j)$ of the co-frequency user matrix $X_U$ is equal to one when the i-th user and the j-th user are assigned to co-frequency beams, zero otherwise.

The co-frequency user matrix $X_U$ is itself a symmetric matrix with unit diagonal elements and has the same dimensions of the power transfer matrix S. They can be combined by means of the Hadamard product in a resulting co-frequency power transfer matrix $S_{CFR}$ which takes into account frequency assignments. The matrix $S_{CFR}$ can be computed as $$S_{CFR} = X_U \odot S. \quad (77)$$

The CFR signal-to-noise, interference-to-noise, and signal-to-noise plus interference ratios for the i-th user can be derived from relevant entries of the matrix $S_{CFR}$, respectively, as $$SNR^C(i) = s(i, i) \quad (78)$$

$$INR^C(i) = \sum_{j=1, j \ne i}^{N_U} x_U(i, j) s(i, j), \quad (79)$$

$$SNIR^C(i) = \frac{s(i, i)}{1 + \sum_{j=1, j \ne i}^{N_U} x_U(i, j) s(i, j)} = \frac{SNR^C(i)}{1 + INR^C(i)}. \quad (80)$$

It is worth noting that to be coherent with the normalization of the precoding/beamforming matrix $\|\hat{U}\|_F^2$, and considering that the normalized matrix $\hat{U}$ collects the steering vectors of all the active beams for all the considered colors, the power transfer coefficient s(i,j) must account for the total available power $P_T$ for the set of considered colors as follows $$s(i,j) = P_T |h_i^R \hat{u}_j^C|^2, \quad (81)$$

$$S = P_T |H\hat{U}|^2. \quad (82)$$

The total capacity for the set of considered beams and colors can be evaluated according to the formulation in section II.E.2, for example.

II.G. Radio Resource Management Aspects

The formulation developed for the assessment of the system performance with a colored frequency assessment constitutes a useful framework for addressing the general problem of resource management in a M-MIMO system and is prone to further generalizations. This framework can be used for selecting a subset of user terminals that should be simultaneously served (i.e., with the same resource block), in the sense that the selection is performed by mapping the user terminals to radio resource blocks (e.g., by a radio resource mapping matrix) and taking the user terminals that are mapped to a given (same) radio resource block as the subset of user terminals.

In a real operational scenario, the user distribution is an uncontrollable input with non-uniform statistical distribution and possible clustering due to hot spots in areas of high user density. Still the users can be assigned to different radio resources (e.g., time slots and/or frequency carriers) in a manner that maximizes the overall throughput.

On one hand, analyzing the power transfer matrix S, it can be recognized that the off-diagonal coefficients s(i,j) have a detrimental effect in that they increase the interference experienced by the i-th user. M-MIMO techniques aim at reducing the interference by properly shaping the precoding matrix $\hat{U}$ but, especially for closely spaced users, the precoding has reduced efficiency due to the limited antenna resolution capability and due to the detrimental effect on the wanted user gain. On the other hand, assigning the users to different resource blocks (e.g., time/frequency slots) nulls their reciprocal interference. As shown in section II.F, this effect can be modelled with a generalized co-channel matrix X for which a unit entry identifies the assignment of the same resource to the users with relevant row and column indexes.

Given a power transfer matrix S, the resource management problem can be cast into a color assignment problem (e.g., in terms of time or frequency resources, where resources TDM time slicing is the preferred approach for M-MIMO when full frequency reuse is assumed) which for numerical tractability is formulated as a 0-1 integer programming instance on the coloring matrix binary entries. In the following, the number of colors C will be considered to be preassigned such that the binary coloring matrix C is of size (N×C), with N the total number of users (not to be confused with the number of active users $N_U$, $N_U \le N$)

$$C = \begin{bmatrix} c(1, 1) & \cdots & c(1, C) \\ \vdots & & \vdots \\ c(N, 1) & \cdots & c(N, C) \end{bmatrix}. \quad (83)$$

This matrix C may be seen as a mapping matrix for mapping the plurality of user terminals to respective colors. In general, the present framework can be used for deriving a radio resource mapping (or radio resource mapping matrix) for mapping the plurality of user terminals to a set of radio resource blocks. The elements of the radio resource mapping matrix may be either 0 or 1.

Considering that the i-th user can be assigned only to one color, the rows of C must satisfy the following linear constraint corresponding to one user per color $$\sum_{j=1}^{C} c(i, j) = 1 \; \forall i. \quad (84)$$

The matrix product of C with its transpose $C^T$ generates the co-channel matrix X of size (N×N) with unit entries if the users corresponding to the row and column indexes share the same color, $$X = CC^T. \quad (85)$$

Considering that the central target of the color assignment is the reduction of the mutual interference, attention may be focused on the off-diagonal elements of the power transfer matrix introducing its diagonally null part Q, which may be briefly termed as the interference matrix. This interference matrix may be based on mutual distances on ground between the user terminals among the plurality of terminals, for example.

Thus, in general, selecting the subset of user terminals may be based on an obtained set of quantities indicating mutual radio interferences between pairs of user terminals among the plurality of user terminals. In some embodiments, the set of quantities indicating mutual radio interferences can be determined based on mutual distances on ground between the terminals among the plurality of terminals. This helps to avoid the necessity to perform signal/interference measurements with respect to the user terminals. Further, in some embodiments, obtaining the aforementioned set of quantities may amount to obtaining an interference matrix (e.g., the interference matrix Q) that indicates mutual radio interferences between pairs of user terminals among the plurality of user terminals.

The aforementioned interference matrix can be written as $$Q = S - \text{diag}\{\text{diag}(S)\}, \tag{86}$$

$$q(i, j) = \begin{cases} 0 & \text{if } i = j \\ s(i, j) & \text{if } i \neq j \end{cases}, \tag{87}$$

where the diag{•} operator is defined to return a vector with the diagonal elements of a square matrix, and to return a diagonal square matrix if applied to a vector, with the elements of the vector as the diagonal elements of the matrix, and vice versa. This is in accordance with the MATLAB notation for this operator.

The co-channel matrix X acts on the interference matrix Q as selector of the co-channel interference entries. Their Hadamard product, X⊙Q, returns the co-channel interference contributions that must be accounted for in the interference-to-noise ratio (INR) performance assessment as $$INR(i) = \sum_{j=1}^{N} x(i, j) q(i, j). \tag{88}$$

The aggregated co-channel interference, evaluated as the total interference-to-noise ratio $INR_T$, can be assumed as a figure of merit of the overall performance and satisfies the following definition $$INR_T = \sum_{i=11}^{N} INR(i) = \sum_{i=1}^{N} \sum_{j=1}^{N} x(i, j) q(i, j). \tag{89}$$

In matrix form, $INR_T$ can be written as $$INR_T = 1^T (Q \odot X) 1, \tag{90}$$

where the (N×1) vector 1 has all unit entries.

Vectorizing the matrix C of size (N×C) into a column vector vec(C) of size (NC×1) obtained by stacking the columns of C on top of each other as $$vec(C) = [c(1,1), \ldots, c(N,1), \ldots, c(1,C), \ldots, c(N,C)]^T, \tag{91}$$

and exploiting appropriate matrix identities, the aggregated co-channel interference can be formulated as a quadratic form on the column vector vec(C) (see Appendix B for details) as $$INR_T = tr(C^T Q C) = (vec(C))^T (I \otimes Q) vec(C). \tag{91a}$$

The resource management problem can be thus cast in a Mixed Integer Quadratic Programming (MIQP) problem with the form $$\text{minimize } [vec(C)]^T (I \otimes Q) vec(C) \tag{92}$$

$$\text{subject to } \sum_{j=1}^{C} c(i, j) = 1, i = 1, \ldots, N$$

$$c(i, j) \in \{0, 1\}, i = 1, \ldots, N; j = 1, \ldots, C.$$

In general, the radio resource mapping for mapping the plurality of user terminals to the set of radio resource blocks is based on the aforementioned set of quantities and applies the constraint that each user terminal is mapped to exactly one among the set of radio resource blocks. In some embodiments, this amounts to determining a radio resource mapping matrix that maps the plurality of user terminals to a set of radio resource blocks, by minimizing a quantity derivable from a matrix product of a transpose of the radio resource mapping matrix (e.g., matrix C), the interference matrix (e.g., matrix Q), and the radio resource mapping matrix, applying the constraint that each user terminal is mapped to exactly one among the set of radio resource blocks. The aforementioned quantity may be the trace, in accordance with Equation (91a).

Several techniques are known for solving MIQP problems in exact or sub-optimal manner. An efficient heuristic approach has been proposed in P. Angeletti, J. C. Lizarraga Cubillos, Method and a system of providing multi-beam coverage of a region of interest in multi-beam satellite communication, U.S. Pat. No. 9,654,201, filed on 27 Feb. 2012, in the context of a beam coloring problem which can be easily extended to the present general problem.

In case of non-uniformly distributed traffic density, the amount of colors (or radio resource blocks) assigned to a hot spot may be larger compared to a uniform traffic case. This may require an optimization of the granularity of TDM slots duration to best cope with the traffic distribution. When there is high traffic concentration, it may be preferable to use shorter time slots in the frame as there are fewer users that can be separated at the same time (i.e., user separation is less efficient). Thus, it may be better to increase the amount of time slices (slots, or radio resource blocks in general) with fewer users served within each. On the other hand, when the traffic is more uniform, longer slots accommodating more users can be used, as the users can be separated to a sufficient degree. Another possible dimension to exploit for coping with non-uniform traffic is the number of frequency slots, hence power dedicated to hot spots.

In case of non-uniform spatial traffic distribution, the proposed solution and payload architecture described in section VII may support beam-hopping solutions. When applying beam-hopping, the generation of beams can be limited to the active user areas while neglecting the areas where there are no users to be served.

In general, the granularity of the subdivision of the radio resource into radio resource blocks may be non-uniform (i.e., spatially dependent). In particular, the granularity of the subdivision may depend on a spatial density of user terminals within in the ROI. Smaller radio resource blocks (e.g., shorter time slots or more narrow frequency slots) may be used for areas with higher density of user terminals, whereas larger radio resource blocks (e.g., longer time slots or broader frequency slots) may be used for areas with lower density of user terminals.

Some comments may be in order regarding the self-consistency of the optimization. In particular, it should be noted that the matrix Q, which collect the mutual interference terms, is evaluated on the base of a given precoding/beamforming matrix. For ZF and MMSE, the precoding accounts for the co-channel interference and the resource management and precoding calculation are interlinked. A possible approach would consist in an iterative optimization of the precoding and resource management but its convergence is not guaranteed and additional complexity is added to the precoding evaluation process. Instead, for the MF and MB approaches, which take into account only the information on the desired user (i.e. channel matrix row and user position, respectively), the precoding/beamforming evaluation and the resource management are decoupled problems that can be solved independently.

Finally, an a priori evaluation of the interference matrix Q based on the mutual distance is possible and is proposed as an effective solution to the resource management problem. Neglecting the element gain variation $g_E(u,v)$ in Equation (8) and considering the uniform tapering with the normalized array complex weights $$w = \frac{1}{\sqrt{N_T}},$$

where the ($N_T \times 1$) vector 1 has all unit entries, using Equations (7), (8), and (22) a normalized array gain $g_A(u,v)$ can be introduced for the nadir prototype beam $$g_A(u, v) = \frac{1}{\sqrt{N_T}} \sum_{n=1}^{N_T} \exp[jk_0(x_n u + y_n v)]. \quad (94)$$

The normalized interference term $q_0(i,j)$ can be thus evaluated as $$q_0(i,j) = |g_A(u_i - u_j, v_i - v_j)|^2. \quad (95)$$

Considering that the strong mutual interference is due to close spacing of the users, a Gaussian beam pattern approximation, with 4 dB beam-width corresponding to the array $D_A/\lambda$ can be used. Alternatively antenna masks based on different beam zones (e.g., main beam, first sidelobes, far sidelobes) can also be used for the interference dependency on the antenna pattern.

In the following, a further interference model simplification is adopted to derive a RRM approach dubbed Minimum Distance MIQP (MD-MIQP RRM). It is assumed that the co-channel interference is dominated by the adjacent beams pattern whose envelope is related to the users' distance with an intensity monotonically decaying with the distance (e.g., inversely proportional to the squared distance). The validity of this approximation is linked to the decay of sidelobes of radiation patterns of uniformly illuminated apertures. As an example, the voltage pattern of an uniform linear aperture of size $D_A$ is $\sin(k_0 u D_A)/k_0 u$. Due to the limitedness of the oscillating sinusoidal term, the power pattern envelope is bounded by $1/(k_0 u)^2$, which is consistent with the inversely squared distance proportionality.

As a consequence, the RRM optimization aims to guarantee that the normalized users' minimum distance $\rho_{min}$ is larger than a value to be experimentally derived by optimizing the throughput. Once this optimum $\rho_{min}$ value has been found, also the number of user which can be simultaneously served per slice is known. This allows to derive the number of resource blocks (e.g., (time) slices) required to serve the overall users' population.

Figure 7A:
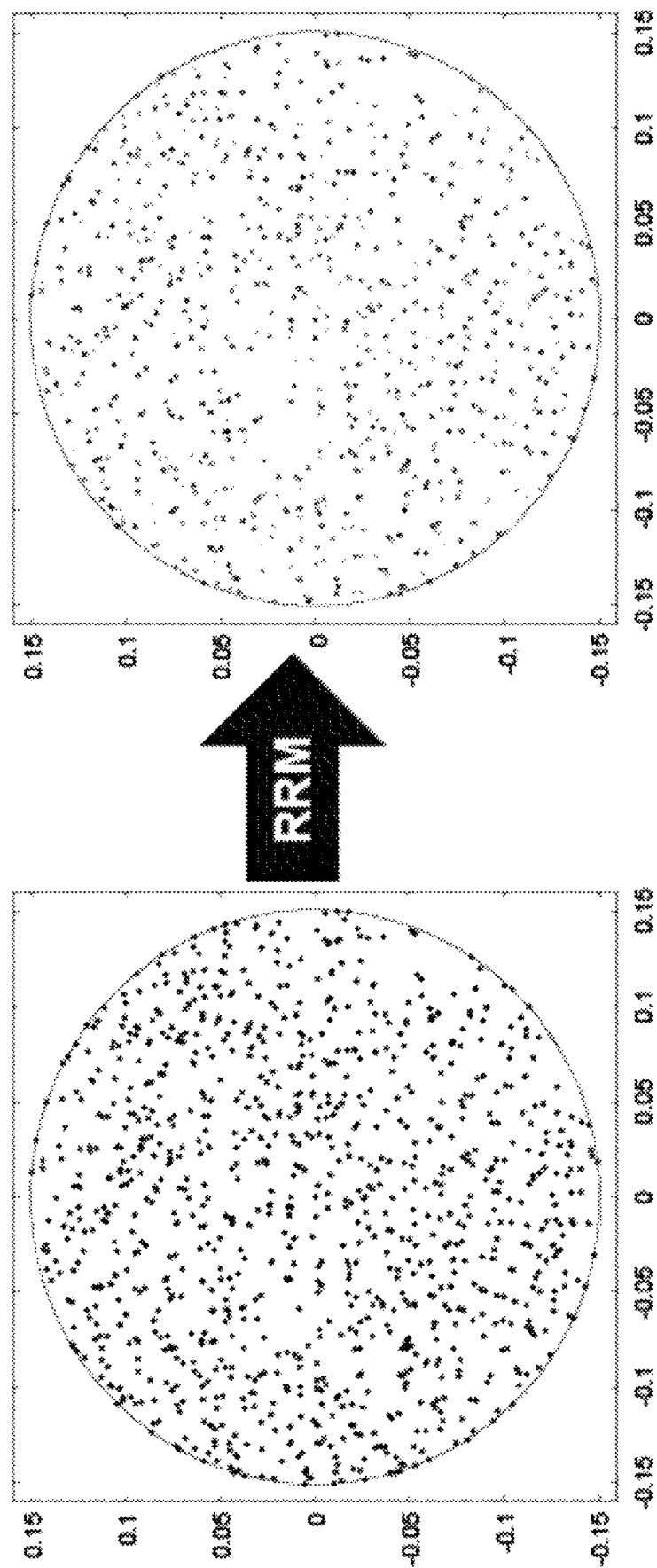
FIG. 7A and FIG. 7B schematically illustrate an example of radio resource slicing and partitioning a plurality of users in accordance with the radio resource slicing.
Figure 7B:
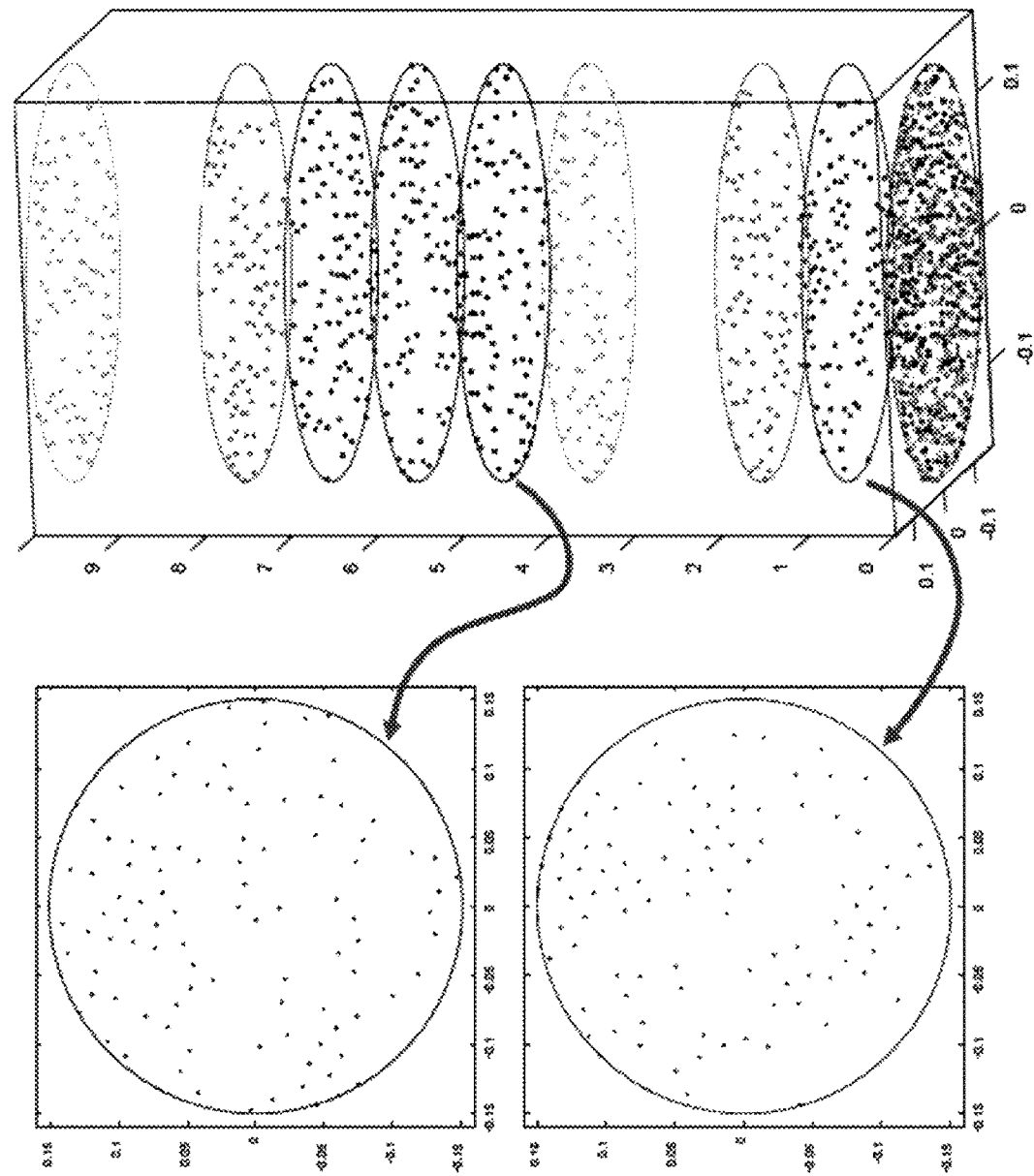

An example of resource slicing with the proposed MD-MIQP RRM is shown in FIG. 7A and FIG. 7B for a number of colors (or resource blocks, e.g., time slices) C=10. The algorithm is run on a population of users uniformly distributed, which are illustrated as the black dots in the left panel of FIG. 7A. By the algorithm, each user is assigned to a color (or resource block in general) out of the ten available colors. This is illustrated by the dots of different shades in the right panel of FIG. 7A. This partitioning of users into several subgroups (or subsets), each subgroup to be served in a different resource block, is also illustrated in FIG. 7B, of which the right side shows the several subgroups, and the left side gives examples of two of these subgroups. Plotting the distribution of users sharing the same color as done on the left side of FIG. 7B, identifiable as a resource slice (or resource block), it can be noticed that the users for each resource slice exhibit a minimum distancing. In the following statistical analysis of capacity, the users' distributions will be generated per resource slice satisfying a minimum distancing by mean of the described Poisson circle distribution.

While the above description mainly relates to assignment of users (user terminals) to colors, it should be understood to likewise relate to any feasible partitioning of the RF resource, for example into resource blocks, and to an assignment of the users to these resource blocks. For instance, the radio resource blocks may be time slots (consecutive or non-consecutive), frequency slots, pseudo-random spreading sequences, polarization modes, or combinations thereof. Apart from that, the frequency of transmission (or color) may be fixed for each beam. In some implementations, the same frequency of transmission (or color) may be used for all beams. In some other implementations, a frequency reuse scheme or CFR scheme as detailed above may be applied so that adjacent beams (e.g., adjacent beams among the plurality of fixed beams) are used for transmission at different frequencies. In other words, the partitioning of the RF resource into resource blocks may be used in isolation or combined with a CFR scheme as detailed above (e.g., a 3CFR or a 4CFR scheme), or any other feasible CFR scheme.

In any case, the above techniques for assigning users to colors can be readily applied for assigning the users to respective resource blocks. For example, such user assignment may be performed for each of a plurality of resource blocks. This may be said to correspond to selecting, for each of the plurality of radio resource blocks, a subset of user terminals among the plurality of user terminals. Then, as noted above, this would further involve, for each user terminal among the subset of user terminals, determining a beam center based on a location of the respective user terminal, and transmitting, using the respective radio resource block, radio signals to the user terminals among the selected subset of user terminals, in beams corresponding to the determined beam centers. Since the subsets of user terminals are selected for each radio resource block, this may entail switching between different sets of active beams from one radio resource block to another, in accordance with subsets of user terminals selected for respective radio resource blocks.

III. M-MIMO PERFORMANCE ANALYSIS

III.A. M-MIMO System Parameters

A number of reference configurations has been selected for assessing the M-MIMO performance, based on a geostationary (GEO) satellite assumption with two different DRA sizes. The GEO orbit selection is arbitrary as the provided model is also applicable to other satellite orbits. However, techniques like MF, ZF, and MMSE will be even more challenging to implement for non GEO cases due to increased link dynamic conditions. Table I summarizes an example of the key system parameters adopted for the following numerical simulations. When a range of values is specified, it means that the sensitivity to this specific parameter has been optimized in the specified range.

TABLE I

Simulation system parameters

| Parameter | Symbol | Value | Unit |
|---|---|---|---|
| Number of Monte Carlo Trials | $N_{trials}$ | 10-30 | |
| Carrier frequency | $f_0$ | 20.0 | GHz |
| User baud rate | $R_s$ | 500.00 | Msymb/s |
| Total payload RF power per carrier | $P_T^c$ | 2.0-4.0 | kW |
| Minimum ACM physical layer SNIR | $SNIR_{min}$ | −10.00 | dB |
| User minimum spacing coefficient | | 1.10 | |
| Minimum satellite elevation angle | $\alpha_{min}$ | 5.00 | degrees |
| Array size | $D_A$ | 1.2-2.0 | m |
| Array element aperture efficiency | $\eta_E$ | −1 | dB |
| Array elements normalized spacing | $d_A/\lambda$ | 1.4-2.6 | |
| MB normalized beam spacing | $S_{MB}^n$ | 0.2-1.0 | |
| Number of array elements | $N_T$ | 2025-9025 | |
| Number of feeds/users ratio | $N_T/N_U$ | 1-6 | |
| Number of simultaneous active users | $N_U$ | 405-1805 | |
| Normalized MD-MIQP RRM minimum distance | $\rho_{min}$ | 0.8-1.2 | |
| Earth radius | $R_E$ | 6378 | km |
| Orbit height | $h_s$ | 35780 | km |
| User terminal antenna gain | $G_R^U$ | 41.45 | dBi |
| User terminal antenna noise temperature | $T_R^U$ | 224.5 | K |

III.B. M-MIMO Numerical Results

The results reported in the following are organized in four main classes: medium and large array size each subdivided in reduced and relaxed array element spacing. For each class also two levels of RF power are considered to assess its impact on the system performance. The two array size classes allow to understand the advantages of scaling the array physical size while keeping the same RF power. For each class, two sub-classes have been investigated, i.e., reduced and relaxed array spacing. The reduced array spacing was selected to obtain a relatively high ratio for the number of array feeds versus the number of active users (e.g. ≥5) to comply with M-MIMO typical assumptions. The relaxed spacing, still compliant with the need to keep the grating lobes outside the coverage area, was investigated to assess the performance impact of a reduction in the number of array elements. In this case, seeking for optimum performance, $N_T/N_U$ has been reduced down to 1. However, 2 or a value close to that may be selected as a preferred value.

1) Medium Size Array with Reduced Spacing: In section II.D different approaches for normalizing the precoding matrix norm have been described. As a first step, the best solution has been investigated, considering the fact that the total satellite DRA RF power $P_T^c$ is limited and that the DRA array element power is also bounded by the individual HPAs' maximum operating power in multicarrier conditions $P_A^{max}$ with $P_A^{max}=P_T^c/N_T$. Simulation results are summarized in Table II for Shannon throughput and in Table III for the DVB-S2X physical layer. It is apparent that the approach proposed by CTTC provides the best performance for all M-MIMO schemes. In particular, as mentioned before, by ensuring that all DRA HPAs are driven at the same power level, it guarantees the maximum use of the available RF power in particular for ZF and MMSE M-MIMO. Overall, the CTTC throughput improvement compared to the one obtainable by Taricco normalization is more than 200% for ZF and MMSE and at least 230% for MF/MB. For the modified Taricco normalization the CTTC improvement reduces to 9% for MF/MB, to 13% for ZF, and to 16% for MMSE. This means that the benefit resulting from the extra RF power made available by the CTTC normalization is superior to the reduction in co-channel interference mitigation allowed by the modified Taricco approach. This finding holds true also for $P_T^c$=4 kW. Also the impact of removing the first step in the power normalization corresponding to imposing an equal power allocation per user has been investigated. It was found that removing this condition has no visible impact for MF, MB, and MMSE techniques, while it worsens the ZF performance.

Based on the above findings, without intended limitation, CTTC power normalization will be adopted for the remainder of the performance analysis, since it may be the best performing normalization scheme for the scenarios at hand.

As explained in section II.G, a minimum distance algorithm has been proposed as an alternative to uniform random user distribution, to optimize the M-MIMO performance both in terms of throughput maximization and outage minimization. As first step, the normalized minimum distance has been optimized (see section II.G) and an optimum normalized distance value of $\rho_{min}$=1.1 has been found. This finding has been confirmed also for the case of 4 kW payload power and relaxed spacing.

TABLE II

Simulated M-MIMO Shannon throughput for a
1.2 × 1.2m DRA as a function of the precoding matrix
normalization algorithm: total RF power $P_T^c$ = 2 kW, $R_s$ = 500 Mbaud,
$N_T/N_U$ = 5, MD-MIQP RRM $\rho_{min}$ = 1.1, MB beams normalized spacing $S_{MB}^n$ = 0.2

| M-MIMO | Throughput Shannon (Gbps) PC matrix normalization algorithm | | | Optimum DRA spacing |
|---|---|---|---|---|
| technique | Taricco | Mod. Taricco | CTTC | $d_A/\lambda$ |
| MF | 1.1315e+02 | 3.5477e+02 | 3.7835e+02 | 1.6/1.6/1.6 |
| MB | 1.1119e+02 | 3.4850e+02 | 3.6991e+02 | 1.6/1.6/1.6 |
| ZF | 1.0797e+02 | 2.9639e+02 | 3.3387e+02 | 1.6/1.6/1.8 |
| MMSE | 1.1247e+02 | 3.4963e+02 | 4.0471e+02 | 1.6/1.6/1.6 |

TABLE III

Simulated M-MIMO DVB-S2X throughput for a
1.2 × 1.2m DRA as a function of the precoding matrix
normalization algorithm: total RF power $P_T^c$ = 2 kW,
$R_s$ = 500 Mbaud, $N_T/N_U$ = 5, MD-MIQP RRM $\rho_{min}$ = 1.1,
MB beams normalized spacing $S_{MB}^n$ = 0.2

| M-MIMO | Throughput Shannon (Gbps) PC matrix normalization algorithm | | | Optimum DRA spacing |
|---|---|---|---|---|
| technique | Taricco | Mod. Taricco | CTTC | $d_A/\lambda$ |
| MF | 7.2431e+01 | 2.7367e+02 | 2.9669e+02 | 1.8/1.6/1.6 |
| MB | 7.0239e+01 | 2.7130e+02 | 2.9263e+02 | 1.6/1.6/1.6 |
| ZF | 6.7082e+01 | 2.3697e+02 | 2.8092e+02 | 1.8/1.6/1.8 |
| MMSE | 7.1974e+01 | 2.7318e+02 | 3.1890e+02 | 1.8/1.6/1.6 |

The impact of adopting the proposed MD-MIQP RRM approach is quite dramatic as shown in Table IV and Table V. The simulation results clearly indicate the major advantage of using the MD-MIQP RRM algorithm. For MF and MB the throughput increase is about 75%, while for MMSE the improvement amounts to about 55% since the MMSE scheme is more robust to the co-channel interference. For ZF the throughput advantage is about 170%, but even more importantly, the related outage probability reduces from 29% to 0.24%.

TABLE IV

Simulated M-MIMO Shannon throughput for a
1.2 × 1.2m DRA as a function of the RRM algorithm:
total RF power $P_T^c$ = 2 kW, $R_s$ = 500 Mbaud, $N_T/N_U$ = 5,
MB beams normalized spacing $S_{MB}^n$ = 0.2

| M-MIMO technique | Throughput Shannon (Gbps) | | Optimum DRA spacing $d_A/\lambda$ |
|---|---|---|---|
| | Random | Min distance | |
| MF | 2.1579e+02 | 3.7835e+02 | 1.6 |
| MB | 2.1295e+02 | 3.6991e+02 | 1.6 |
| ZF | 1.2214e+02 | 3.3387e+02 | 1.8 |
| MMSE | 2.5973e+02 | 4.0471e+02 | 1.6 |

TABLE V

Simulated M-MIMO DVB-S2X throughput for a
1.2 × 1.2m DRA as a function of the RRM algorithm:
total RF power $P_T^c$ = 2 kW, $R_s$ = 500 Mbaud,
$N_T/N_U$ = 5, MB beams normalized spacing
$S_{MB}^n$ = 0.2

| M-MIMO technique | Throughput DVB-S2X (Gbps) | | Optimum DRA spacing $d_A/\lambda$ |
|---|---|---|---|
| | Random | Min distance | |
| MF | 1.6114e+02 | 2.9669e+02 | 1.6 |
| MB | 1.5853e+02 | 2.9263e+02 | 1.6 |
| ZF | 9.3212e+01 | 2.8092e+02 | 1.8 |
| MMSE | 2.0062e+02 | 3.1890e+02 | 1.6 |

Figure 8A:
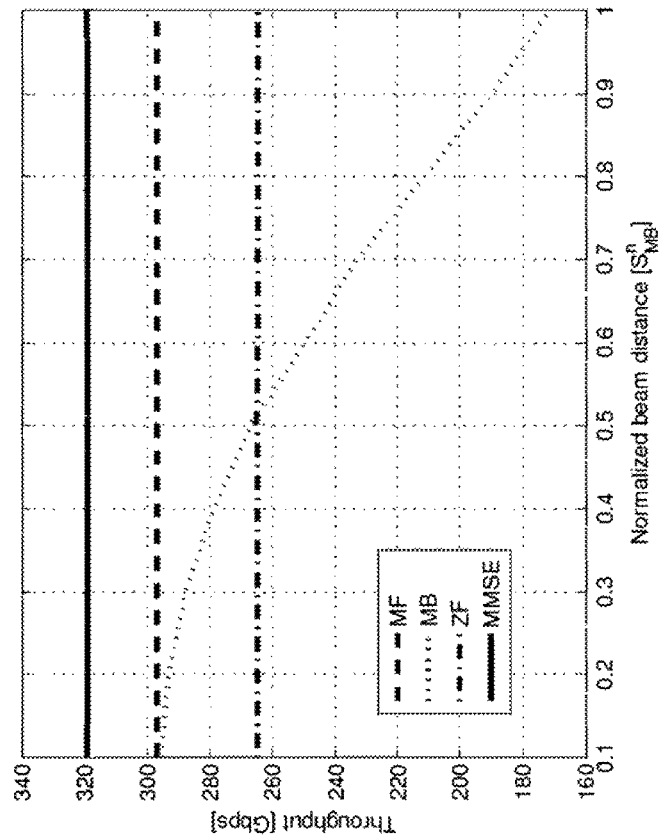
FIG. 8A and FIG. 8B show examples of simulated M-MIMO Shannon and DVB-S2X throughputs for a 1.2× 1.2 m DRA as a function of the MB beam normalized beam spacing $S_{MB}^n$.
Figure 8B:
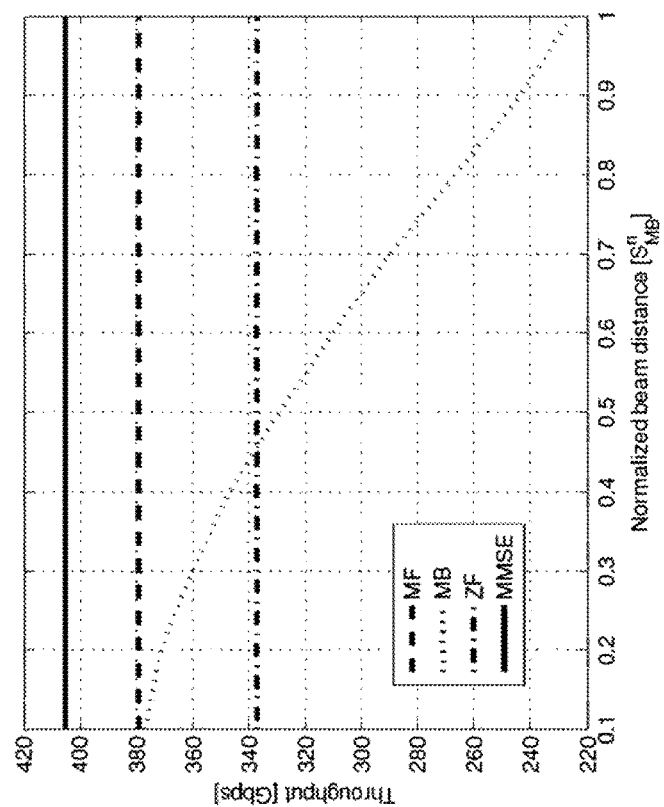

The MB normalized spacing $S_{MB}^n$=0.2 adopted in the simulations is based on an interesting result and is presented in FIG. 8A and FIG. 8B, where the throughput of the different M-MIMO solutions is compared to the throughput of the MB scheme when modifying the normalized beam spacing. In particular, FIG. 8A shows the M-MIMO Shannon throughput for a 1.2×1.2 m DRA as a function of the MB beam normalized beam spacing $S_{MB}^n$, assuming a total transmit power $P_T^c$=2000 W, a user bandwidth $R_s$=500 Mbaud, a ratio $N_T/N_U$=5, minimum distance RRM, and a normalized element spacing $d_A/\lambda$=1.6. FIG. 8B shows the M-MIMO DVB-S2X throughput for the same assumptions. It is apparent that by decreasing the fixed beam normalized spacing $S_{MB}^n$, the performance difference between the MB and MF schemes reduces or even vanishes. This is because the grid of fixed beams becomes so fine that it allows to select the beam that is maximizing the gain towards all user location, as the MF does. It is important to note that as shown in section VII, the MB scheme is simply realized through a fixed beam pattern with an input switch to connect the users to be served at any instant, without any need for user physical channel estimation except for a raw position knowledge. This means that when comparing to the conventional M-MIMO performance with channel estimation errors, the MB performance will be even more superior to the more complex solutions requiring channel feedback.

This result is in contrast to the findings reported in M. Miller, Capacity Maximization for a Unicast Spot Beam Satellite System, U.S. Pat. No. 8,010,043, filed 20 Jul. 2007 ("Miller et al." in the following), where it is shown that with full frequency reuse the optimum beam overlap is attained for a cross-over point of −6 dB or more, i.e., for fairly separated beams. This result seems related to the system model adopted at that time. In particular, the assumption of a fixed $E_s/N_0$ value may have an impact on the sensitivity analysis. The approach followed by the present disclosure is considered more realistic as the antenna size and the total RF power are fixed and the available $E_s/N_0$ is derived as a function of the DRA key parameters.

Finally, it is interesting to note the limited performance loss provided by the MB solution considering that, by exploiting a fixed grid of beams, it does not require any users' channel feedback and complex on-board computations like is the case for MMSE, ZF, and to a lesser extent for MF. More details about the practical MB implementation are described in section VII.

Figure 9B:
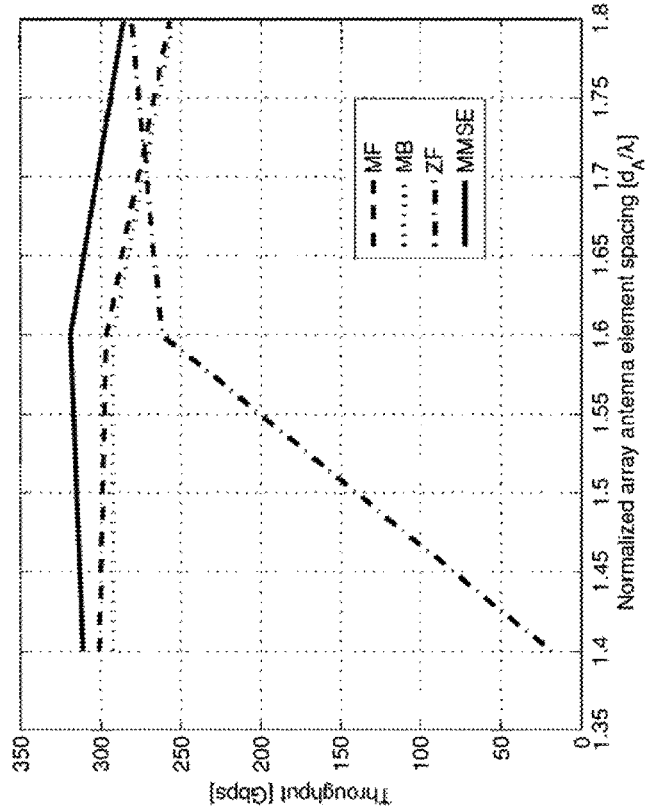
FIG. 9A and FIG. 9B show examples of simulated M-MIMO Shannon and DVB-S2X throughputs for a 1.2× 1.2 m DRA as a function of the array element spacing $d_A/\lambda$.
Figure 9A:
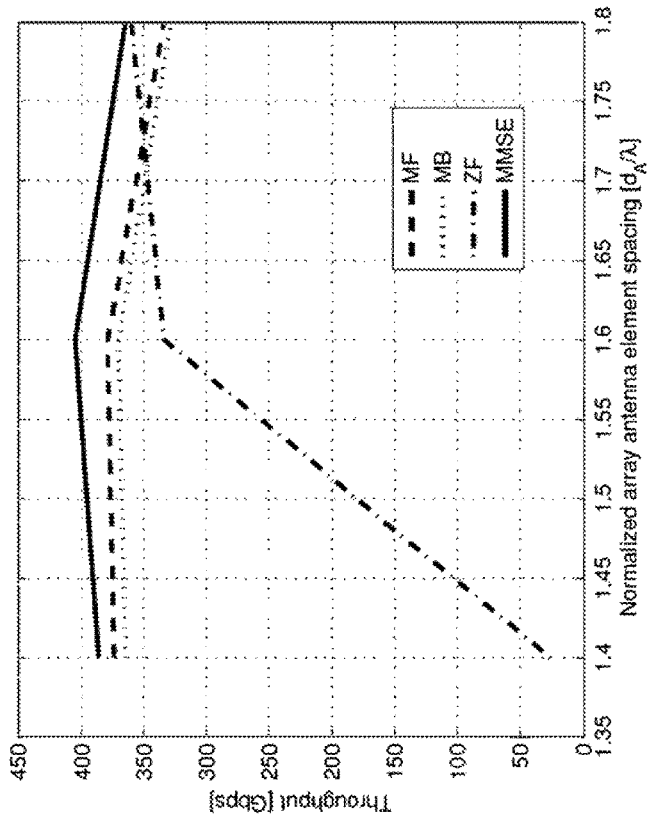
Figure 10:
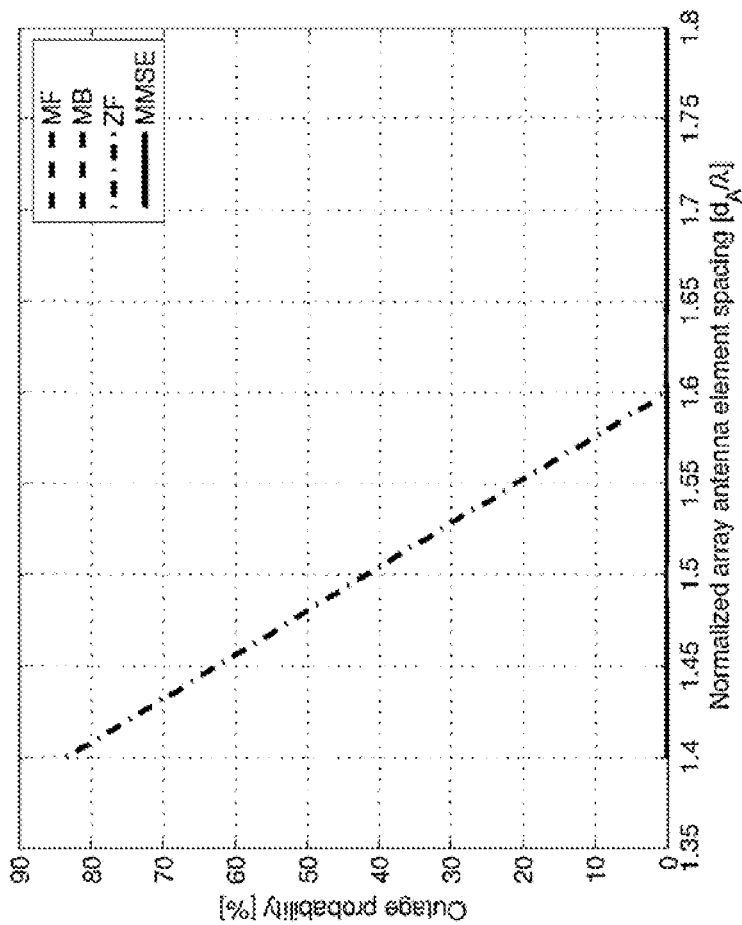
FIG. 10 shows an example of simulated M-MIMO outage probability for a 1.2×1.2 m DRA as a function of the array element spacing $d_A/\lambda$.

For the example case of a medium size array having a squared shape with length $D_A$=1.2 m, first the array element spacing $d_A/\lambda$ has been optimized, and only then the ratio between the number of array elements and active users $N_T/N_U$ has been optimized. Reference is now made to the results reported in FIG. 9A, FIG. 9B, FIG. 10, FIG. 11A, FIG. 11B, and FIG. 12. Of these, FIG. 9A shows the simulated M-MIMO Shannon throughput for a 1.2×1.2 m DRA as a function of the array element spacing $d_A/\lambda$, assuming a total transmit power $P_T^c$=2000 W, a user bandwidth $R_s$=500 Mbaud, a ratio $N_T/N_U$=5, MD-MIQP RRM $\rho_{min}$=1.1, and a MB beams normalized spacing $S_{MB}^n$=0.2. FIG. 9B shows the M-MIMO DVB-S2X throughput for the same assumptions. FIG. 10 shows the simulated M-MIMO outage probability for a 1.2×1.2 m DRA as a function of the array element spacing $d_A/\lambda$, assuming a total transmit power $P_T^c$=2000 W, a user bandwidth $R_s$=500 Mbaud, a ratio $N_T/N_U$=5, MD-MIQP RRM $\rho_{min}$=1.1, and a MB beams normalized spacing $S_{MB}^n$=0.2. It is apparent from these results that for $N_T/N_U$=5, for MB, MF, and MMSE the throughput is optimized for $d_A/\lambda$=1.6. For ZF the throughput is maximized for $d_A/\lambda$=1.8.

Figure 11A:
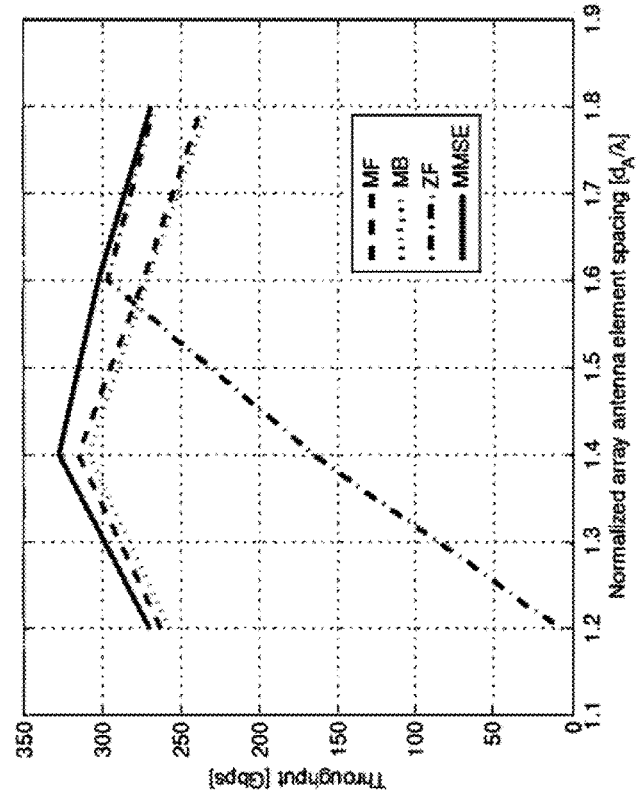
FIG. 11A and FIG. 11B show examples of simulated M-MIMO Shannon and DVB-S2X throughputs for a 1.2× 1.2 m DRA as a function of the array element spacing $d_A/\lambda$.
Figure 11B:
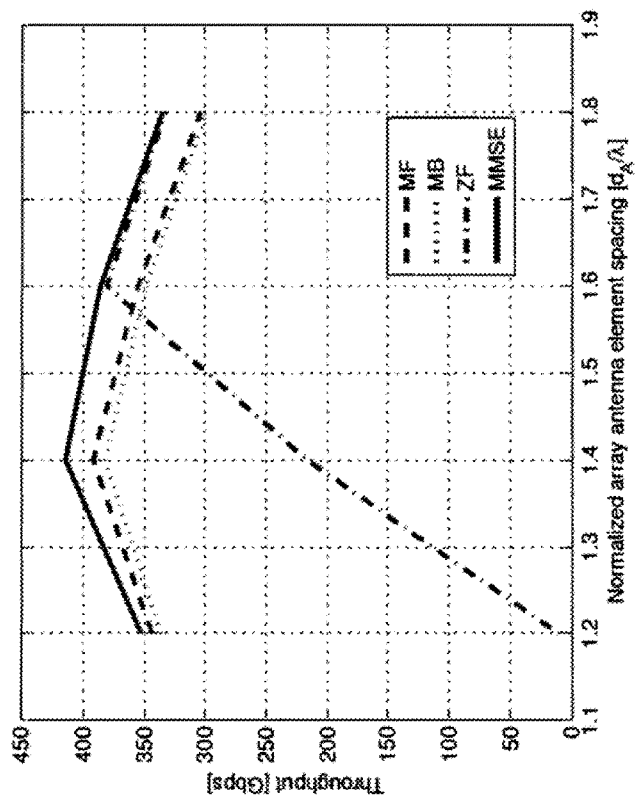
Figure 12:
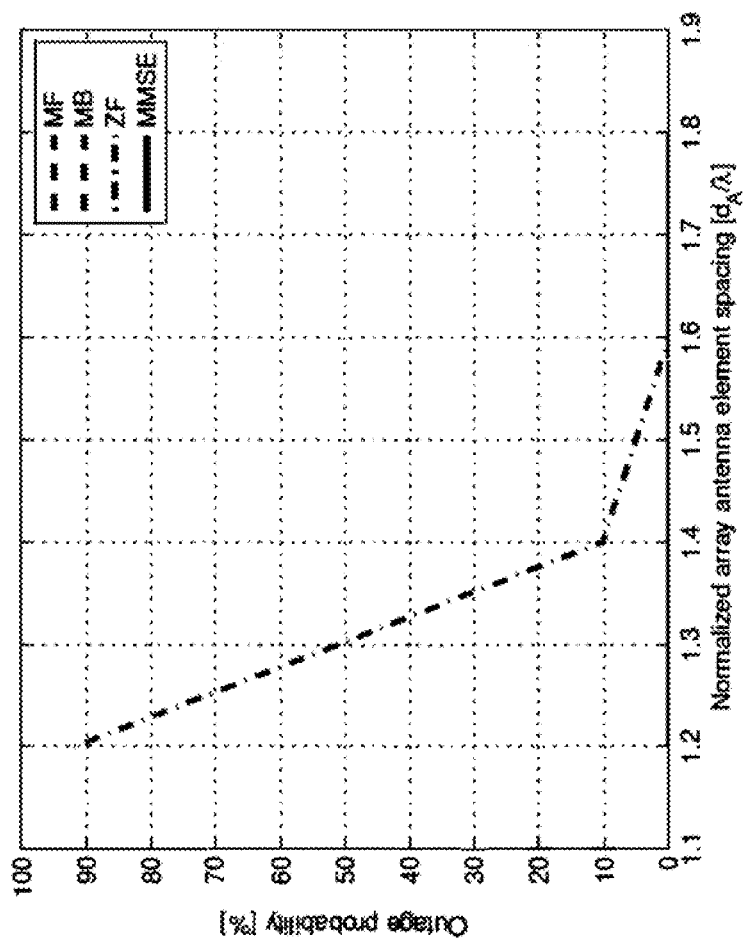
FIG. 12 shows an example of simulated M-MIMO outage probability for a 1.2×1.2 m DRA as a function of the array element spacing $d_A/\lambda$.

FIG. 11A shows the simulated M-MIMO Shannon throughput for a 1.2×1.2 m DRA as a function of the array element spacing $d_A/\lambda$, assuming a total transmit power $P_T^c$=2000 W, a user bandwidth $R_s$=500 Mbaud, a ratio $N_T/N_U$=6, MD-MIQP RRM $\rho_{min}$=1.1, and a MB beams normalized spacing $S_{MB}^n$=0.2. FIG. 11B shows the M-MIMO DVB-S2X throughput for the same assumptions. FIG. 12 shows the simulated M-MIMO outage probability for a 1.2×1.2 m DRA as a function of the array element spacing $d_A/\lambda$, assuming a total transmit power $P_T^c$=2000 W, a user bandwidth $R_s$=500 Mbaud, a ratio $N_T/N_U$=6, MD-MIQP RRM $\rho_{min}$=1.1, and a MB beams normalized spacing $S_{MB}^n$=0.2. It is apparent from these results that for $N_T/N_U$=6, for MB, MF, and MMSE the throughput is optimized for $d_A/\lambda$=1.4. For ZF the throughput is maximized for $d_A/\lambda$=1.6.

Also, the throughput dependency on the active antenna RF power $P_T^c$ has been analyzed. The corresponding simulation results are summarized in Table VI and Table VII for the Shannon and DVB-S2X cases, respectively. It has been found that by doubling $P_T^c$ from 2 kW to 4 kW with fixed bandwidth, MF and MB techniques increase the throughput by 33%, while ZF and MMSE increase the throughput by 52% for the Shannon case and by about the same amount for the DVB-S2X case. Doubling the bandwidth and the power will provide a 100% throughput increase. Consequently, the latter solution is preferable considering that in Ka-band the bandwidth available is up to 2.5 GHz. Section VI provides a more general optimization methodology description.

TABLE VI

Simulated M-MIMO Shannon throughput for a
1.2 × 1.2m DRA as a function of the total RF power:
$R_s$ = 500 Mbaud, $N_T/N_U$ = 5, MD-MIQP RRM
$\rho_{min}$ = 1.1, MB beams normalized spacing $S_{MB}{}''$ = 0.2

| M-MIMO technique | Throughput Shannon (Gbps) DRA total RF power $P_T{}^c$ (W) | | Optimum DRA spacing $d_A/\lambda$ |
|---|---|---|---|
| | 2000 | 4000 | |
| MF | 3.7835e+02 | 5.0504e+02 | 1.6 |
| MB | 3.6991e+02 | 4.9220e+02 | 1.6 |
| ZF | 3.3387e+02 | 5.0787e+02 | 1.8 |
| MMSE | 4.0471e+02 | 5.6975e+02 | 1.6 |

TABLE VII

Simulated M-MIMO DVB-S2X throughput for a
1.2 × 1.2m DRA as a function of the total RF power:
$R_s$ = 500 Mbaud, $N_T/N_U$ = 5, MD-MIQP RRM
$\rho_{min}$ = 1.1, MB beams normalized spacing $S_{MB}{}''$ = 0.2

| M-MIMO technique | Throughput DVB-S2X (Gbps) DRA total RF power $P_T{}^c$ (W) | | Optimum DRA spacing $d_A/\lambda$ |
|---|---|---|---|
| | 2000 | 4000 | |
| MF | 2.9669e+02 | 4.0119e+02 | 1.6 |
| MB | 2.9263e+02 | 3.8949e+02 | 1.6 |
| ZF | 2.8092e+02 | 4.2623e+02 | 1.8 |
| MMSE | 3.1890e+02 | 4.6294e+02 | 1.6 |

Figure 13B:
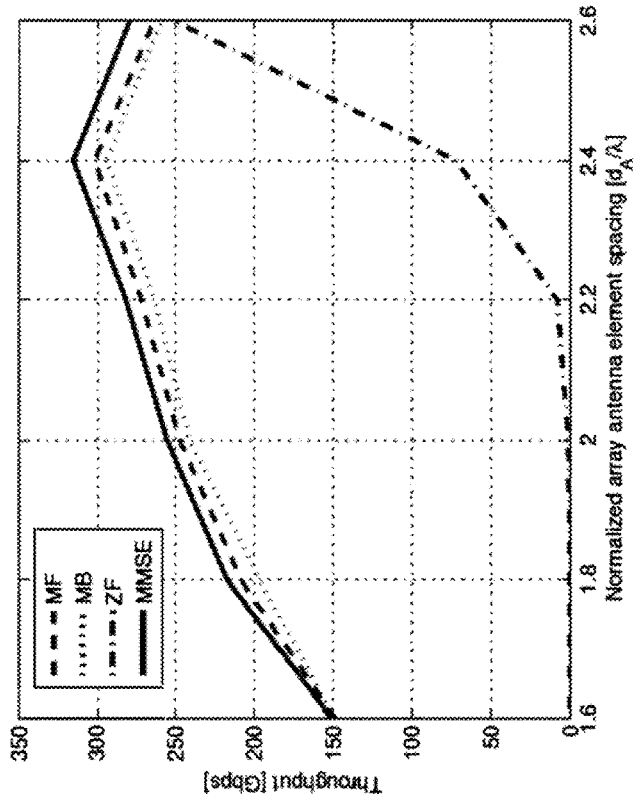
FIG. 13A and FIG. 13B show examples of simulated M-MIMO DVB-S2X throughputs for a 1.2×1.2 m DRA as a function of the array element spacing $d_A/\lambda$ for different ratios $N_T/N_U$.
Figure 13A:
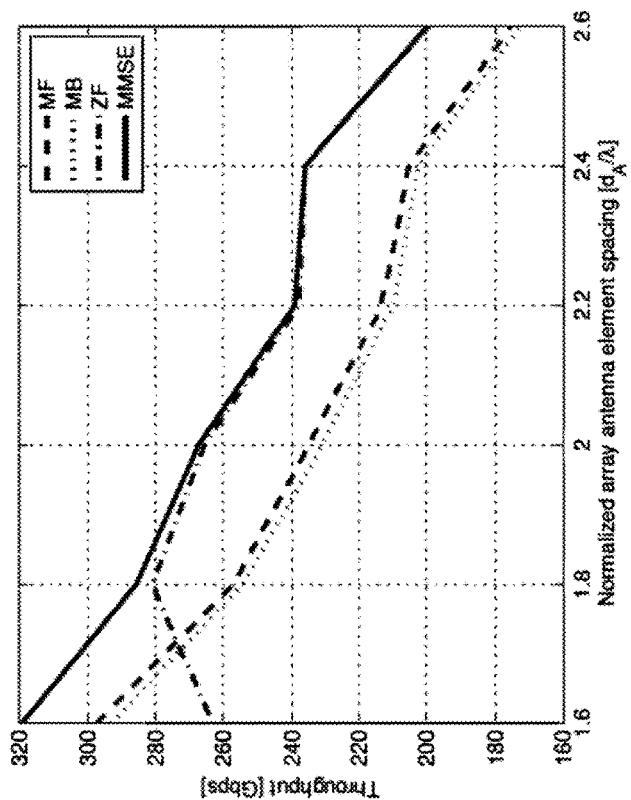

2) Medium Size Array with Relaxed Spacing: As described above, also a relaxation of the beam spacing to reduce the DRA complexity in terms of RF chains and radiating elements for the same physical array size has been explored. Referring to FIG. 13A and FIG. 131B, which show the simulated M-MIMO DVB-S2X throughput for a 1.2×1.2 m DRA as a function of the array element spacing $d_A/\lambda$, assuming a total transmit power $P_T{}^c$=2000 W, a user bandwidth $R_s$=500 Mbaud, MD-MIQP RRM $\rho_{min}$=1.1, a MB beams normalized spacing $S_{MB}{}''$=0.2, and a ratio $N_T/N_U$=5 (FIG. 13A) or $N_T/N_U$=2 (FIG. 13B). From FIG. 13A it appears that for $N_T/N_U$=5 there is a marked and monotonic reduction in the throughput increasing the array spacing. Instead, by reducing the $N_T/N_U$ ratio to 2, as shown in FIG. 13B, the previously observed throughput loss can be almost completely recovered. This approach corresponds to keeping the number of array elements $N_T$ constant, independently from the spacing adopted for optimizing their number. However, lowering the $N_T/N_U$ ratio further down to 1 reduces the throughput. This means that moving from $d_A/\lambda$=1.6 to $d_A/\lambda$=2.4 the number of array elements and RF chains can be reduced from, for example, 2500 to 1156 (i.e., by a factor of 2.16) with a M-MIMO throughput reduction of only 3%. This result is counter-intuitive at it seems to violate one key M-MIMO assumption derived from earlier terrestrial M-MIMO findings reported in E. Bjornson, E. G. Larsson, T. L. Marzetta, "Massive MIMO: Ten Myths and One Critical Question", IEEE Comm. Magazine, Vol. 54, No. 2, pp. 114-123, February 2016 ("Bjornson et al." in the following). This finding will be clarified in section III.C of the present disclosure.

Figure 14B:
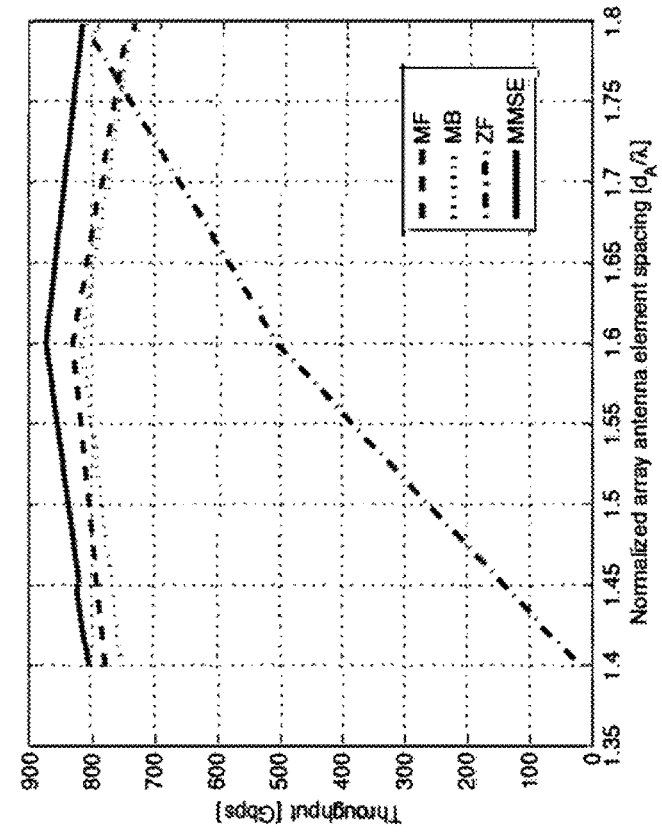
FIG. 14A and FIG. 14B show examples of simulated M-MIMO Shannon and DVB-S2X throughputs for a 2.0× 2.0 m DRA as a function of the array element spacing $d_A/\lambda$.
Figure 14A:
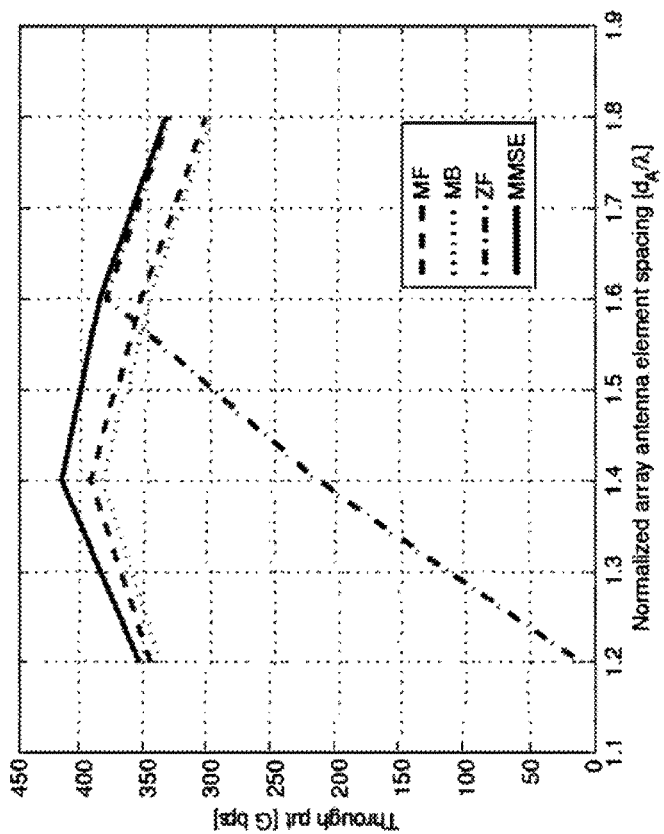
Figure 15:
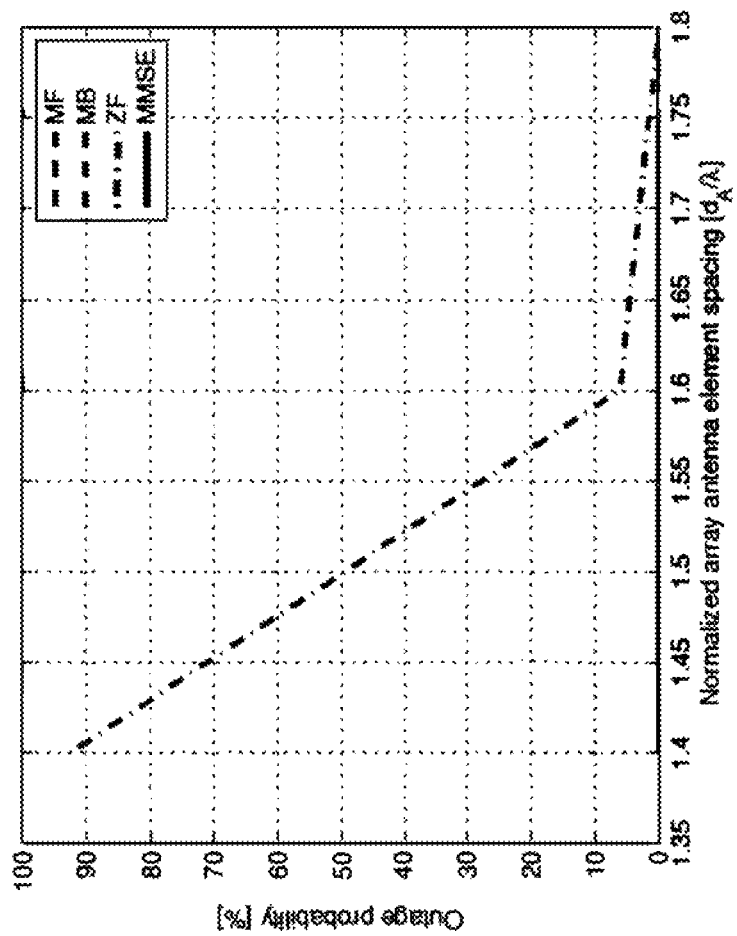
FIG. 15 shows an example of simulated M-MIMO outage probability for a 2.0×2.0 m DRA as a function of the array element spacing $d_A/\lambda$.
Figure 16A:
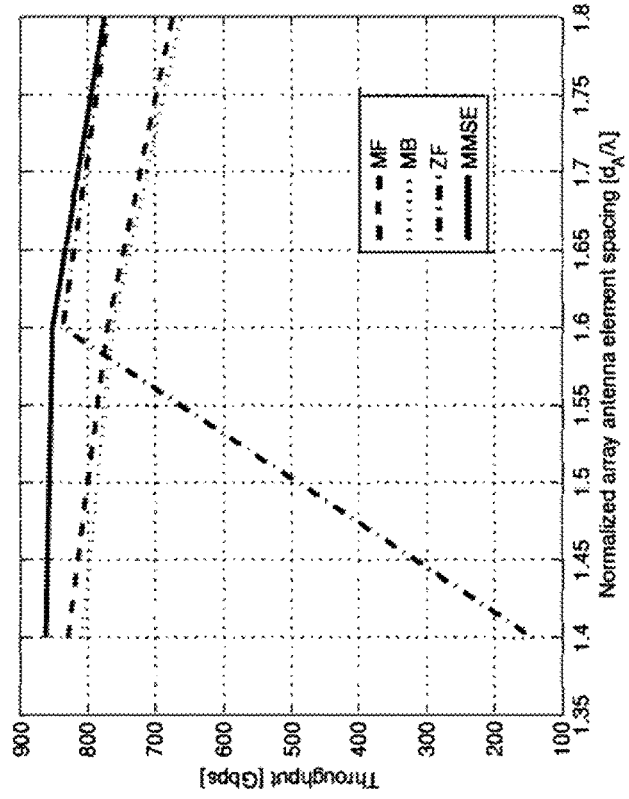
FIG. 16A and FIG. 16B show examples of simulated M-MIMO Shannon and DVB-S2X throughputs for a 2.0× 2.0 m DRA as a function of the array element spacing $d_A/\lambda$.
Figure 16B:
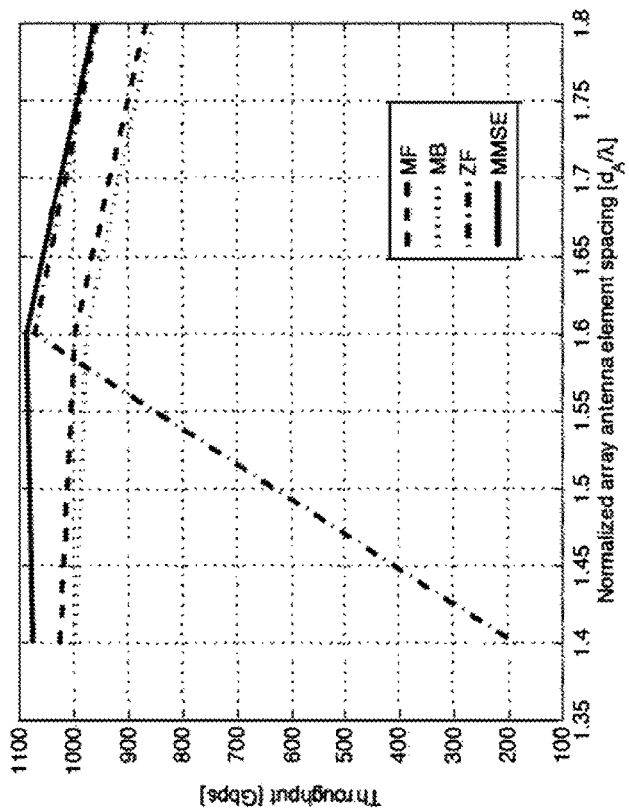
Figure 17:
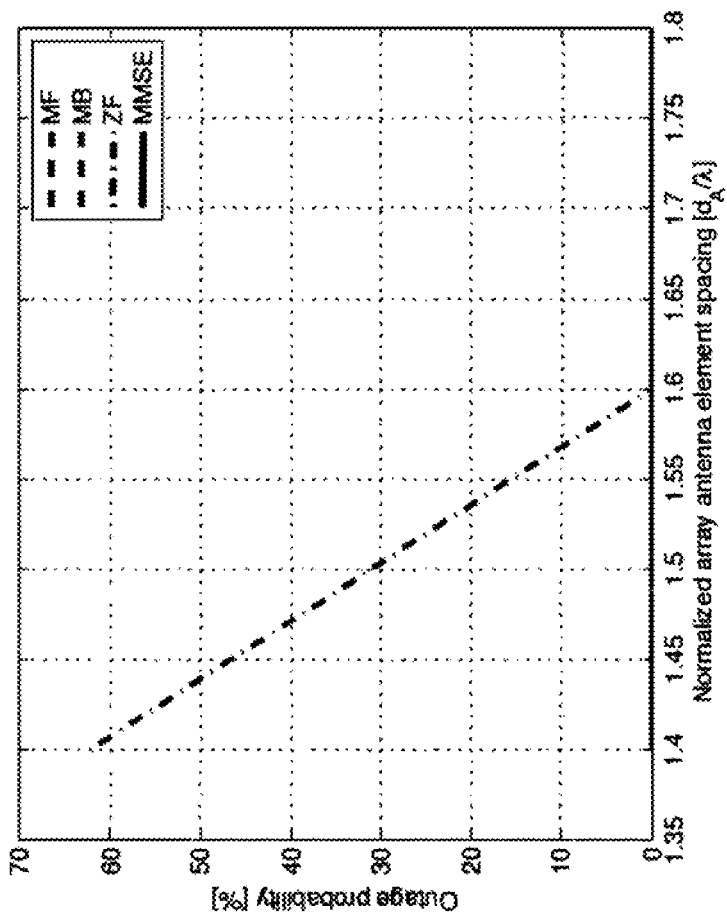
FIG. 17 shows an example of simulated M-MIMO outage probability for a 2.0×2.0 m DRA as a function of the array element spacing $d_A/\lambda$.

3) Large Array with Reduced Spacing: For the large size array characterized by a squared shape with length $D_A$=2.0 m, the array element spacing $d_A/\lambda$ has been optimized first, and subsequently the ratio between the number of array elements and active users $N_T/N_U$ has been optimized. Simulation results are shown in FIG. 14A to FIG. 17. Of these, FIG. 14A shows the simulated M-MIMO Shannon throughput for a 2.0×2.0 m DRA as a function of the array element spacing $d_A/\lambda$, assuming a total transmit power $P_T{}^c$=2000 W, a user bandwidth $R_s$=500 Mbaud, a ratio $N_T/N_U$=5, MD-MIQP RRM $\rho_{min}$=1.1, and a MB beams normalized spacing $S_{MB}{}''$=0.2. FIG. 14B shows the M-MIMO DVB-S2X throughput for the same assumptions. FIG. 15 shows the simulated M-MIMO outage probability for a 2.0×2.0 m DRA as a function of the array element spacing $d_A/\lambda$, assuming a total transmit power $P_T{}^c$=2000 W, a user bandwidth $R_s$=500 Mbaud, a ratio $N_T/N_U$=5, MD-MIQP RRM $\rho_{min}$=1.1, and a MB beams normalized spacing $S_{MB}{}''$=0.2. FIG. 16A shows the simulated M-MIMO Shannon throughput for a 2.0×2.0 m DRA as a function of the array element spacing $d_A/\lambda$, assuming a total transmit power $P_T{}^c$=2000 W, a user bandwidth $R_s$=500 Mbaud, a ratio $N_T/N_U$=6, MD-MIQP RRM $\rho_{min}$=1.1, and a MB beams normalized spacing $S_{MB}{}''$=0.2. FIG. 16B shows the M-MIMO DVB-S2X throughput for the same assumptions. FIG. 17 shows the simulated M-MIMO outage probability for a 2.0× 2.0 m DRA as a function of the array element spacing $d_A/\lambda$, assuming a total transmit power $P_T{}^c$=2000 W, a user bandwidth $R_s$=500 Mbaud, a ratio $N_T/N_U$=6, MD-MIQP RRM $\rho_{min}$=1.1, and a MB beams normalized spacing $S_{MB}$=0.2. Looking at these simulation results, it is apparent that when $N_T/N_U$=5 MB, for MF, and MMSE the throughput is optimized for $d_A/\lambda$=1.6. For ZF the throughput is maximized for $d_A/\lambda$=1.8. This is because as shown in FIG. 15, the ZF outage is not zero until $d_A/\lambda$=1.8.

Figure 18A:
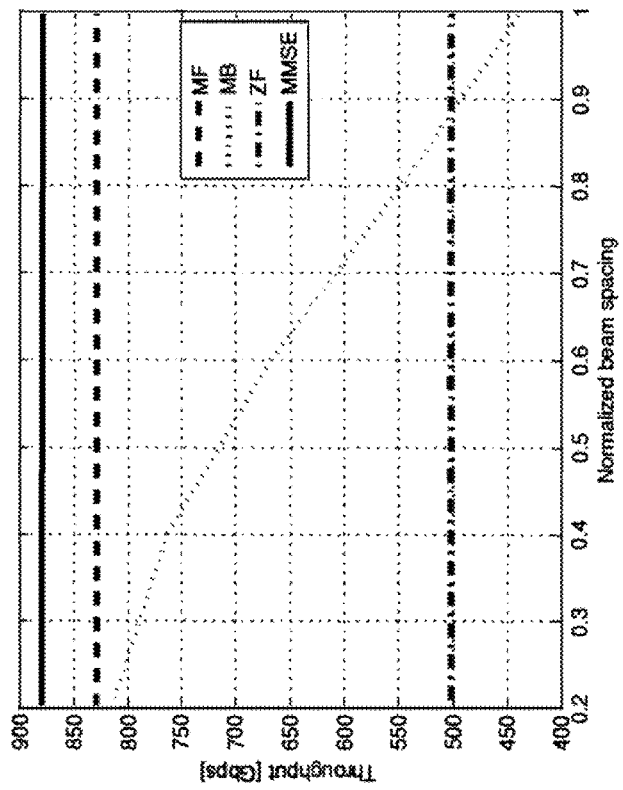
FIG. 18A and FIG. 18B show examples of simulated M-MIMO Shannon and DVB-S2X throughputs for a 2.0× 2.0 m DRA as a function of the MB beam normalized beam spacing $S_{MB}^n$.
Figure 18B:
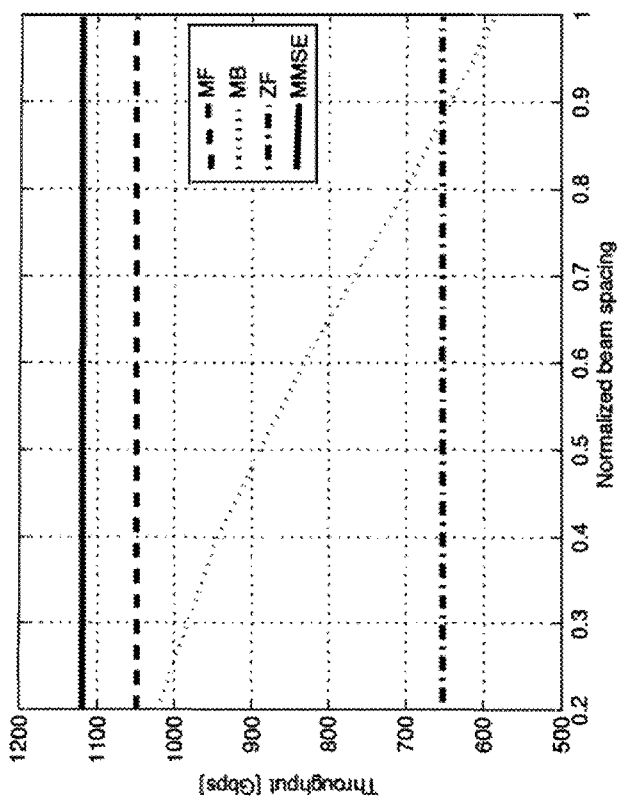

Similarly to what is shown in FIG. 8A and FIG. 8B for a medium size array, FIG. 18A and FIG. 18B compare the Shannon and DVB-S2X throughputs of the different M-MIMO solutions for the large array (2.0×2.0 m DRA) to the MB throughput when modifying the normalized beam spacing $S_{MB}$, assuming a total transmit power $P_T{}^c$=2000 W, a user bandwidth $R_s$=500 Mbaud, a ratio $N_T/N_U$=5, MD-MIQP RRM $\rho_{min}$=1.1, and an array element spacing $d_A/\lambda$=1.6. The same considerations as described in section III.B.1 may apply here.

As had already been observed for the medium size array, the impact of adopting the proposed MDMIQP RRM approach is quite dramatic as shown in Table VIII and Table IX. The simulation results clearly indicate a major advantage of using the MD-MIQP RRM algorithm. For MF and MB the throughput increase is around 80%, while for MMSE it is about 60%, since the latter is intrinsically more robust to interference. For ZF the throughput advantage is about 300% jointly with a reduction of the outage probability from 30% to 0%.

TABLE VIII

Simulated M-MIMO Shannon throughput for a
2.0 × 2.0m DRA as a function of the RRM algorithm:
total RF power $P_T^c$ = 2 kW, $R_s$ = 500 Mbaud,
$N_T/N_U$ = 5, MB beams normalized spacing
$S_{MB}^n$ = 0.2

| M-MIMO technique | Throughput Shannon (Gbps) RRM algorithm | | Optimum DRA spacing |
|---|---|---|---|
| | Random | Min distance | $d_A/\lambda$ |
| MF | 5.9823e+02 | 1.0504e+03 | 1.6 |
| MB | 5.8978e+02 | 1.0221e+03 | 1.6 |
| ZF | 3.0718e+02 | 1.0441e+03 | 1.8 |
| MMSE | 7.2108e+02 | 1.1187e+03 | 1.6 |

TABLE IX

Simulated M-MIMO DVB-S2X throughput for a
2.0 × 2.0m DRA as a function of the RRM algorithm:
total RF power $P_T^c$ = 2 kW, $R_s$ = 500 Mbaud,
$N_T/N_U$ = 5, MB beams normalized spacing
$S_{MB}^n$ = 0.2

| M-MIMO technique | Throughput DVB-S2X (Gbps) RRM algorithm | | Optimum DRA spacing |
|---|---|---|---|
| | Random | Min distance | $d_A/\lambda$ |
| MF | 4.4567e+02 | 8.2962e+02 | 1.6 |
| MB | 4.3761e+02 | 8.1588e+02 | 1.6 |
| ZF | 2.3475e+02 | 8.1401e+02 | 1.8 |
| MMSE | 5.5656e+02 | 8.7883e+02 | 1.6 |

Also the throughput dependency on the active antenna RF power $P_T^c$ has been analyzed. The corresponding simulation results are summarized in Table X and Table XI for the Shannon and DVB-S2X cases, respectively. It appears that by doubling $P_T^c$ from 2 kW to 4 kW with fixed bandwidth, MF and MB techniques increase the throughput by 33%, while ZF and MMSE techniques increase the throughput by 40% for the Shannon and DVB-S2X cases. Doubling the bandwidth jointly with the RF power will provide a 100% throughput increase. Consequently, the latter solution is preferable also considering the 2.5 GHz of spectrum available in Ka-band. A more general optimization methodology will be described in section VI of the present disclosure.

TABLE X

Simulated M-MIMO Shannon throughput for a
2.0 × 2.0m DRA as a function of the total RF power:
$R_s$ = 500 Mbaud, $N_T/N_U$ = 5, MD-MIQP RRM
$\rho_{min}$ = 1.1, MB beams normalized spacing
$S_{MB}^n$ = 0.2

| M-MIMO technique | Throughput Shannon (Gbps) DRA total RF power $P_T^c$ (W) | | Optimum DRA spacing |
|---|---|---|---|
| | 2000 | 4000 | $d_A/\lambda$ |
| MF | 1.0504e+03 | 1.3879e+03 | 1.6 |
| MB | 1.0221e+03 | 1.3439e+03 | 1.6 |
| ZF | 1.0441e+03 | 1.4690e+03 | 1.8 |
| MMSE | 1.1187e+03 | 1.5515e+03 | 1.6 |

TABLE XI

Simulated M-MIMO DVB-S2X throughput for a
2.0 × 2.0m DRA as a function of the total RF power:
$R_s$ = 500 Mbaud, $N_T/N_U$ = 5, MD-MIQP RRM
$\rho_{min}$ = 1.1, MB beams normalized spacing
$S_{MB}^n$ = 0.2

| M-MIMO technique | Throughput DVB-S2X (Gbps) DRA total RF power $P_T^c$ (W) | | Optimum DRA spacing |
|---|---|---|---|
| | 2000 | 4000 | $d_A/\lambda$ |
| MF | 8.2962e+02 | 1.0978e+03 | 1.6 |
| MB | 8.1588e+02 | 1.0565e+03 | 1.6 |
| ZF | 8.1401e+02 | 1.2343e+03 | 1.8 |
| MMSE | 8.7883e+02 | 1.2490e+03 | 1.6 |

Figure 19B:
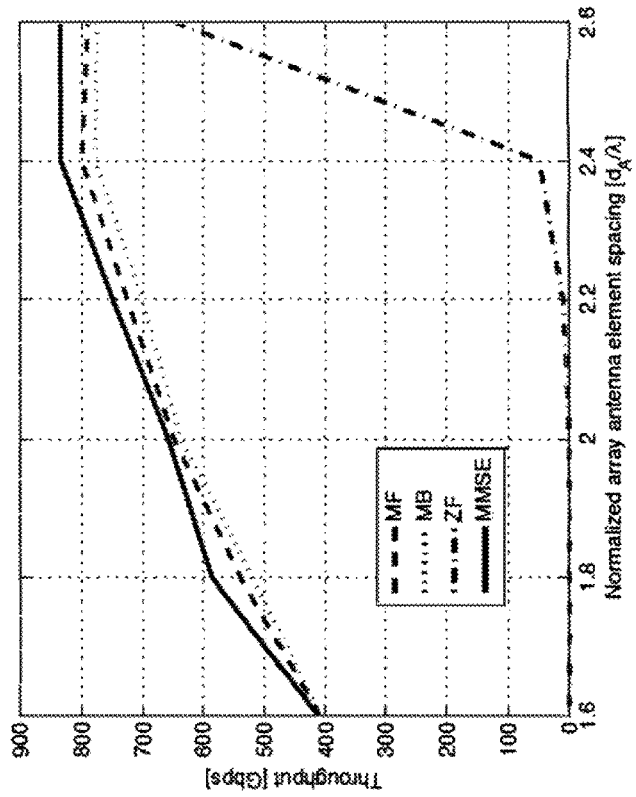
FIG. 19A and FIG. 19B show examples of simulated M-MIMO DVB-S2X throughputs for a 2.0×2.0 m DRA as a function of the array element spacing $d_A/\lambda$ for different ratios $N_T/N_U$.
Figure 19A:
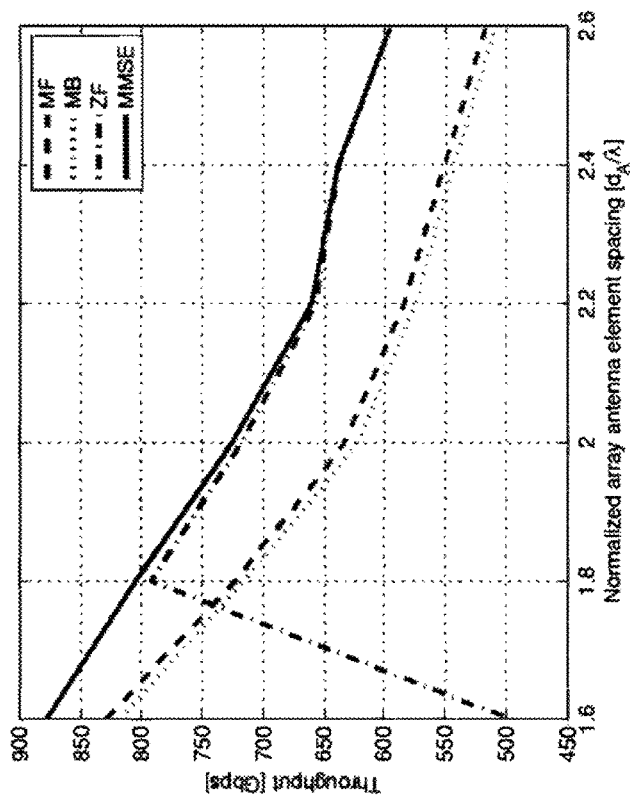

4) Large Array with Relaxed Spacing: FIG. 19A and FIG. 19B show the simulated M-MIMO DVB-S2X throughput for a 2.0×2.0 m DRA as a function of the array element spacing $d_A/\lambda$, assuming a total transmit power $P_T^c$=2000 W, a user bandwidth $R_s$=500 Mbaud, MD-MIQP RRM $\rho_{min}$=1.1, a MB beams normalized spacing $S_{MB}^n$=0.2, and a ratio $N_T/N_U$=5 (FIG. 19A) or $N_T/N_U$=2 (FIG. 19B). As previously shown for the medium size array, also in the case of a large array the throughput loss due to the increased feed spacing can be almost completely recovered by adopting $N_T/N_U$=2. This means that, similarly to what was found for the smaller array, in the large array case moving from $d_A/\lambda$=1.6 to $d_A/\lambda$=2.4 the number of array elements and RF chains can be reduced, for example from 7056 to 3136 (i.e., by a factor of 2.25) with a M-MIMO throughput reduction of only 6%. Finer beam spacing optimization allows to further reduce this performance gap.

III.C. Pragmatic M-MIMO Numerical Results Summary and Considerations

Table XII summarizes the best parameters derived for pragmatic M-MIMO implementation with relaxed feed spacing. The simulated throughput summary exploiting the optimized configurations is reported in Table XIII and Table XIV for the Shannon and DVB-S2X cases, respectively.

TABLE XII

Optimized MB pragmatic M-MIMO parameters

| Parameter | Symbol | Value | Unit |
|---|---|---|---|
| RRM User minimum spacing coefficient | | 1.10 | |
| Array elements normalized spacing | $d_A/\lambda$ | 2.4 | |
| MB normalized beam spacing | $S_{MB}^n$ | 0.2 | |
| Number of array elements for 1.2m array | $N_T$ | 1156 | |
| Number of array elements for 2.0m array | $N_T$ | 3136 | |
| Number of active users for 1.2m array | $N_U$ | 482 | |
| Number of active users for 2.0m array | $N_U$ | 1568 | |
| Number of feeds/users ratio | $N_T/N_U$ | 2 | |
| Precoding matrix normalization | | CTTC | |

TABLE XIII

M-MIMO Shannon throughput results

| Configuration | | | Throughput Shannon (Gbps) | | | |
|---|---|---|---|---|---|---|
| $R_s$ (Mbaud) | $D_A$ (m) | $P_T^c$ (kW) | MB | MF | ZF | MMSE |
| 500 | 1.2 | 2 | 3.60e+02 | 3.69e+02 | 1.00e+02 | 3.89e+02 |
| 500 | 1.2 | 4 | 4.80e+02 | 4.93e+02 | 1.55e+02 | 5.39e+02 |
| 500 | 2.0 | 2 | 9.57e+02 | 9.81e+02 | 6.57e+01 | 1.02e+03 |
| 500 | 2.0 | 4 | 1.26e+03 | 1.29e+03 | 9.28e+01 | 1.39e+03 |

TABLE XIV

M-MIMO DVB-S2X throughput results

| Configuration | | | Throughput DVB-S2X (Gbps) | | | |
|---|---|---|---|---|---|---|
| $R_s$ (Mbaud) | $D_A$ (m) | $P_T^c$ (kW) | MB | MF | ZF | MMSE |
| 500 | 1.2 | 2 | 2.93e+02 | 3.01e+02 | 7.49e+01 | 3.15e+02 |
| 500 | 1.2 | 4 | 3.74e+02 | 3.83e+02 | 1.18e+02 | 4.22e+02 |
| 500 | 2.0 | 2 | 7.78e+02 | 8.00e+02 | 4.72e+01 | 8.35e+02 |
| 500 | 2.0 | 4 | 9.85e+02 | 1.01e+03 | 6.88e+01 | 1.08e+03 |

It can be observed that the throughput almost grows with the square of the array dimension $D_A$, i.e. proportional to the array area. Further, the throughput shows a logarithmic dependency on the RF power. The optimized MB MD-MIQP RRM M-MIMO performance closely follows the MF performance. On the other hand, the ZF algorithm performance is penalized by the selected configuration. This is due to the fact that for this array element spacing the ZF throughput is heavily affected by the high outage probability. MMSE results, although slightly better than MB, assume perfect channel estimation which, as described above, is not achievable in practice.

As a figure of merit, the overall normalized payload system efficiency is introduced, defined as $$\eta_P = \frac{T}{R_s P_T^c D_A^2} \; [Mbps/(Mbaud \cdot W \cdot m^2)]. \quad (96)$$

The $\eta_P$ figure of merit allows to account for normalized throughput in terms of occupied user bandwidth, payload RF power, and DRA antenna area. Utilizing Equation (96) the normalized payload efficiency for the M-MIMO configurations previously analyzed has been derived. The corresponding results are reported in Table XV and Table XVI for the Shannon and DVBS2X cases, respectively. It is interesting to note that the best normalized payload system efficiency results are obtained for $P_T^c=2$ kW. The payload system efficiency improvement is maintained also by further reducing $P_T^c$. However, doing so will start impacting the link availability at a certain point. This is due to the fact that in certain locations the minimum SNIR supported by the air interface may be reached. $\eta_P$ slightly degrades when passing from $D_A=2$ m to $D_A=4$ m. Clearly the absolute throughput improves almost proportionally to the DRA surface.

TABLE XV

M-MIMO Shannon normalized payload efficiency results

| Configuration | | | Throughput Shannon (Gbps) | | | |
|---|---|---|---|---|---|---|
| $R_s$ (Mbaud) | $D_A$ (m) | $P_T^c$ (kW) | MB | MF | ZF | MMSE |
| 500 | 1.2 | 2 | 2.50e+01 | 2.57e+01 | 6.97e+02 | 2.70e+01 |
| 500 | 1.2 | 4 | 1.67e+01 | 1.71e+01 | 5.39e+02 | 1.87e+01 |
| 500 | 2.0 | 2 | 2.39e+01 | 2.45e+01 | 1.64e+02 | 2.56e+01 |
| 500 | 2.0 | 4 | 1.57e+01 | 1.62e+01 | 1.16e+02 | 1.74e+01 |

TABLE XVI

M-MIMO DVB-S2X normalized payload efficiency results

| Configuration | | | Throughput DVB-S2X (Gbps) | | | |
|---|---|---|---|---|---|---|
| Rs (Mbaud) | DA (m) | PS (KW) | MB | MF | ZF | MMSE |
| 500 | 1.2 | 2 | 2.04e+01 | 2.09e+01 | 5.20e+02 | 2.19e+01 |
| 500 | 1.2 | 4 | 1.30e+01 | 1.33e+01 | 4.11e+02 | 1.47e+01 |
| 500 | 2.0 | 2 | 1.94e+01 | 2.00e+01 | 1.18e+02 | 2.09e+01 |
| 500 | 2.0 | 4 | 1.23e+01 | 1.26e+01 | 8.61e+03 | 1.35e+01 |

At this point, a critical review of the previous satellite M-MIMO analysis key findings will be provided, taking into account terrestrial M-MIMO myths considerations reported in Bjornson et al.

More specifically it has been found that
1) M-MIMO works also in line-of-sight conditions (see Myth 2 in Bjornson et al.).
2) M-MIMO performance can be achieved by open loop beam-forming techniques (see Myth 3 in Bjornson et al.).
3) M-MIMO performance loss by linear processing is modest (see Myth 5 in Bjornson et al.).
4) M-MIMO does not require an order of magnitude more antennas than users (see Myth 6 in Bjornson et al.).

Point 1) was one of the initial assumptions of the present disclosure. It may be considered that Myth 2 discussion in Bjornson et al., aiming at removing the worst-case users affecting the system performance in a non-favorable propagation environment (i.e. not providing users' orthogonality), is achieved by the MD-MIQP RRM algorithm proposed by the present disclosure.

Point 2) is implemented by means of the MB M-MIMO solution whereby the users are assigned to the pre-formed beams providing the highest gain. Differently from what is discussed in Bjornson et al. for terrestrial systems, in the present case the approach is scalable, as the beam is selected solely based on the approximate user's geographical location which requires very limited, if any, signaling information.

Point 3) has not been investigated in the context of the present disclosure. However, earlier work related to the downlink of multi-beam satellites has shown marginal gains adopting MMSE-SIC techniques compared to more conventional frequency reuse solutions.

Point 4) has been confirmed by the present findings showing that the ratio between number of antenna elements and active users around 2 achieves quasi optimum results. This ratio is well below the typical order of magnitude normally assumed for M-MIMO.

IV. CONVENTIONAL FREQUENCY REUSE SCHEME PERFORMANCE ANALYSIS

This section provides performance results of a more conventional active payload antenna with the same key parameters as the antenna used for M-MIMO. This approach allows for a fair comparison and assessment of the M-MIMO advantages. Conventional CFR schemes, described in section II.F, partition the available user link bandwidth $R_s^{TOT}$ into $N_c$ colors. This approach has two main advantages compared to M-MIMO full frequency reuse: a) reducing the other beams' co-channel interference, and b) reducing the required feeder link bandwidth. Intuitively, the consequent reduced beam user link bandwidth $R_s^{TOT}/N_c$ compared to M-MIMO $R_s^{TOT}$ is expected to provide a lower system throughput.

IV.A. Conventional Frequency Reuse System Parameters

For generating the conventional frequency reuse reference system performance, a number of GEO satellite antenna configurations have been selected similar to the M-MIMO configurations. Table XVII summarizes the key system parameters adopted for the following numerical simulations. As before, when a range of values is specified, it means that the sensitivity to this specific parameter has been optimized in the specified range. The number of colors is fixed to 4 as attempts to use 2 or 3 colors have been found to provide sub-optimum performance.

It should be remarked that is normal practice to separate the beams by a normalized distance $S_{MB}^n$ equal to 1 corresponding to a beam cross-over of −4 dB (see for example ACM results for 4CFR reported in Miller et al. also showing a very mild dependency on the beam spacing). Instead, it will be shown that to boost DRA performance the normalized beam spacing shall be considerably reduced.

IV.B. CFR Numerical Results

Figure 20B:
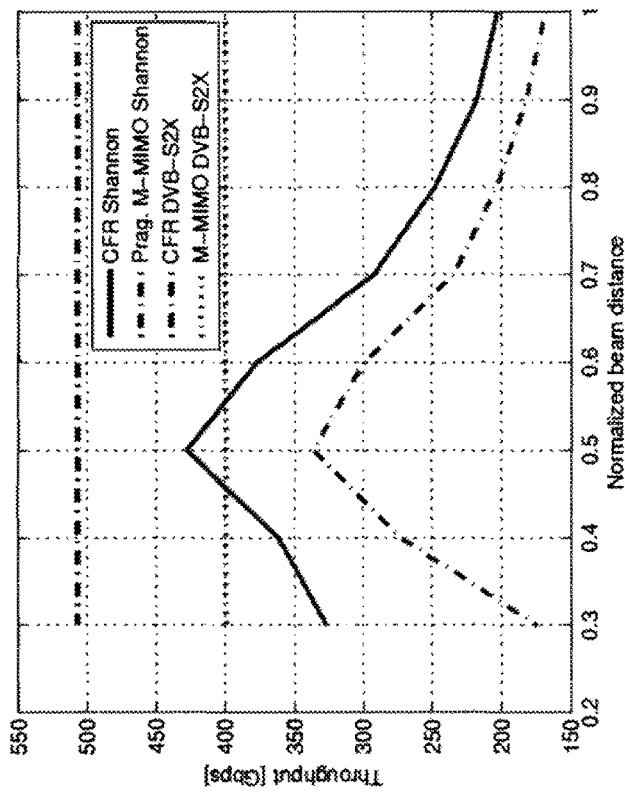
FIG. 20A and FIG. 20B show examples of simulated 4 colors throughputs for a 1.2×1.2 m DRA as a function of the normalized beam spacing $S_{MB}^n$ for different total transmit powers $P_T^c$.
Figure 20A:
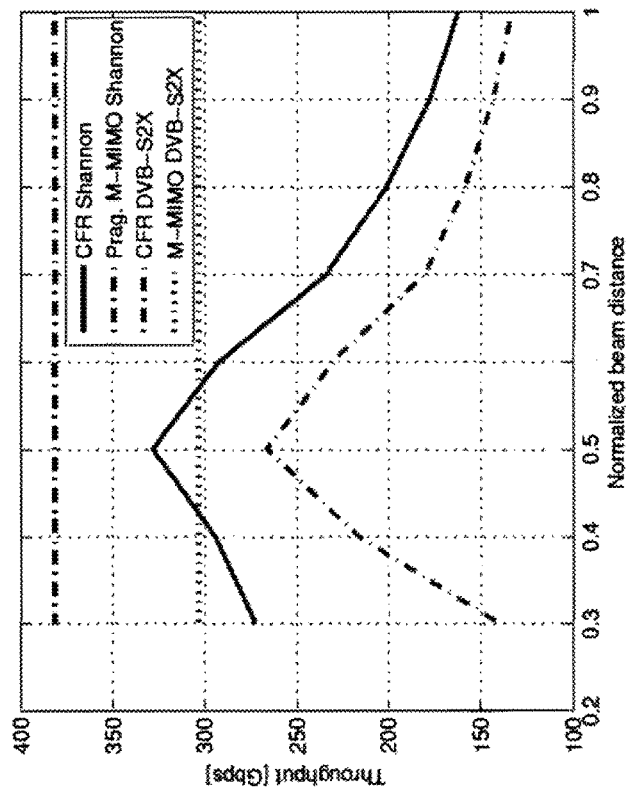
Figure 21B:
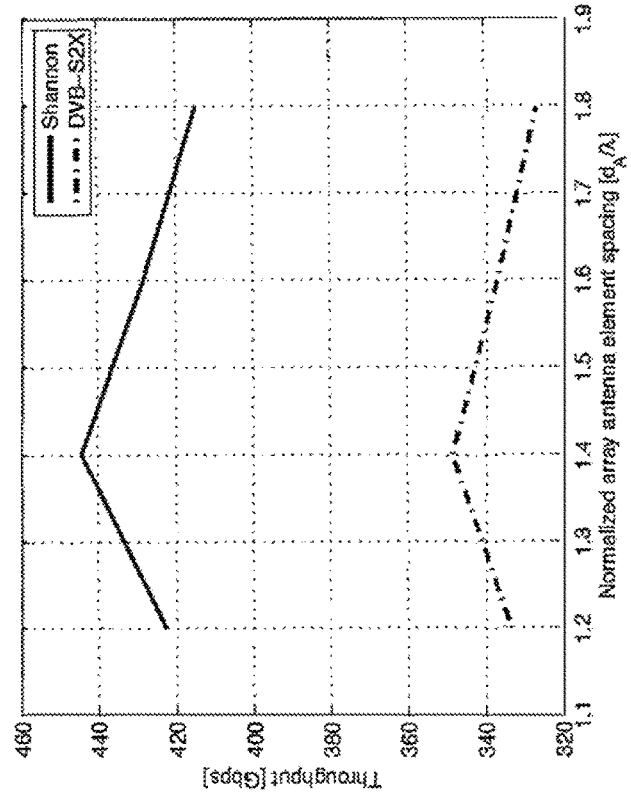
FIG. 21A and FIG. 21B show examples of simulated 4 colors throughputs for a 1.2×1.2 m DRA as a function of the array element spacing $d_A/\lambda$ for different total transmit powers $P_T^c$.
Figure 21A:
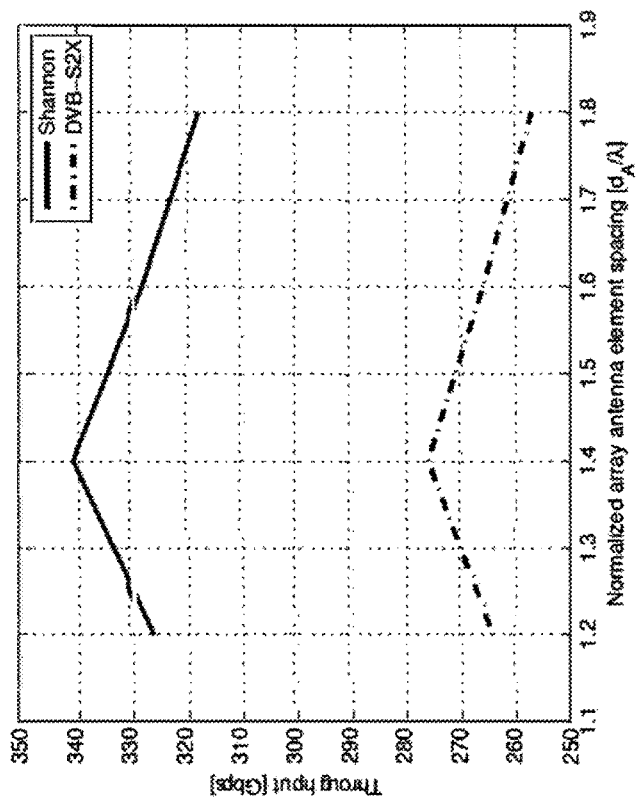

1) Medium Size Array with Reduced Spacing: First, the conventional 4 color frequency reuse scheme with the medium size 1.2 m DRA will be assessed, using the 2 kW RF power assumption. Results are reported in FIG. 20A to FIG. 21B. Of these, FIG. 20A and FIG. 20B show the simulated 4 colors throughput for a 1.2×1.2 m DRA as a function of the normalized beam spacing $S_{MB}^n$, assuming a total transmit power $P_T^c=2000$ W (FIG. 20A) or $P_T^c=4000$ W (FIG. 20B), as well as a user bandwidth $R_s=125$ Mbaud, a ratio $N_T/N_U=1$, and an array element spacing $d_A/\lambda=1.6$. FIG. 21A and FIG. 21B show the simulated 4 colors throughput for a 1.2×1.2 m DRA as a function of the array element spacing $d_A/\lambda$, assuming a total transmit power $P_T^c=2000$ W (FIG. 21A) or $P_T^c=4000$ W (FIG. 21B), as well as a user bandwidth $R_s=125$ Mbaud, a ratio $N_T/N_U=1$, and a normalized beam spacing $S_{MB}^n=0.5$. Looking at the results reported in FIG. 20A and FIG. 20B, it is interesting to observe that for $d_A/\lambda=1.6$ (although the same finding applies to $d_A/\lambda=1.4$), the throughput performance is highly dependent on the normalized beam spacing. The best result is obtained for $S_{MB}^n=0.5$. This means that also in a conventional 4 color frequency reuse scheme a quite large overlap among beams is preferable. This creates a larger co-channel interference contribution but also increases the amount of simultaneous active beams, hence served users, overall increasing the aggregated throughput up to $S_{MB}^n=0.5$. Beyond this value the interference increase is not counterbalanced by the increase of the number of active beams anymore. It should be remarked that this beam spacing approach is non-conventional as the conventional multi-beam antenna design assumes a normalized spacing $S_{MB}^n=1$. On the other hand, the DRA dependency on the radiating element spacing has been found to be rather weak, as can be seen from FIG. 21A and FIG. 21B. For consistency with M-MIMO results, for the reduced array spacing the slightly sub-optimum value of $d_A/\lambda=1.6$ has been used.

In general, embodiments of the disclosure may be said to employ normalized beam spacings $S_{MB}^n$ that are smaller than 1.

TABLE XVII

| Simulation system parameters | | | |
|---|---|---|---|
| Parameter | Symbol | Value | Unit |
| Number of Monte Carlo Trials | $N_{trials}$ | 10-30 | |
| Carrier frequency | $f_0$ | 20.0 | GHz |
| Total baud rate | $R_s^{TOT}$ | 500.00 | Msymb/s |
| Number of colors | $N_c$ | 4 | |
| Number of polarizations | $N_p$ | 1 | |

TABLE XVII-continued

Simulation system parameters

| Parameter | Symbol | Value | Unit |
|---|---|---|---|
| User baud rate | $R_s$ | 125.00 | Msymb/s |
| Total payload RF power | $P_T^c$ | 2.0-4.0 | kW |
| Minimum ACM physical layer SNIR | $SNIR_{min}$ | −10.00 | dB |
| Minimum satellite elevation angle | $\alpha_{min}$ | 5.00 | degrees |
| Array size | $D_A$ | 1.2-2.0 | m |
| Array element aperture efficiency | $\eta_E$ | −1 | dB |
| Array elements normalized spacing | $d_A/\lambda$ | 1.4-4.0 | |
| MB normalized beam spacing | $S_{MB}''$ | 0.3-1.0 | |
| Number of array elements | $N_T$ | 3328-12544 | |
| Number of beams/users ratio | $N_T/N_U$ | 1-4 | |
| Number of simultaneous active users | $N_U$ | 405-1805 | |
| Earth radius | $R_E$ | 6378 | km |
| Orbit height | $h_s$ | 35780 | km |
| User terminal antenna gain | $G_R^U$ | 41.45 | dBi |
| User terminal antenna noise temperature | $T_R^U$ | 224.5 | K |

Figure 22B:
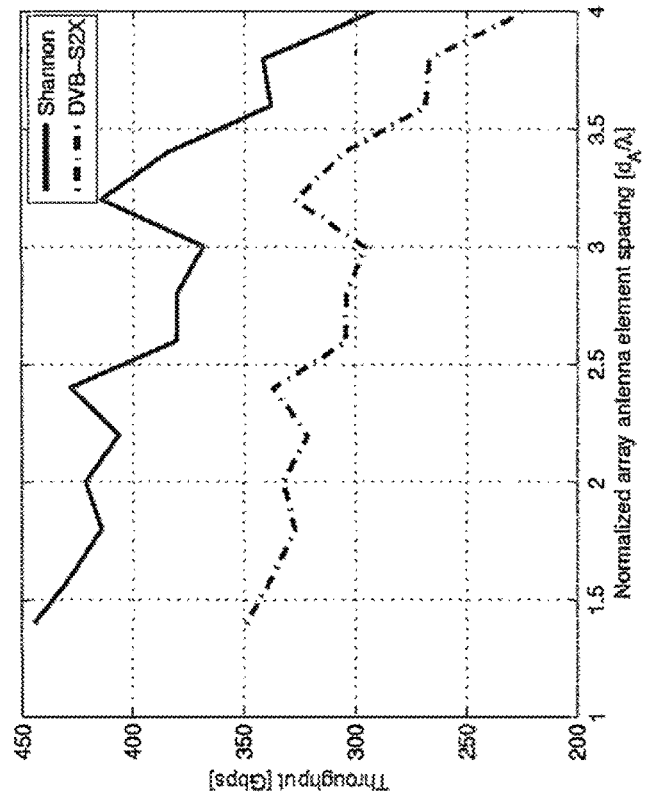
FIG. 22A and FIG. 22B show examples of simulated 4 colors throughputs for a 1.2×1.2 m DRA as a function of the array element spacing $d_A/\lambda$ for different total transmit powers $P_T^c$.
Figure 22A:
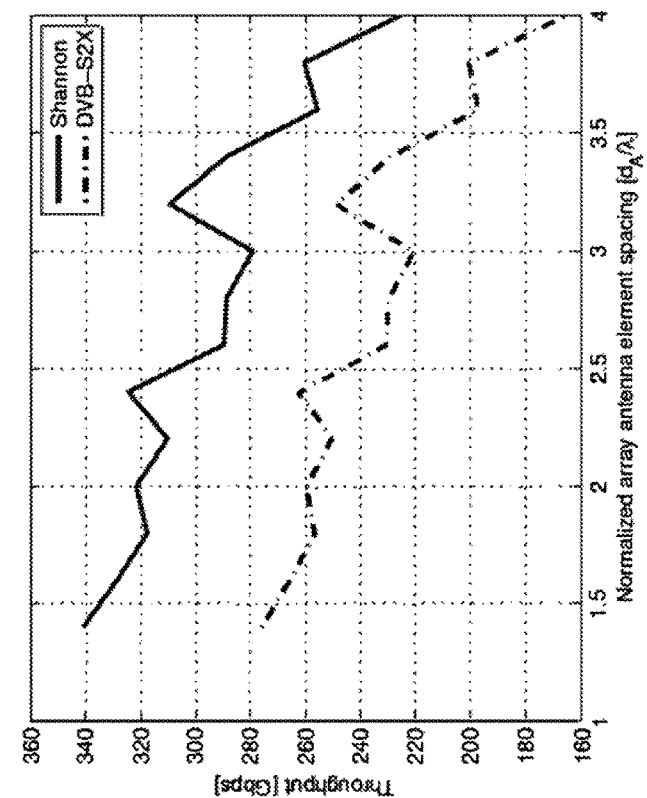
Figure 23B:
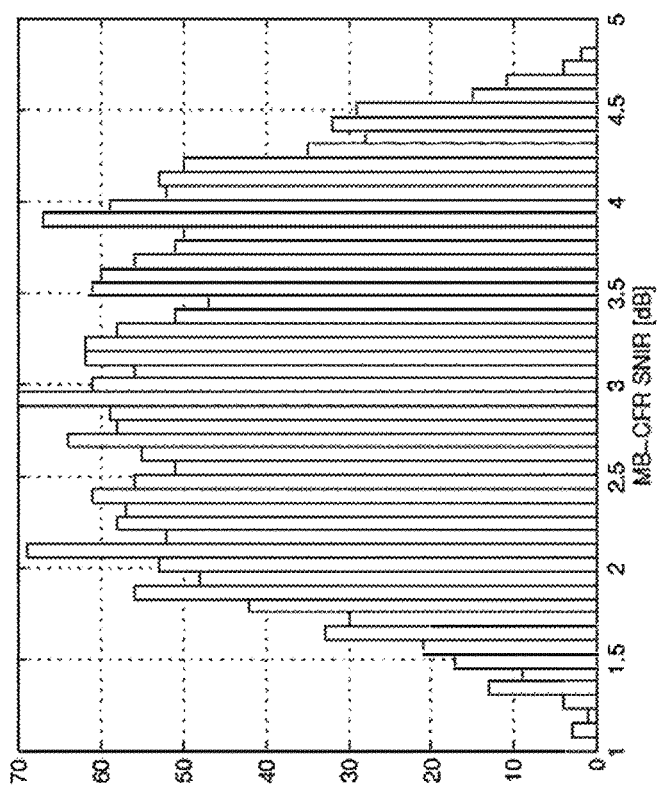
FIG. 23A and FIG. 23B show examples of a probability distribution function of simulated 4 colors SNIRs for a 1.2×1.2 m DRA for different values of the array element spacing $d_A/\lambda$.
Figure 23A:
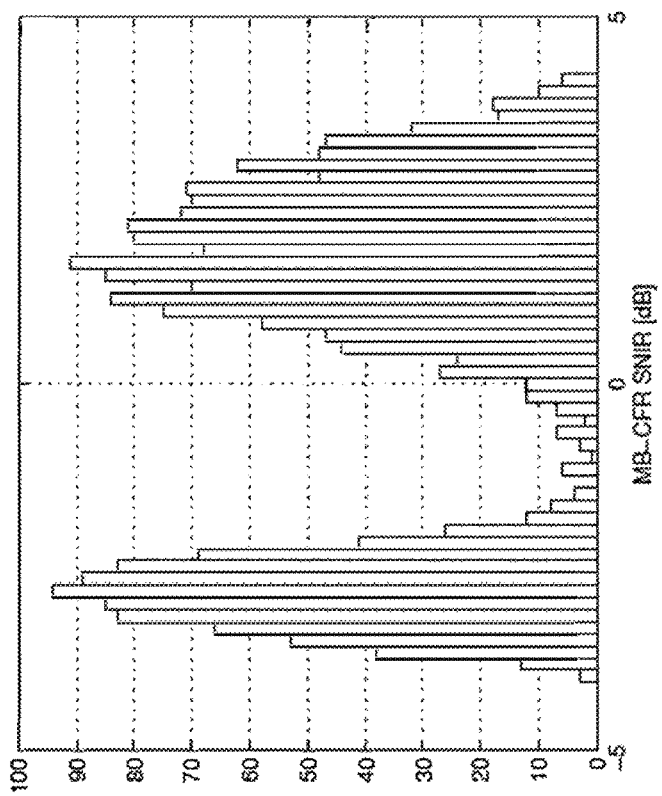
Figure 24B:
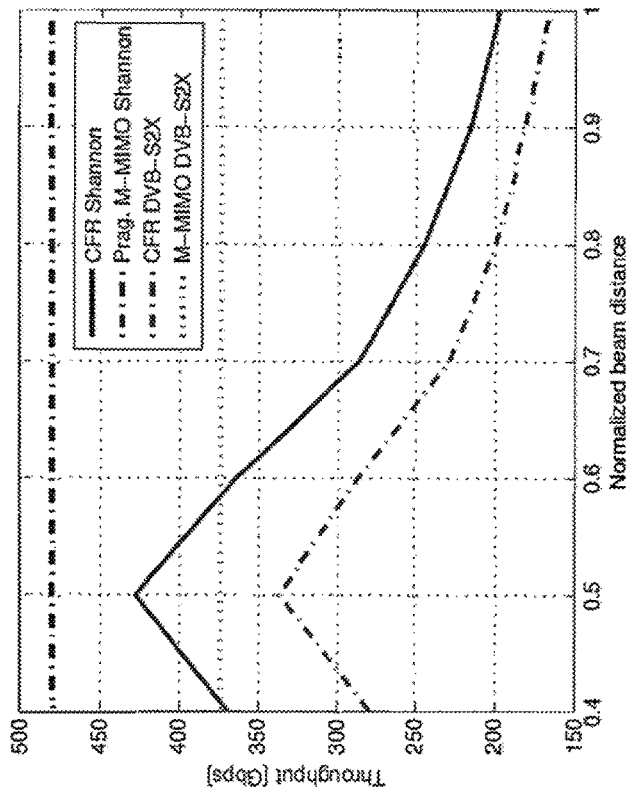
FIG. 24A and FIG. 24B show examples of simulated 4 colors throughputs for a 1.2×1.2 m DRA as a function of the normalized beam spacing $S_{MB}^n$ for different total transmit powers $P_T^c$.
Figure 24A:
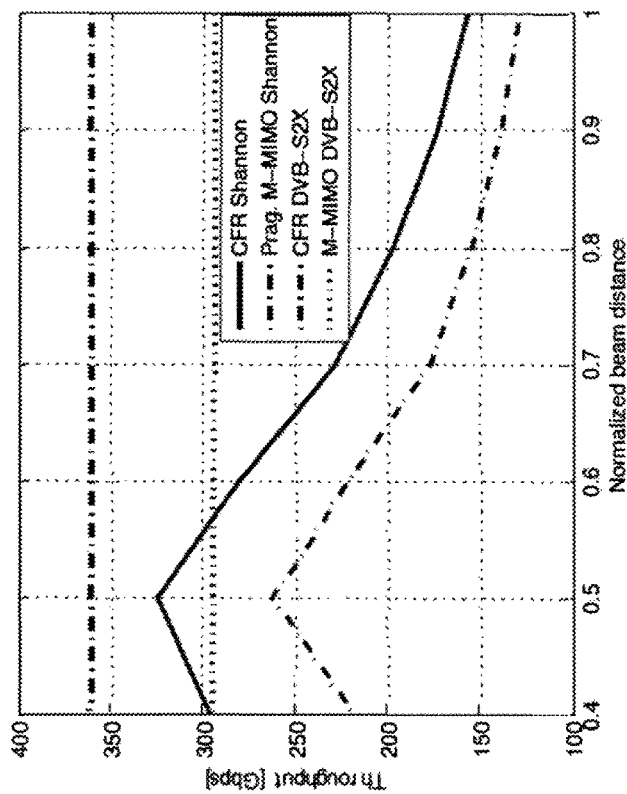

2) Large Size Array with Reduced Spacing: This option has not been investigated in the present context.
3) Medium Size Array with Relaxed Spacing: Similarly to what has been done for the M-MIMO case, the impact of a relaxation of the DRA feed elements distance has been investigated. This has been done to reduce the DRA complexity for the CFR configuration. The simulation results for a medium size array are summarized in FIG. 22A and FIG. 22B, which show the simulated 4 colors throughput for a 1.2×1.2 m DRA as a function of the array element spacing $d_A/\lambda$, assuming a total transmit power $P_T^c$=2000 W (FIG. 22A) or $P_T^c$=4000 W (FIG. 22B), as well as a user bandwidth $R_s$=125 Mbaud, a ratio $N_T/N_U$=1, and a normalized beam spacing $S_{MB}''$=0.5. It is evident that for CFR with a beam spacing $S_{MB}''$=0.5 the throughput dependency on the array feeds spacing is mild up to $d_A/\lambda$=2.4, for which value there is a secondary throughput peak. This secondary peak corresponds to a 1.2% throughput drop compared to $d_A/\lambda$=1.6. As noted in section III.B.2, this spacing allows to achieve a substantial reduction in terms of number of array elements (factor 2.16) with a throughput reduction limited to few percent. The throughput dependency on the beam spacing is reported in FIG. 24A and FIG. 24B, which show the simulated 4 colors throughput for a 1.2×1.2 m DRA as a function of the normalized beam spacing $S_{MB}''$, assuming a total transmit power $P_T^c$=2000 W (FIG. 24A) or $P_T^c$=4000 W (FIG. 24B), as well as a user bandwidth $R_s$=125 Mbaud, a ratio $N_T/N_U$=1, and an array element spacing $d_A/\lambda$=2.4. It is apparent that the typical spacing adopted in DRA corresponding to $d_A/\lambda$=3.6 provides sub-optimum results, i.e. a throughput reduction of 11% compared to $d_A/\lambda$=2.4. To explain this throughput dependency, FIG. 23A and FIG. 23B show a probability distribution function (PDF) of the simulated 4 colors SNIR for a 1.2×1.2 m DRA for two values of the array element spacing, i.e., $d_A/\lambda$=2.4 (FIG. 23A) and $d_A/\lambda$=3.6 (FIG. 23B), assuming a total transmit power $P_T^c$=4000 W, a user bandwidth $R_s$=125 Mbaud, a ratio $N_T/N_U$=1, and an MB normalized beam spacing $S_{MB}''$=0.5. The appearance of a secondary SNIR peak on the left side caused by the DRA grating lobes is apparent and explains the observed throughput reduction when increasing the spacing. The additional simulation results reported in FIG. 24A and FIG. 24B confirm the optimum value $S_{MB}''$=0.5 previously found for the case of reduced array spacing.

Figure 25B:
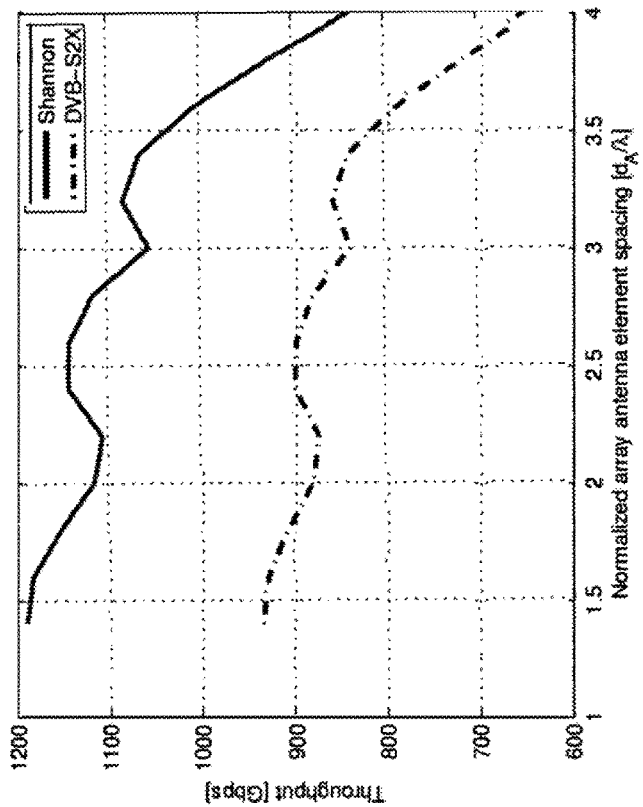
FIG. 25A and FIG. 25B show examples of simulated 4 colors throughputs for a 2.0×2.0 m DRA as a function of the array element spacing $d_A/\lambda$ different total transmit powers $P_T^c$.
Figure 25A:
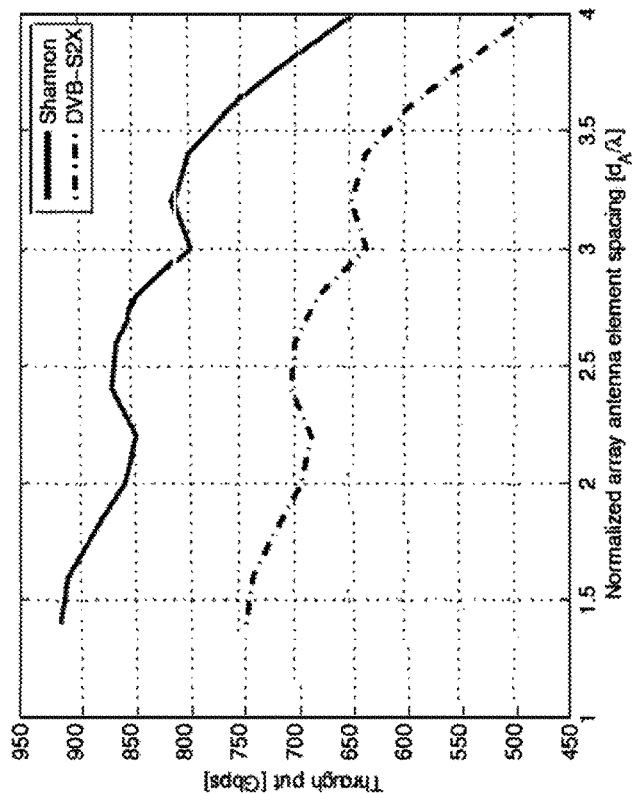
Figure 26A:
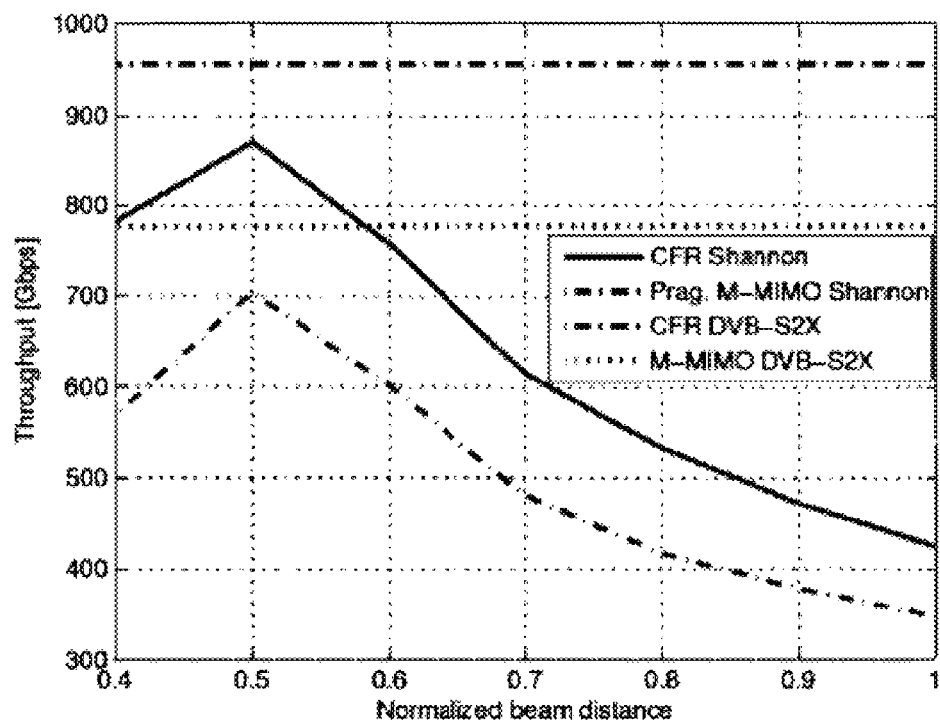
FIG. 26A and FIG. 26B show examples of simulated 4 colors throughputs for a 2.0×2.0 m DRA as a function of the normalized beam spacing $S_{MB}^n$ different total transmit powers $P_T^c$.
Figure 26B:
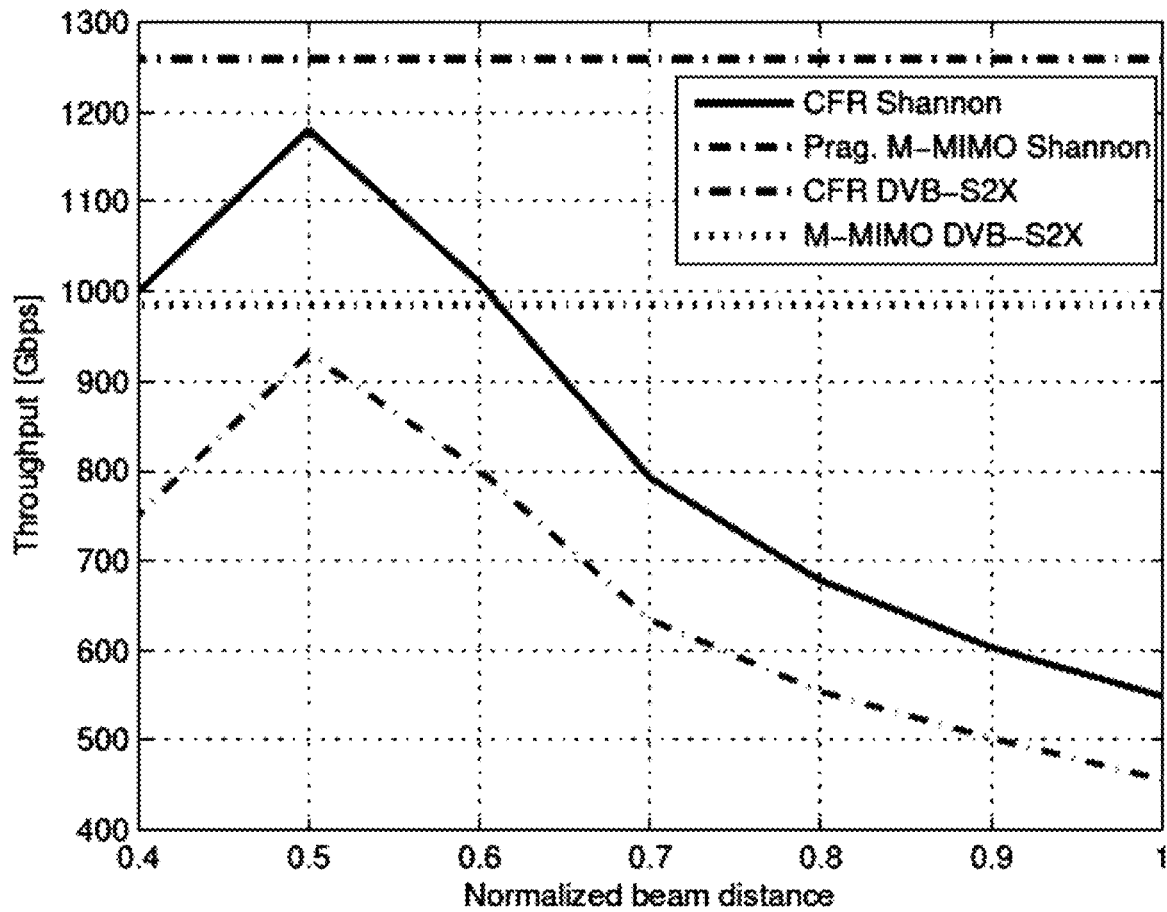

4) Large Size Array with Relaxed Spacing: The simulation results for a large size array are summarized in FIG. 25A and FIG. 25B which show the simulated 4 colors throughput for a 2.0×2.0 m DRA as a function of the array element spacing $d_A/\lambda$, assuming a total transmit power $P_T^c$=2000 W (FIG. 25A) or $P_T^c$=4000 W (FIG. 25B), as well as a user bandwidth $R_s$=125 Mbaud, a ratio $N_T/N_U$=1, and a normalized beam spacing $S_{MB}''$=0.5. It is evident that for 4CFR with beam spacing $S_{MB}''$=0.5, the throughput dependency on the array feeds spacing is mild up to $d_A/\lambda$=2.4, for which value there is a secondary throughput peak. This secondary peak corresponds to a 4.5% throughput drop compared to $d_A/\lambda$=1.6. As noted in section III.B.4, this spacing allows to achieve quasi-optimum M-MIMO throughput with a substantial reduction in terms of number of array elements (factor 2.25) and a throughput reduction limited to few percent. The typical spacing adopted in DRA, corresponding to $d_A/\lambda$=3.6, provides a throughput reduction of 13% compared to $d_A/\lambda$=2.4. The throughput dependency on the beam spacing is reported in FIG. 26A and FIG. 26B, which show the simulated 4 colors throughput for a 2.0×2.0 m DRA as a function of the normalized beam spacing $S_{MB}''$, assuming a total transmit power $P_T^c$=2000 W (FIG. 26A) or $P_T^c$=4000 W (FIG. 26B), as well as a user bandwidth $R_s$=125 Mbaud, a ratio $N_T/N_U$=1, and an array element spacing $d_A/\lambda$=2.4. These additional simulation results confirm the optimum beam spacing value $S_{MB}''$=0.5 previously found for the case of reduced array spacing. Similar to the full frequency reuse case reported in section III.B.3, the four colors frequency reuse throughput findings are not in line with the ones reported in Miller et al. In fact, while it has been found that there is a strong throughput dependency on the normalized beam spacing, this was not the case in Miller et al. Instead, according to Miller et al., there is a rather flat spectral efficiency (hence throughput) dependency on the beam spacing. This can be explained by the same arguments illustrated for the full frequency reuse case. In the following, the label CFR++ will be used to indicate the CFR configuration corresponding to reduced beam spacing (e.g., $S_{MB}''$=0.5) and the label CFR will be used to indicate the configuration corresponding to conventional beam spacing (e.g., $S_{MB}''$=1.0).

IV.C. Summary Comparison of CFR vs M-MIMO Results

In the following, a summary comparison of throughput performance for the optimized M-MIMO and 4CFR/4CFR++ configurations for the medium and large array cases will be provided.

1) Medium Array: The medium array M-MIMO and CFR comparison is reported in Table XVIII and Table XIX for the Shannon and DVB-S2X cases, respectively. It is apparent that 4CFR++ provides a great performance improvement (i.e., a throughput doubling) over 4CFR. The M-MIMO MB adds some extra performance boost compared to 4CFR++. It should be recalled that while the pragmatic MB-MIMO and 4CFR/4CFR++ performances are achievable in practice, MMSE M-MIMO represents a theoretical upper bound as it will require perfect channel estimation and complex on-board processing. The MMSE throughput advantage compared to 4CFR and M-MIMO-MB increases with the payload power due to its capability to better cope with the co-channel interference. However, for a realistic RF power $P_T^c=2$ kW assumption, the M-MIMO-MB loss with respect to ideal MMSE is only 9%, at significantly decreased system complexity.

TABLE XVIII

Throughput comparison 4CFR vs M-MIMO with Shannon for a 1.2 × 1.2m DRA with optimized narrow feed spacing

| | Throughput Shannon (Gbps) DRA total RF power $P_T^c$ (W) | | Relative throughput performance % vs | |
|---|---|---|---|---|
| Technique | 2000 | 4000 | 4CFR | 4CFR++ |
| 4CFR | 1.5733e+02 | 1.9780e+02 | 0/0 | |
| 4CFR++ | 3.2430e+02 | 4.2845e+02 | 106.1/116.6 | 0/0 |
| M-MIMO MB | 3.6108e+02 | 4.7978e+02 | 129.5/142.6 | 11.3/12.0 |
| M-MIMO MMSE | 3.8883e+02 | 5.3942e+02 | 117.1/172.7 | 19.9/25.9 |

2) Large Array: The medium array M-MIMO and CFR comparison is reported in Table XX and Table XXI for the Shannon and DVB-S2X cases, respectively. The same considerations reported for the medium array case are also applicable here.

TABLE XIX

Throughput comparison 4CFR vs M-MIMO with DVB-S2X for a 1.2 × 1.2m DRA with optimized relaxed feed spacing (D/λ = 2.4)

| | Throughput DVB-S2X (Gbps) DRA total RF power $P_T^c$ (W) | | Relative throughput performance % vs | |
|---|---|---|---|---|
| Technique | 2000 | 4000 | 4CFR | 4CFR++ |
| 4CFR | 1.2850e+02 | 1.6418e+02 | 0/0 | |
| 4CFR++ | 2.6230e+02 | 3.3691e+02 | 104.1/105.2 | 0/0 |
| M-MIMO MB | 2.9425e+02 | 3.7388e+02 | 129.0/127.7 | 11.0/11.0 |
| M-MIMO MMSE | 3.1538e+02 | 4.2243e+02 | 145.4/157.3 | 20.2/25.4 |

TABLE XX

Throughput comparison 4CFR vs M-MIMO with Shannon for a 2.0 × 1.2m DRA with relaxed feed spacing (D/λ = 2.4)

| | Throughput Shannon (Gbps) DRA total RF power $P_T^c$ (W) | | Relative throughput performance % vs | |
|---|---|---|---|---|
| Technique | 2000 | 4000 | 4CFR | 4CFR++ |
| 4CFR | 4.2495e+02 | 5.4908e+02 | 0/0 | |
| 4CFR++ | 8.7059e+02 | 1.1820e+03 | 104.9/115.2 | 0/0 |
| M-MIMO MB | 9.5716e+02 | 1.2595e+03 | 125.2/129.4 | 10.0/6.6 |
| M-MIMO MMSE | 1.0237e+03 | 1.3947e+03 | 140.9/154.0 | 17.6/17.6 |

TABLE XXI

Throughput comparison 4CFR vs M-MIMO with DVB-S2X for a 2.0 × 1.2m DRA with relaxed feed spacing (D/λ = 2.4)

| | Throughput DVB-S2X (Gbps) DRA total RF power $P_T^c$ (W) | | Relative throughput performance % vs | |
|---|---|---|---|---|
| Technique | 2000 | 4000 | 4CFR | 4CFR++ |
| 4CFR | 3.4724e+02 | 4.5600e+02 | 0/0 | |
| 4CFR++ | 7.0389e+02 | 9.3055e+03 | 102.7/104.1 | 0/0 |
| M-MIMO MB | 7.7768e+02 | 9.8498e+02 | 124.0/116.0 | 9.9/5.9 |
| M-MIMO MMSE | 8.3523e+03 | 1.0834e+03 | 140.5/137.6 | 18.7/16.1 |

V. OVERALL RESULTS SUMMARY

The summaries of the simulated throughput exploiting the optimized configurations are reported in Table XXII and Table XXIII for the Shannon and DVB-S2X cases, respectively. It can be observed that the throughput almost grows with the square of the array dimension $D_A$. Further, as observed before, the throughput shows a logarithmic dependency on the RF power. It is also noted that the MB M-MIMO approach closely follows the MF performance. The ZF algorithm performance on the other hand is penalized for the selected DRA configuration, as for the selected array spacing it is affected by heavy outage probability, thus not usable in practice. MMSE results, although slightly better, are obtained assuming perfect channel estimation. In practice, even assuming that the MMSE matrix inversion is implementable, channel estimation errors and other implementation aspects in a satellite systems will make this scheme less appealing than the MB M-MIMO. MB M-MIMO is also highly attractive for non GEO orbits where the constellation dynamics will make solutions based on channel estimate even less attractive.

TABLE XXII

CFR and M-MIMO Shannon throughput results

| Configuration | | | Throughput Shannon (Gbps) | | | | |
|---|---|---|---|---|---|---|---|
| $R_s$ (Mbaud) | $D_A$ (m) | $P_T^c$ (kW) | CFR++ | MB | MF | ZF | MMSE |
| 500 | 1.2 | 2 | 3.24e+02 | 3.60e+02 | 3.69e+02 | 1.00e+02 | 3.89e+02 |
| 500 | 1.2 | 4 | 4.28e+02 | 4.80e+02 | 4.93e+02 | 1.55e+02 | 5.39e+02 |
| 500 | 2.0 | 2 | 8.71e+02 | 9.57e+02 | 9.81e+02 | 6.57e+01 | 1.02e+03 |
| 500 | 2.0 | 4 | 1.18e+03 | 1.26e+03 | 1.29e+03 | 9.28e+01 | 1.39e+03 |

TABLE XXIII

CFR and M-MIMO DVB-S2X throughput results

| Configuration | | | Throughput DVB-S2X (Gbps) | | | | |
|---|---|---|---|---|---|---|---|
| $R_s$ (Mbaud) | $D_A$ (m) | $P_T^c$ (kW) | CFR++ | MB | MF | ZF | MMSE |
| 500 | 1.2 | 2 | 2.62e+02 | 2.93e+02 | 3.01e+02 | 7.49e+01 | 3.15e+02 |
| 500 | 1.2 | 4 | 3.37e+02 | 3.74e+02 | 3.83e+02 | 1.18e+02 | 4.22e+02 |
| 500 | 2.0 | 2 | 7.04e+02 | 7.78e+02 | 8.00e+02 | 4.72e+01 | 8.35e+03 |
| 500 | 2.0 | 4 | 9.31e+02 | 9.85e+02 | 1.01e+03 | 6.88e+01 | 1.08e+03 |

The normalized payload efficiency results are reported in Table XXIV and Table XXV for the Shannon and DVB-S2X cases, respectively. It is interesting to note that the best results are obtained for $P_T^c$=2 kW while $\eta_P$ slightly degrades when passing from $D_A$=2 m to $D_A$=4 m. Clearly the absolute throughput improves when increasing the DRA size.

TABLE XXIV

CFR and M-MIMO Shannon normalized payload efficiency results

| Configuration | | | Payload efficiency Shannon (Mbps/(Mbaud · W/m²)) | | | | |
|---|---|---|---|---|---|---|---|
| $R_s$ (Mbaud) | $D_A$ (m) | $P_T^c$ (kW) | CFR++ | MB | MF | ZF | MMSE |
| 500 | 1.2 | 2 | 2.25e+01 | 2.50e+01 | 2.57e+01 | 6.97e+02 | 2.70e+01 |
| 500 | 1.2 | 4 | 1.49e+01 | 1.67e+01 | 1.71e+01 | 5.39e+02 | 1.87e+01 |
| 500 | 2.0 | 2 | 2.18e+01 | 2.39e+01 | 2.45e+01 | 1.64e+02 | 2.56e+01 |
| 500 | 2.0 | 4 | 1.48e+01 | 1.57e+01 | 1.62e+01 | 1.16e+02 | 1.74e+01 |

TABLE XXV

CFR and M-MIMO DVB-S2X normalized payload efficiency results

| Configuration | | | Payload efficiency DVB-S2X (Mbps/(Mbaud · W/m²)) | | | | |
|---|---|---|---|---|---|---|---|
| $R_s$ (Mbaud) | $D_A$ (m) | $P_T^c$ (kW) | CFR++ | MB | MF | ZF | MMSE |
| 500 | 1.2 | 2 | 1.82e+01 | 2.04e+01 | 2.09e+01 | 5.20e+02 | 2.19e+01 |
| 500 | 1.2 | 4 | 1.17e+01 | 1.30e+01 | 1.33e+01 | 4.11e+02 | 1.47e+01 |
| 500 | 2.0 | 2 | 1.76e+01 | 1.94e+01 | 2.00e+01 | 1.18e+02 | 2.09e+01 |
| 500 | 2.0 | 4 | 1.16e+01 | 1.23e+01 | 1.26e+01 | 8.61e+03 | 1.35e+01 |

VI. ARRAY OPTIMIZATION METHODOLOGY

Next, techniques and schemes for array optimization and for designing a multi-beam active antenna system will be described. Two main examples relate to M-MIMO and CFR use cases. These techniques and schemes are based on the findings described above. The proposed techniques and schemes may relate to the MB M-MIMO and CFR++ use cases described above.

Both use cases assume that it is preferable to use a larger (relaxed) array feeds spacing to reduce the number of feed elements and associated payload complexity. The methodology, despite having been derived for a GEO antenna case, is also applicable to the MEO and LEO cases. In the latter cases, the suggested DRA parameters' initial values may require some adaptation. The methodology may be further applicable with proper initial parameters adaptations to a terrestrial hub station.

Figure 27:
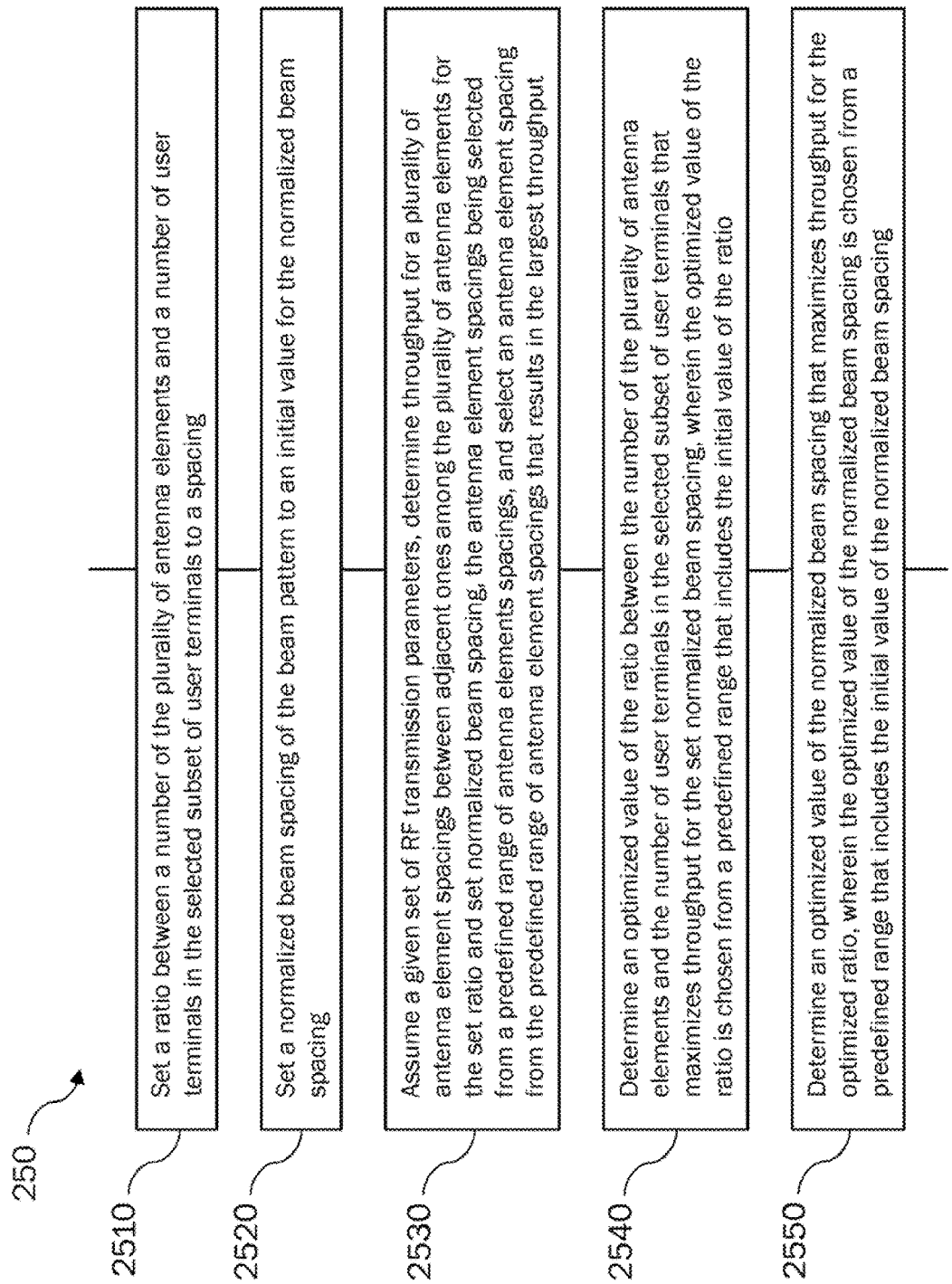
FIG. 27 shows, in flowchart form, an example of a method of determining antenna parameters and a beam pattern for a hub station according to embodiments of the disclosure.

In general, the array optimization relates to, corresponds to, or involves a method of determining antenna parameters and a beam pattern for a hub station (e.g., hub station 100 described below in connection with FIG. 31) that comprises an active antenna array with a plurality of antenna elements and that performs wireless communications with a plurality of user terminals. An example of such method 250 is illustrated, in flowchart form, in FIG. 27.

The method 250 may be a design method, for example. It is assumed that the hub station transmits radio signals in subsets of beams among a plurality of fixed beams (e.g., fixed equidistant beams). The fixed beams may have a beam pattern in which beam centers are arranged at the vertices of a lattice (e.g., regular lattice). It is further assumed that the hub station, for each of a plurality of radio resource blocks, selects a subset of user terminals among the plurality of user terminals, and, for each user terminal among the selected subset of user terminals, determines a beam center that is closest to a location of the respective user terminal. It is yet further assumed that the hub station transmits radio signals to the user terminals among the selected subset of user terminals, in the beams corresponding to the determined beam centers.

Given these assumptions, the method 250 comprises a step 2510 of setting a ratio $N_T/N_U$ between a number $N_T$ of the plurality of antenna elements and a number $N_U$ of user terminals in the selected subset of user terminals to a predefined initial value for the ratio. This step may correspond to STEP 1-3 described in sections VI.A and VI.B below. For instance, the initial value may be 2 for pragmatic MB M-MIMO or 1 for optimized CFR (i.e., CFR++).

The method further comprises a step 2520 of setting a normalized beam spacing $S_{MB}^n$ of the beam pattern to an initial value for the normalized beam spacing. This step may correspond to STEP 1-3 described in section VI.A or to STEP 1-2 described in section VI.B described below.

The method further comprises a step 2530 of, assuming a given set of RF transmission parameters, determining throughput for a plurality of antenna element spacings between adjacent ones among the plurality of antenna elements for the set ratio and set normalized beam spacing, wherein the antenna element spacings are selected from a predefined range of antenna elements spacings, and selecting an antenna element spacing from the predefined range of antenna element spacings that results in the largest throughput. The RF transmission parameters may include a maximum available user link bandwidth, an overall payload RF power, a maximum carrier baud rate, a transmit filter roll-off factor, and/or a number of carriers, for example. Determining the throughput may further assume either a RRM scheme or a CFR scheme. The initial values of the foregoing steps may be different depending on the assumed scheme. This step may correspond to STEP 1-4 and STEP 1-5 described in sections VI.A and VI.B below. The RF transmission parameters may be defined in accordance with any or all sub-steps of STEP 0 described in sections VI.A and VI.B below. In general, this step may be said to determine an optimized antenna element spacing between adjacent ones among the plurality of antenna elements for fixed ratio and fixed normalized beam spacing, seeking to maximize the throughput.

The method further comprises a step 2540 of determining an optimized value of the ratio between the number of the plurality of antenna elements and the number of user terminals in the selected subset of user terminals that maximizes throughput for the set normalized beam spacing, wherein the optimized value of the ratio is chosen from a predefined range that includes the initial value of the ratio. This step may correspond to STEP 2-2 described in section VI.A below or STEP 2-1 described in section VI.B below.

The method further comprises a step 2550 of determining an optimized value of the normalized beam spacing that maximizes throughput for the optimized ratio, wherein the optimized value of the normalized beam spacing is chosen from a predefined range that includes the initial value of the normalized beam spacing. This step may correspond to STEP 2-3 described in section VI.A below or STEP 2-2 described in section VI.B below.

VI.A. M-MIMO Active Antenna Design Methodology

Given the system and DRA antenna/payload key parameters, the active antenna design methodology for the M-MIMO use case (e.g., MB M-MIMO) follows the two steps methodology described below.

Step 0:
0-1) Define the maximum available user link bandwidth $[B_w]_T$ and overall payload RF power $P_T$.
0-2) Define the maximum carrier baud rate $R_s$ and the transmit filter roll-off factor $\delta$ with $0<\delta<1$ to fit an integer number of carriers $N_c$ $$N_c = \left\lfloor \frac{[B_w]_T}{R_s(1+\delta)} \right\rfloor. \tag{97}$$

0-3) Derive the per carrier RF power $P_T^c$ as $$P_T^c = \frac{P_T}{N_c}. \tag{98}$$

In case of non-uniform traffic, if more power and/or bandwidth is to be dedicated to hot spot areas, the per carrier RF power would have to be adjusted accordingly.

Step 1:
1-1) Select a power normalization approach, such as the CTTC DRA power normalization approach (which in general provides the best results), for example. Other power normalization approaches are feasible as well.
1-2) Select a RRM approach, such as the MD-MIQP RRM approach with a given normalized spacing $\rho_{min}$, for example $\rho_{min}=1.1$.
1-3) Initially assume a value for $N_T/N_U$, for example $N_T/N_U=2$, with a given value of the MB normalized spacing $S_{MB}^n$, for example $S_{MB}^n=0.2$ (unless smaller values can be accepted to be implemented by the payload digital processor).
1-4) Compute the M-MIMO throughput (e.g., MF, MB, or MMSE) for DRA feed spacing $D/\lambda$ spanning a predefined range, for example the range from 1.6 to 2.6. This may be done for example in the manner described above in section II.E.2.
1-5) Select the $D/\lambda$ that provides the largest throughput. This may optionally involve checking that there is no outage condition (or at least acceptable outage probability) over the coverage region (e.g., ROI).

Step 2:
2-1) Optionally, verify that for the selected system operating point the selected power normalization approach (e.g., CTTC power optimization approach) is giving better or equal results than the modified Taricco approach.
2-2) Verify that the selected $N_T/N_U$ value (e.g., $N_T/N_U=2$) provides the highest throughput simulating the throughput for $N_T/N_U$ values around the initial value (e.g., around 2).
2-3) Optionally, verify that the given value of the normalized spacing (e.g., $\rho_{min}=1.1$) provides the highest throughput.
2-4) Optionally, compute the MB M-MIMO technique throughput loss versus the MF and MMSE techniques.

VI.B. CFR Active Antenna Design Methodology

Given the system and DRA antenna/payload key parameters the active antenna design methodology for the CFR use case (e.g., CFR++) follows the two steps methodology described below.

Step 0:
0-1) Define the maximum available user link bandwidth $[B_w]_T$ and overall payload RF power $P_T$.
0-2) Define the maximum carrier baud rate $R_s$ and the transmit filter roll-off factor $\delta$ with $0<\delta<1$ to fit an integer number of carriers $N_c$ $$N_c = \left\lfloor \frac{[B_w]_T}{R_s(1+\delta)} \right\rfloor. \tag{99}$$

0-3) Allocate the per carrier RF power $P_T^c$ as $$P_T^c = P_T/N_c. \tag{100}$$

Step 1:
1-1) Select a 4CFR scheme.
1-2) Select a normalized beam spacing $S_{MB}''$, for example $S_{MB}''=0.5$.
1-3) Initially assume a value for $N_T/N_U$, for example $N_T/N_U=1$.
1-4) Compute the throughput for DRA feed spacing $D/\lambda$ spanning a predefined range, for example the range from 1.6 to 2.6.
1-5) Select the $D/\lambda$ providing the largest throughput. This may optionally involve checking that there is no outage condition over the coverage region.

Step 2:
2-1) Verify that the $N_T/N_U$ value (e.g., $N_T/N_U=1$) provides the highest throughput, for example by simulating the throughput for $N_T/N_U$ values around the initial value (e.g., around 1).
2-2) Optionally, verify that the given value of the normalized beam spacing (e.g., $S_{MB}''=0.5$) provides the highest throughput.
2-3) Optionally, compute the CFR technique versus MB M-MIMO, MF, and MMSE.

VII. SYSTEM AND PAYLOAD DESIGN

From the above M-MIMO active antenna design and optimization methodology it may be concluded that two main novel elements are key enablers for the achievement of a capacity boost with limited system and payload complexity impact:
 a payload architecture with a large number active beams selectable from an high density fixed lattice of beams (MB); and
 a Radio Resource Management (RRM) optimizing the selection of users sharing the same time/frequency slots.

In the following, these two elements will be described in more detail.

VII.A. Switched MB M-MIMO Payload Architecture

Figure 28:
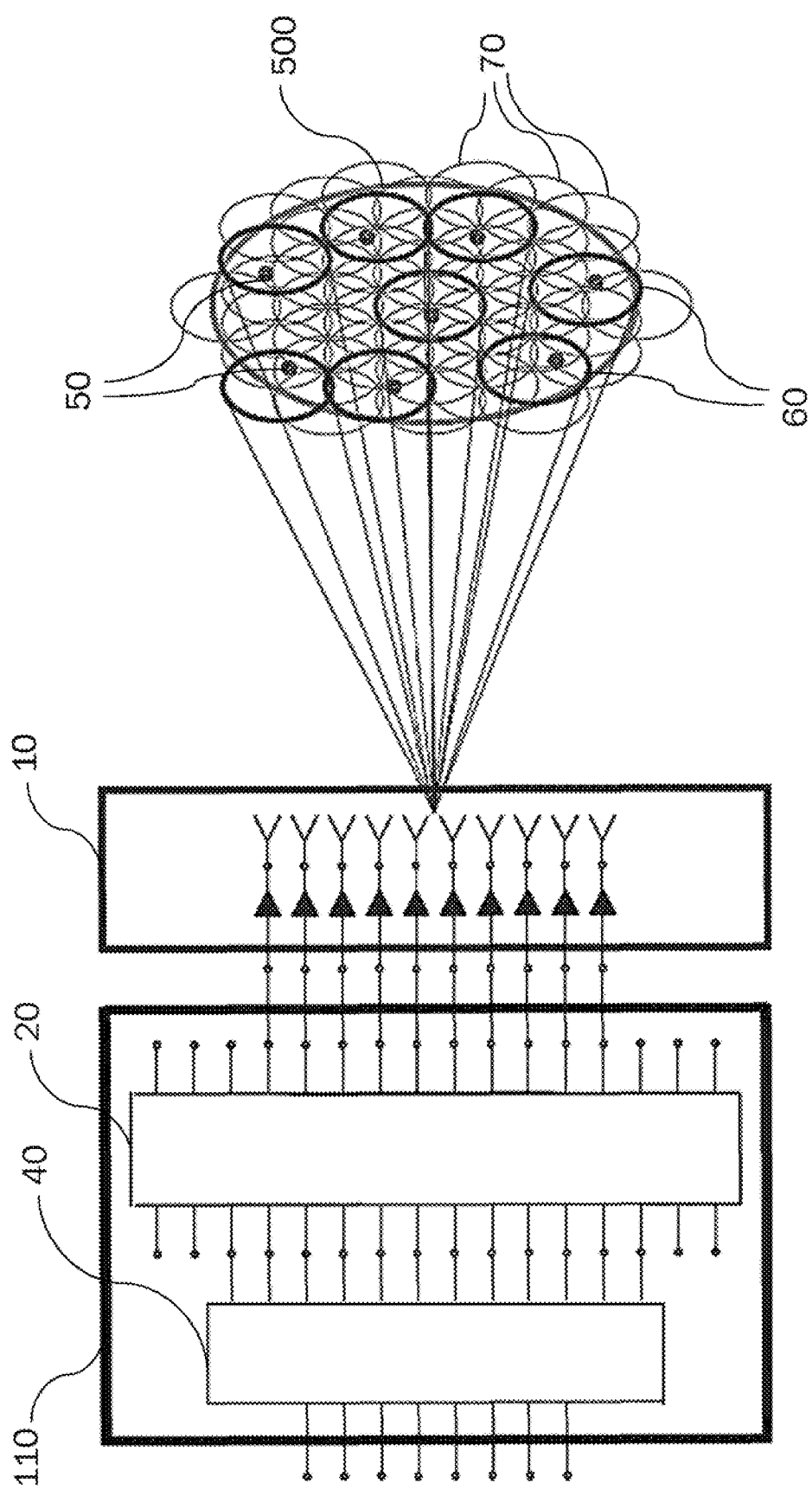
FIG. 28 schematically illustrates an example of a high level block diagram of a satellite payload according to embodiments of the disclosure.
Figure 29:
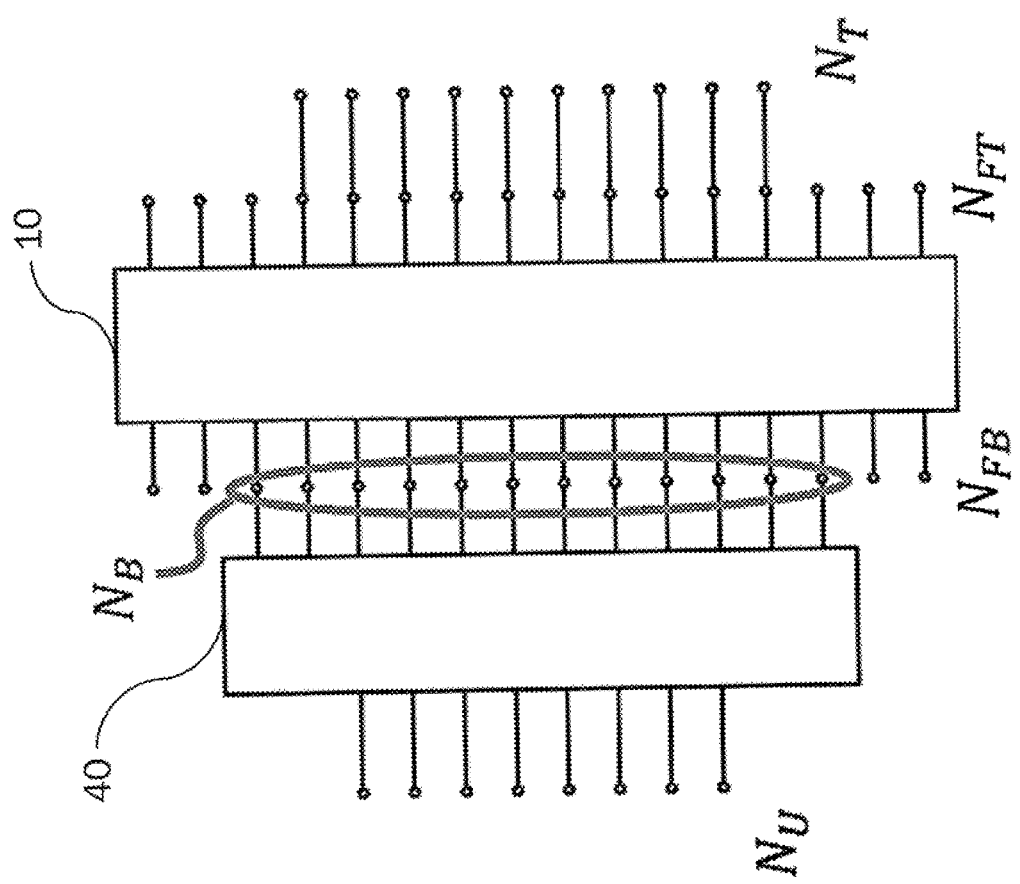
FIG. 29 schematically illustrates details of the satellite payload.
Figure 30:
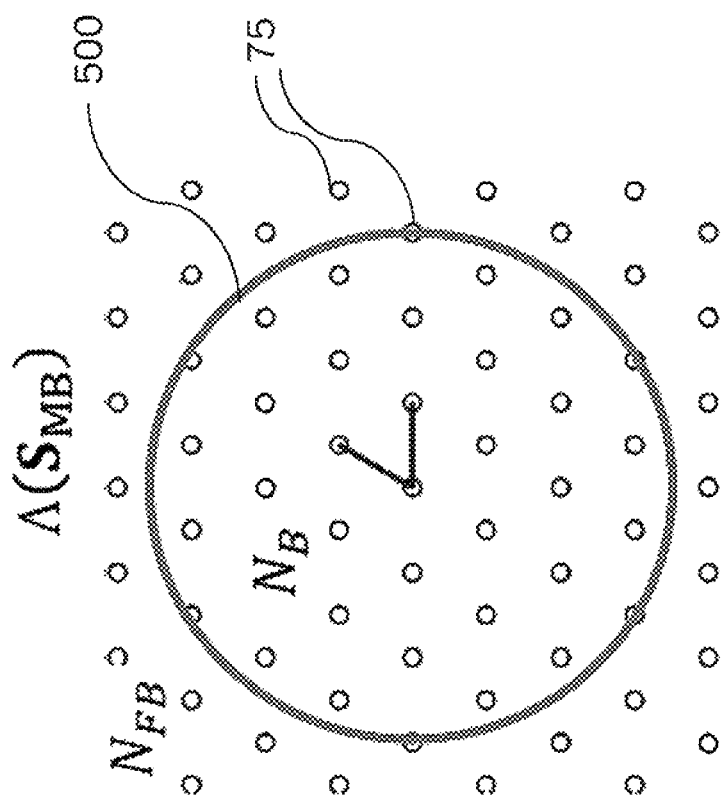
FIG. 30 schematically illustrates an example of a ROI for the satellite payload.

One main element of the payload is the bulk beamforming stage constituted by a bi-dimensional fixed beam beamforming (FB-BFN) matrix realizing the high-density fixed beam lattice. A beam selection matrix (BSM) allows to select and address the active ones out of the full number of available beams that can be generated by the fixed beam beamforming matrix. A high level block diagram of the payload is illustrated in FIG. 28. Details of the beamforming stage of the payload are schematically illustrated in FIG. 29 and the ROI for this configuration is schematically illustrated in FIG. 30.

The FB-BFN matrix should generate a pre-defined set of $N_B$ beams with beam centers corresponding to the points of the lattice $\Lambda(S_{MB})$ within the disk of radius $\sin(\vartheta_{max})$ in the u,v space. Efficient techniques for beamforming pose additional constraints on the number of input ports and number of output ports corresponding to real or fictitious array elements. For this reason, the disclosure proposes an oversized FB-BFN matrix with a number of input ports $N_{FB}$ and a number of output ports $N_{FT}$. Of the $N_{FT}$ output logic ports, $N_T$ correspond to physical radiating elements. If the beamforming is performed in the digital domain, these $N_T$ ports must be physically implemented with corresponding Digital-to-Analog mixed signal converters. Similarly to the total number of input ports $N_{FB}$ of the fixed-beam beamforming matrix, some of the input ports corresponds to beams with steering directions outside the desired region-of-interest and do not need to be interconnected to previous stages. The beam selection matrix has a number of inputs equal to the number of instantaneous active users $N_U$ and needs to access the useful $N_B$ ports of the fixed-beam beamforming matrix. While a general non-blocking architecture would be suitable, complexity reduction of the number of nodes of the beam selection matrix can be obtained considering that some switching flexibility is realized by the previous stages of the payload or in the mapping of the feeder-link up-link with the accessible inputs of the beam selection matrix.

Thus, according to embodiments of the disclosure, the beamforming/precoding matrix (or mapping matrix) of dimension ($N_T \times N_U$) is obtainable based on a fixed beamforming matrix and a beam switching matrix (e.g., the aforementioned beam selection matrix). The fixed beamforming matrix is (at least) of dimension ($N_T \times N_B$) for generating the $N_B$ fixed beams with the array of $N_T$ antenna elements, by mapping signals intended for the $N_B$ fixed beams to the signals for transmission by respective antenna elements. The beam switching matrix is of dimension ($N_B \times N_U$) for selecting the beams in the subset of active beams by interconnecting each signal intended for a user terminal among the selected subset of user terminals to a respective input of the fixed beamforming matrix corresponding to that beam that has been selected for the respective user terminal (e.g., that has its beam center closest to the respective user terminal).

Concerning the fixed-beam beamforming matrix, it can be realized by means of efficient multistage networks which exploit the "divide and conquer" paradigm for solving large problems by partitioning them into a set of smaller subproblems that are easier to solve. An example of multistage networks is Fast Fourier Transform (FFT), which is a complexity reduced technique for implementing the Discrete Fourier Transform (DFT). It can be applied to periodic 1D lattices of radiating elements and periodic 1D lattices of fan-beams. Stacks of orthogonal 1D-FFTs can be employed in beamforming networks for planar phased arrays with placement both of the radiating elements and of the beams in a rectangular arrangement. For non-rectangular placement of the radiating elements and/or beams, more complex theoretical frameworks must be employed such as those relevant to the Multi-Dimensional FFT (MD-FFT) reported in P. Angeletti, "Multiple Beams From Planar Arrays", IEEE Transactions on Antennas and Propagation, Vol. 62, No. 4, pp. 1750-1761, April 2014.

Techniques based on MD-FFTs for planar lattices are particularly well suited for periodic arrays and have been implemented, tested, and validated in a real-time proof-of-concept demonstrator (see C. Topping, A. M. Bishop, A. D. Craig, D. M. Howe, J. Hamer, P. Angeletti, A. Senior, S-UMTS Processor Key Technologies Demonstrator, Proceedings of the 10th International Workshop on Signal Processing for Space, Rhodes Island, Greece, 6-8 Oct. 2008) for arrays with a number of beams to be generated equal to the number of antenna elements. In the present case, the high overlapping of the beams requires an oversizing of the MD-FFT and FFT input pruning. Zero padding or Reconfigurable-MD-FFT architectures can offer further advantages in terms of complexity reduction when there is a large unbalance in the numbers $N_B$, $N_{FB}$, $N_{FT}$, and $N_T$. In general, the fixed beamforming matrix may be implemented, for example, by one of an oversized Butler matrix circuit, a discrete lens array, an oversized Fast Fourier Transform circuit, or a combination thereof.

To appreciate the advantages in complexity reduction of a multistage fixed-beam beamforming matrix based on a multi-stage MD-FFT, it has to be compared to the multiplicative complexity of a standard reconfigurable beamforming network generating $N_U$ beams with $N_T$ antenna elements which would typically require $N_U N_T$ complex multiplications. The complexity of such a network would make it impractical due to the associated power consumption. Instead, the multiplicative complexity of a multistage MD-FFT grows with $N \log_2(N)$, where N in the worst case is the maximum between $N_{FB}$ and $N_{FT}$. Depending on the amount of beam overlap, the proposed approach can provide a multiplicative complexity reduction factor from 4 to 100. Furthermore, while a standard reconfigurable BFN must rely on general purpose non-optimized complex multipliers, the arithmetic operators of the MD-FFT can be thoroughly optimized. Table XXVI provides more specific results in terms of the percentage of complex multiplications reduction for MB and CFR++ techniques applying the proposed payload architecture. It is observed that the gain is particularly large (factor 100) for CFR++ with large DRA size. The gain is less pronounced for the MB case (factor 3.7 max).

TABLE XXVI

Proposed on-board processor architecture complex multiplications saving for MB and CFR++ techniques

| | Complex multiplications saving % | | | |
|---|---|---|---|---|
| | $D_A = 1.2m$ | | $D_A = 2.0m$ | |
| M-MIMO technique | $d_A/\lambda = 1.6$ $N_T/N_U = 5$ | $d_A/\lambda = 2.4$ $N_T/N_U = 2$ | $d_A/\lambda = 1.6$ $N_T/N_U = 5$ | $d_A/\lambda = 2.4$ $N_T/N_U = 2$ |
| MB ($S_{MB}^n = 0.2$) | 20.3 | 35.9 | 68.4 | 73.2 |
| CFR++ ($S_{MB}^n = 0.5$) | 97.5 | 97.7 | 99.0 | 99.2 |

Finally it is worth noting that FIG. 28, FIG. 29, and FIG. 30 refer to the simplified architecture for a single frequency slot. In case of use of multiple frequency slots, an equivalent number of parallel architectures (physical or logical) can work contemporarily and can be frequency multiplexed at element level.

In line with the above, the present disclosure proposes a hub station for performing wireless communications with a plurality of user terminals. An example of such hub station 100 is schematically illustrated in FIG. 31. The hub station 100 may be a satellite (satellite system) or a terrestrial base station, for example. The hub station 100 comprises an active antenna array 10 with a plurality of antenna elements 15. The active antenna array 10 may be implemented, for example, by the antenna array 10 described above in connection with FIG. 28. The hub station 100 further comprises a beamforming unit 20 that is coupled to the active antenna array 10. The beamforming unit 20 is adapted to effect, in collaboration with the active antenna array 10, emitting sets of active beams (e.g., $N_U$ active beams per set). The active beams have beam centers that are determined based on locations of the user terminals. The beamforming unit 20 may correspond to the aforementioned beamforming stage. It may implement a given beamforming matrix. Further, the beamforming unit 20 may comprise one input port for each beam that the beamforming unit 20 is capable of generating. The hub station 100 further comprises a radio resource management unit 30 for selecting, for each of a plurality of radio resource blocks, a respective subset of user terminals among the plurality of user terminals that shall be served using the radio resource block. The hub station 100 yet further comprises a beam switching unit 40 for switching between sets of active beams to enable transmission, using the respective radio resource block, of radio signals to the user terminals among the selected subset of user terminals, in those beams whose beam centers are determined based on respective locations of the user terminals among the selected subset of user terminals. To this end, the beam switching unit 40 may switchably connect input ports of the beamforming unit 20 to feed signals intended for user terminals in beams corresponding to the respective input ports of the beamforming unit 20. As such, the beam switching unit 40 may correspond to or may implement the aforementioned beam switching matrix.

In addition to the elements described above, the hub station 100 may further comprise a transmitter for transmitting radio signals to the terminals among the selected subset, in the beams whose beam centers are closest to respective locations of the terminals among the selected subset of terminals. The hub station 100 may further include a processing unit for obtaining a beamforming matrix as detailed above.

As noted above, the beamforming unit 20 may implement a given (or fixed) beamforming matrix. This fixed beamforming matrix may be a beamforming matrix for emitting a plurality of fixed beams with beam centers arranged at the vertices of a regular lattice. In some implementations, the fixed beams may be fixed equidistant beams. Further, in some implementations, the beams among the plurality of fixed beams may have a normalized beam spacing between adjacent beams that is smaller than 0.6. The beams in the sets of active beams may then be selected from the plurality of fixed beams. This may be done by the beam switching unit 40 that switchably couples or connects feed signals intended for the active beams to respective input ports of the beamforming unit 20 that correspond to said active beams. It is understood that the aforementioned input ports of the beamforming unit 20 relate to a subset of the overall number of input ports of the beamforming unit 20.

One important use case of the hub station 100 relates to a satellite (communication satellite) or satellite system. The satellite may be intended for use or used in geostationary orbit (GEO), in which case the region of interest (ROI) would correspond to the full Earth. For the hub station 100 relating to such satellite, the wavelength of the lowest transmission frequency may be in the range from 1.6 to 2.6. Additionally or alternatively, a ratio between the number of antenna elements of the active antenna array and the number of terminals in the selected subset of terminals may be equal to or below 2.5. The ratio between the number of antenna elements of the active antenna array and the number of terminals in the selected subset of terminals may be denoted by $N_T/N_U$, i.e., $N_T/N_U \leq 2.5$, where $N_U$ indicates the number of active terminals (users) in the selected subset of terminals and $N_T$ indicates the number of antenna elements. In particular, $N_T/N_U$ may be around 2 for pragmatic M-MIMO (e.g., MB M-MIMO), and around 1 for CFR M-MIMO (e.g., CFR++). Notably, these values are comparatively low compared to conventional M-MIMO applications.

VII.B. Wireless Communication Method

The above-described payload and radio resource management allow for implementing a communication method for M-MIMO line-of-sight wireless communications with high throughput at reduced system complexity. An example of such method 300 is shown in flowchart form in FIG. 32.

Elements of this method have been described throughout the disclosure, as the skilled person will appreciate.

Method 300 may be seen as a method of performing wireless communications (e.g., in the forward link) between a hub station (e.g., communication satellite, satellite gateway or ground-based/terrestrial) and a plurality of user terminals. In general, the method comprises transmitting radio signals to subsets of user terminals among the plurality of user terminals with sets of active beams (e.g., $N_U$ active beams per set). As has been explained above, the active beams have beam centers that are determined based on locations of the user terminals. Specifically, method 300 comprises steps 3010, 3020, and 3030 that are performed for each of a plurality of radio resource blocks (e.g., time slots, frequency slots, pseudo-random spreading sequences, polarization modes, or combinations thereof).

At step 3010, a subset of user terminals is selected among the plurality of user terminals. The user terminals in the selected subset (e.g., $N_U$ user terminals) are the user terminals that should be served with the same radio resource block. This may be done by employing RRM techniques, such as the techniques described in section II.G, for example.

In line with these techniques, the selection of the subset of user terminals may be based on a set of quantities indicating mutual radio interferences between pairs of user terminals among the plurality of user terminals. This set of quantities may relate to an interference matrix (e.g., matrix Q described above) whose coefficient entries indicate mutual radio interferences between pairs of user terminals among the plurality of user terminals. The quantities indicating mutual radio interferences may be efficiently determined based on mutual (estimated) distances on ground between the terminals among the plurality of terminals. Specifically, the selection may correspond to determining a radio resource mapping for mapping the plurality of user terminals to a set of radio resource blocks, based on said set of quantities (or said interference matrix), applying the constraint that each user terminal is mapped to exactly one among the set of radio resource blocks. For instance, the radio resource mapping may be determined by optimizing (e.g., minimizing) a quantity indicative of an overall level of co-channel interference between simultaneously served user terminals. If the interference matrix is considered, the radio resource mapping may be determined by minimizing a quantity (e.g., the trace) derivable from a matrix product of a transpose of the radio resource mapping matrix, the interference matrix, and the radio resource mapping matrix, still applying the constraint that each user terminal is mapped to exactly one among the set of radio resource blocks. The radio resource mapping may be represented by a radio resource mapping matrix with binary entries, for example.

At step 3020, a beam center is determined, for each user terminal among the subset of user terminals, based on a (geometric/geographical) location of the respective user terminal. This may be done by employing the techniques described in section II.C, for example. For instance, for a user position (user location) indicated by user position vector $u_i$, the corresponding beam center may be determined by using the function BEAM(i) that maps the user position to the closest beam center among a predefined plurality of (fixed) beam centers. As such, determining the beam center based on the location of a user terminal may involve determining a beam center, possibly from a predefined set of beam centers, that is closest to the location of the user terminal.

At step 3030, radio signals are transmitted to the user terminals among the selected subset of user terminals, in beams corresponding to the determined beam centers, using the respective radio resource block. Transmitting the radio signals in the beams corresponding to the determined beam centers may involve generating the beams among a set of active beams by means of beamforming using an active antenna array (e.g., a DRA) with a plurality of (independently controllable/drivable) antenna elements. When doing so, the antenna elements of the active antenna array may be driven in accordance with a mapping matrix that maps signals intended for user terminals among the selected subset of user terminals to signals for transmission by respective antenna elements. Generating the beams among the set of active beams may amount to selecting a subset of active beams (e.g., $N_U$ active beams) among a plurality of $N_B$ fixed beams. Beamforming/precoding matrices derived in line with section II.C.2 (and section II.D for normalization of the beamforming/precoding matrix) may be used as the mapping matrix, for example.

In accordance with the aforementioned sections of the present disclosure, the mapping matrix may have dimension (size) ($N_T \times N_U$) and comprise one complex coefficient entry per pair of a given user terminal and a given antenna element. Here, in line with the above, $N_T$ indicates the number of antenna elements of the active antenna array and $N_U$ indicates the number of user terminals in the selected subset of user terminals (i.e., the terminals to be served with the current radio resource block). This mapping matrix may be designed to map $N_U$ signals intended for the selected subset of user terminals to $N_T$ signals for transmission by respective antenna elements. The coefficient entries of the mapping matrix may comprise phase factors that are based on (geometric) locations of the antenna elements and the (geometric) locations of the user terminals with respect to the active antenna array. More specifically, the coefficient entries may comprise phase factors that are based on the location of the respective antenna element and an indication of that beam center that is closest to the location of the respective user terminal. The indication of the beam center may be a vector indicating the beam center, such as a lattice vector, for example.

As described in section VII.A, the mapping matrix may be obtained or obtainable using a fixed beamforming matrix and a beam switching (or beam selection matrix). The fixed beamforming matrix is a matrix of dimension ($N_T \times N_B$) and is designed to generate the $N_B$ fixed beams (e.g., defined by a regular lattice) with the array of $N_T$ antenna elements. To this end, the fixed beamforming matrix may be capable of mapping signals intended for the $N_B$ fixed beams to the $N_T$ signals for transmission by respective antenna elements. The beam switching matrix is a matrix of dimension ($N_B \times N_U$) and designed for selecting the $N_U$ beams in the subset of active beams by interconnecting each signal intended for a user terminal among the subset of user terminals to a respective input of the fixed beamforming matrix corresponding to that beam that has its beam center closest to the respective user terminal. Specifically, the mapping matrix may be obtained by cascading the beam switching matrix (or a unit implementing same) and the fixed beamforming matrix (or a unit implementing same). This will yield a mapping matrix of dimension ($N_T \times N_U$), as required for the present purpose.

Further in line with section II.C.2, the beams among the plurality of $N_B$ fixed beams may have respective beam centers arranged at the vertices of a regular lattice. In some embodiments, the normalized beam spacing of the fixed beams may be comparatively small, for example below 1. In some embodiments, the plurality of fixed beams may have a normalized beam spacing between adjacent beams that is smaller than 0.6.

Subsequent to step 3030, another (e.g., next) radio resource block is selected and the method proceeds to step S3010. It is understood that separate sequences of steps 3010, 3020, and 3030 may be performed sequentially or in parallel for different radio resource blocks, depending on requirements and/or the kind of the radio resource blocks under consideration. In any case, this may imply a switching between different sets of active beams from one radio resource block to another, in accordance with subsets of user terminals selected for respective radio resource blocks.

It is understood that method 300 may apply a frequency reuse scheme on top of the aforementioned selection of user terminals, such that pairs of adjacent beams among the plurality of fixed beams are assigned to different transmission frequencies. This frequency reuse scheme may be a three-color or four-color frequency reuse scheme, for example.

VIII. SUMMARY AND CONCLUSIONS

The present disclosure proposes a pragmatic approach to apply M-MIMO techniques to satellite broadband telecommunication systems. The resulting system throughput performances have been compared the achievable performance with the ultimate theoretical M-MIMO performance requiring complex on-board processing and cumbersome, not scalable user link channel state estimation. The proposed MB MIQDP-RRM M-MIMO design allows to approach the M-MIMO performance with affordable system and payload complexity without requiring users feedback except for a raw estimate of their geographical location. To achieve this result the following specific techniques have been developed:
- Novel RRM technique for M-MIMO to reduce co-channel interference effects;
- M-MIMO DRA optimization methodology yielding optimized DRA element spacing values;
- DRA payload optimized architecture for supporting pragmatic M-MIMO.

As an alternative to pragmatic M-MIMO, the present disclosure proposes to optimize the design of DRA while exploiting conventional frequency reuse schemes, leading to the CFR++ scheme described above. For this scenario the following solutions have been developed:
- CFR DRA optimization methodology;
- DRA payload optimized architecture for optimized CFR.

The main findings can be summarized as:
- MB MIQDP-RRM M-MIMO can get close to more complex MF and MMSE solutions with affordable payload complexity and without need for any user feedback a part of the location information.
- For the optimized DRA parameters, ZF M-MIMO is under-performing the other M-MIMO techniques.
- Optimized DRA design for CFR (leading to CFR++) can get close to pragmatic M-MIMO in terms of performance with even simpler implementation and reduced feeder link bandwidth.

In addition, evidence has been found that by improving the throughput of such a system enables the physical layer to operate in a relative low signal-to-noise plus interference region typically corresponding to QPSK modulation format. In this region the DVB-S2(X) standard is quite suboptimum compared to Shannon bound and there may be a good potential for improvement in looking at more efficient coding schemes for this "low" spectral efficiency reason. This may lead the way for future DVB-S2(X) evolution.

IX. INTERPRETATION

It is further understood that any circuitry, units, or blocks described above may be implemented by a computer processor or respective computer processors, or the like.

It should further be noted that the description and drawings merely illustrate the principles of the proposed method and system. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method and system. Furthermore, all statements herein providing principles, aspects, and embodiments of the invention, as well as specific examples thereof, are intended to encompass equivalents thereof.

APPENDIX A

DVB-S2X Efficiency Model

For computing the function $\eta_{S2X}(\mathrm{SNIR})$ introduced in section II.E.2, the DVB-S2X performance results reported in the DVB-S2X standard have been used. They are summarized in Table XXVII[1].

TABLE XXVII

DVB-S2X spectral efficiency vs SNIR

| SNIR (dB) | Spectral efficiency (bits/symbol) |
|---|---|
| −9.9 | 0.19 |
| −8.3 | 0.232222 |
| −6.1 | 0.184889 |
| −4.9 | 0.225975 |
| −3.72 | 0.333333 |
| −2.85 | 0.434841 |
| −2.35 | 0.490243 |
| −2.03 | 0.567805 |
| −1.24 | 0.656448 |
| −0.3 | 0.789412 |
| 0.22 | 0.889135 |
| 1 | 0.988858 |
| 1.45 | 1.088581 |
| 2.23 | 1.188304 |
| 3.1 | 1.322253 |
| 4.03 | 1.487473 |
| 4.68 | 1.587196 |
| 4.73 | 1.647211 |
| 5.13 | 1.713601 |
| 5.5 | 1.779991 |
| 5.97 | 1.972253 |
| 6.55 | 2.10485 |
| 6.84 | 2.193247 |
| 7.41 | 2.370043 |
| 8.1 | 2.458441 |
| 8.38 | 2.524739 |
| 8.43 | 2.635236 |
| 8.97 | 2.637201 |
| 9.27 | 2.745734 |
| 9.71 | 2.856231 |
| 10.21 | 2.966728 |
| 10.65 | 3.077225 |
| 11.03 | 3.165623 |
| 11.1 | 3.289502 |

TABLE XXVII-continued

DVB-S2X spectral efficiency vs SNIR

| SNIR (dB) | Spectral efficiency (bits/symbol) |
|---|---|
| 11.61 | 3.300184 |
| 11.75 | 3.510192 |
| 12.17 | 3.620536 |
| 12.73 | 3.703295 |
| 13.05 | 3.841226 |
| 13.64 | 3.951571 |
| 13.98 | 4.206428 |
| 14.81 | 4.338659 |
| 15.47 | 4.603122 |
| 15.87 | 4.735354 |
| 16.55 | 4.933701 |
| 16.98 | 5.06569 |
| 17.24 | 5.241514 |
| 18.1 | 5.417338 |
| 18.59 | 5.593162 |
| 18.84 | 5.768987 |
| 19.57 | 5.900855 |

APPENDIX B

Aggregated Co-Channel Interference

Let Q be a square real positive matrix of size (N×N) and C a real positive matrix of size (N×C), the scalar quantity of interest is given by $$INR_T = 1^T[Q \odot (CC^T)]1, \quad (101)$$

where the (N×1) vector 1 has all unit entries. Using Lemma 7.5.2 in R. A. Horn, C. R. Johnson, Matrix analysis, 2nd Edition, Cambridge University Press, 2012, $$x^H(A \odot B)y = tr[\text{diag}(x^*)A\,\text{diag}(y)B^T], \quad (102)$$

substituting $x=y=1$, $A=Q$, $B=CC^T$, and noting that $\text{diag}(1)=I$, and that the product $CC^T$ results in a symmetric matrix such that $(CC^T)^T = CC^T$, this yields $$1^T[Q \odot (CC^T)]1 = tr(QCC^T). \quad (103)$$

The trace operator is invariant under cyclic permutations, $tr(ABC) = tr(CAB) = tr(BCA)$ (see for example the proof of Eq. 6.299 in C. D. Cantrell, Modern Mathematical Methods for Physicists and Engineers, Cambridge University Press, 2000), this can be written as $$tr(QCC^T) = tr(C^TQC). \quad (104)$$

Making use of the vectorization of a matrix A of size (P×Q) into a column vector vec(A) of size (PQ×1) obtained by stacking the columns of the matrix A on top of each other $$\text{vec}(A) = [a(1,1), \ldots, a(P,1), \ldots, a(1,Q), \ldots, a(P,Q)]^T, \quad (105)$$

and exploiting the compatibility of the vectorization of a matrix with the Frobenius inner product $$tr[AB] = [\text{vec}(A^T)]^T \text{vec}(B), \quad (106)$$

allows to write $$tr\{C^TQC\} = \{\text{vec}[(C^TQ)^T]\}^T \text{vec}(C) = [\text{vec}(Q^TC)]^T \text{vec}(C). \quad (107)$$

Finally, due to the compatibility of vectorization with the Kronecker product, for the matrices F, G, and H of sizes (P×Q), (Q×R), and (R×S), respectively, the following identity holds true $$\text{vec}(FGH) = (H^T \otimes F)\text{vec}(G). \quad (108)$$

Substituting $F=Q^T$, $G=C$, and $H=I$, this yields $$[\text{vec}(Q^TC)]^T = [(I^T \otimes Q^T)]^T = [\text{vec}(C)]^T(I^T \otimes Q^T)^T = [\text{vec}(C)]^T(I \otimes Q), \quad (109)$$

which provides the final quadratic form $$INR_T = tr(C^TQC) = [\text{vec}(C)]^T(I \otimes Q)\text{vec}(C). \quad (110)$$

APPENDIX C

Efficient Evaluation of ZF and MMSE Precoding Matrices

The evaluation of ZF (see Equation (36)) or MMSE (see Equation (37)) precoding matrices is a computationally expensive operation which depends on the well-conditioning of the channel matrix H and on its size ($N_U \times N_T$). A dominant element in both Equations (36) and (37) is the inversion of the Gram matrix $H^HH$ or its diagonal regularization ($H^HH + \lambda I$), respectively. Both matrices have size ($N_T \times N_T$). Furthermore, considering that for M-MIMO $N_T > N_U$, the Gram matrix $H^HH$ is not invertible and the Moore-Penrose pseudo inverse must be used, which generalizes matrix inversion to non-square and ill-conditioned matrices. The uniqueness of the Moore-Penrose pseudo inverse guarantees that whenever either the left pseudo inverse $(H^HH)^{-1}H^H$ or the right pseudo inverse $H^H(HH^H)^{-1}$ exist, it coincides with the unique Moore-Penrose pseudo inverse of H. At this point it should be noted that while the computational cost of evaluating the two Gram matrices $H^HH$ and $HH^H$ is the same, the second form exhibits a reduced size ($N_U \times N_U$) and it is invertible in case the channel matrix H is full rank. Since the computational cost of matrix inversion is roughly proportional to the third power of the size N of the matrix to invert, $o(N^3)$, the right pseudo inverse offers substantial computational advantage for the evaluation of the zero forcing precoding matrix $$U_{ZF} = H^H(HH^H)^{-1}. \quad (111)$$

It may now be asked whether the MMSE precoder of Equation (37) could be obtained in a similarly efficient form as regularization of the right pseudo inverse of Equation (111). In the following it is demonstrated that this question has a positive answer and that the MMSE precoder can indeed be expressed as $$U_{MMSE} = H^H(HH^H + \lambda I)^{-1}, \quad (112)$$

where the regularization constants λ of Equations (37) and (112) are identical.

To prove this result it can be started from the form $H^HHH^H + \lambda H^H$. Left- or right-factorizing the matrix $H^H$ yields $$H^HHH^H + \lambda H^H = H^H(HH^H + \lambda I) = (H^HH + \lambda I)H^H. \quad (113)$$

The eigenvalues of the two Gram matrices $H^HH$ and $HH^H$ coincide and are ≥0. If λ>0, both $(HH^H + \lambda I)$ and $(H^HH + \lambda I)$ are invertible and Equation (113) can be manipulated by left- and right-multiplication by the two inverses $$(H^HH + \lambda I)^{-1}H^H(HH^H + \lambda I)(HH^H + \lambda I)^{-1} = (H^HH + \lambda I)^{-1}(H^HH + \lambda I)H^H(HH^H + \lambda I)^{-1}, \quad (114)$$

which can be simplified as $$(H^HH + \lambda I)^{-1}H^H = H^H(HH^H + \lambda I)^{-1}. \quad (115)$$

Equation (115) demonstrate the equivalence of Equation (37) and Equation (112), as well as the superior complexity efficiency of the latter form $o(N_U^3)$ with respect to the first, $o(N_T^3)$.

The invention claimed is:

1. A method of performing wireless communications between a hub station and a plurality of user terminals, the method comprising:
   transmitting radio signals to subsets of user terminals among the plurality of user terminals with sets of active beams, wherein the active beams have beam centers that are determined based on locations of the user terminals,
   wherein the method further comprises, for each of a plurality of radio resource blocks:
   selecting a subset of user terminals among the plurality of user terminals;
   for each user terminal among the subset of user terminals, determining a beam center based on a location of the respective user terminal; and
   transmitting, using the respective radio resource block, radio signals to the user terminals among the selected subset of user terminals, in beams corresponding to the determined beam centers.

2. The method according to claim 1, further comprising:
   switching between different sets of active beams from one radio resource block to another, in accordance with subsets of user terminals selected for respective radio resource blocks.

3. The method according to claim 1, further comprising:
   generating the beams among a set of active beams by means of beamforming using an active antenna array, wherein the active antenna array comprises a plurality of antenna elements; and
   wherein the antenna elements of the active antenna array are driven in accordance with a mapping matrix that maps signals intended for user terminals among the selected subset of user terminals to signals for transmission by respective antenna elements.

4. The method according to claim 3,
   wherein the mapping matrix for mapping the signals intended for the selected subset of user terminals to the signals for transmission by respective antenna elements has dimension $N_T \times N_U$ and comprises one complex coefficient entry per pair of a given user terminal and a given antenna element, where $N_T$ indicates a number of antenna elements and $N_U$ indicates a number of user terminals in the selected subset of user terminals; and
   wherein the coefficient entries of the mapping matrix comprise phase factors that are based on locations of the antenna elements and the locations of the user terminals with respect to the hub station.

5. The method according to claim 3,
   wherein the mapping matrix for mapping the signals intended for the selected subset of user terminals to the signals for transmission by respective antenna elements has dimension $N_T \times N_U$, where $N_T$ indicates a number of antenna elements and $N_U$ indicates a number of user terminals in the selected subset of user terminals, so that $N_U$ signals intended for the selected subset of user terminals are mapped to $N_T$ signals for transmission by respective antenna elements;
   wherein generating the beams among the set of active beams involves selecting a subsets of active beams among a plurality of $N_B$ fixed beams, each beam having a respective beam center, where $N_B$ indicates a number of fixed beams; and
   wherein coefficient entries of the mapping matrix of dimension $N_T \times N_U$ comprise phase factors that are based on a location of the respective antenna element and an indication of that beam center that is closest to the location of the respective user terminal.

6. The method according to claim 5,
   wherein the beams among the plurality of fixed beams have respective beam centers arranged at vertices of a regular lattice; and
   wherein the plurality of fixed beams have a normalized beam spacing between adjacent beams that is typically smaller than 0.6.

7. The method according to claim 5, further comprising:
   selecting the subset of active beams by selecting a respective one among the plurality of $N_B$ beams for each of the user terminals among the subset of user terminals, based on the locations of the user terminals among the subset of user terminals,
   wherein the mapping matrix of dimension $N_T \times N_U$ is a beamforming matrix that is obtainable based on:
   a fixed beamforming matrix of dimension $N_T \times N_B$ for generating the $N_B$ fixed beams with the array of $N_T$ antenna elements, by mapping signals intended for the $N_B$ fixed beams to the signals for transmission by respective antenna elements; and
   a beam switching matrix of dimension $N_B \times N_U$ for selecting the beams in the subset of active beams by interconnecting each signal intended for a user terminal among the subset of user terminals to a respective input of the fixed beamforming matrix corresponding to that beam that has its beam center closest to the respective user terminal.

8. The method according to claim 7,
   wherein the fixed beamforming matrix is implemented by one of an oversized Butler matrix circuit, a discrete lens array, an oversized Fast Fourier Transform circuit, or a combination thereof.

9. The method according to claim 1, wherein selecting the subset of user terminals comprises:
   obtaining a set of quantities indicating mutual radio interferences between pairs of user terminals among the plurality of user terminals; and
   determining a radio resource mapping for mapping the plurality of user terminals to a set of radio resource blocks, based on said set of quantities, applying constraint that each user terminal is mapped to exactly one among the set of radio resource blocks.

10. The method according to claim 1, wherein selecting the subset of user terminals comprises:
    obtaining an interference matrix that indicates mutual radio interferences between pairs of user terminals among the plurality of user terminals; and
    determining a radio resource mapping matrix that maps the plurality of user terminals to a set of radio resource blocks, by minimizing a quantity derivable from a matrix product of a transpose of the radio resource mapping matrix, the interference matrix, and the radio resource mapping matrix, applying constraint that each user terminal is mapped to exactly one among the set of radio resource blocks.

11. The method according to claim 10, further comprising:
    determining the interference matrix based on mutual distances on ground between the user terminals among the plurality of terminals.

12. The method according to claim 10, wherein the selected subset of user terminals for a given radio resource block comprises those user terminals that are mapped to the given radio resource block by the determined radio resource mapping matrix.

13. The method according to claim 1, wherein the radio resource blocks are time slots, frequency slots, pseudo-random spreading sequences, polarization modes, or combinations thereof; and/or
wherein a size of the radio resource blocks is spatially non-uniform and depends, assuming that a region of interest of the hub station is subdivided into a plurality of areas, on spatial densities of user terminals in respective areas.

14. The method according to claim 5, further comprising:
applying a frequency reuse scheme, such that pairs of adjacent beams among the plurality of fixed beams are assigned to different transmission frequencies.

15. A hub station for performing wireless communications with a plurality of user terminals, the hub station comprising:
an active antenna array with a plurality of antenna elements;
a beamforming unit that is coupled to the active antenna array, for emitting sets of active beams, wherein the active beams have beam centers that are determined based on locations of the user terminals;
a radio resource management unit for selecting, for each of a plurality of radio resource blocks, a respective subset of user terminals among the plurality of user terminals that shall be served using the radio resource block; and
a beam switching unit for switching between sets of active beams to enable transmission, using the respective radio resource block, of radio signals to the user terminals among the selected subset of user terminals, in those beams whose beam centers are determined based on respective locations of the user terminals among the selected subset of user terminals.

16. The hub station of claim 15,
wherein the beamforming unit implements a fixed beamforming matrix for emitting a plurality of fixed beams with beam centers arranged at vertices of a regular lattice, with the beams among the plurality of fixed beams having a normalized beam spacing between adjacent beams that is smaller than 0.6; and
wherein the beams in the sets of active beams are selected from the plurality of fixed beams.

17. The hub station of claim 15,
wherein the hub station is a satellite; and
wherein a ratio between spacing of the antenna elements of the active antenna array and a wavelength of a lowest transmission frequency is in a range from 1.6 to 2.6 and/or a ratio between number of antenna elements of the active antenna array and a number of terminals in the selected subset of terminals is equal to or below 2.5.

18. A method of determining antenna parameters and a beam pattern for a hub station comprising an active antenna array with a plurality of antenna elements and performing wireless communications with a plurality of user terminals,
wherein the hub station is intended to transmit radio signals in subsets of beams among a plurality of fixed equidistant beams with a beam pattern in which beam centers are arranged at vertices of a regular lattice, and is further intended, for each of a plurality of radio resource blocks, to:
select a subset of user terminals among the plurality of user terminals;
for each user terminal among the selected subset of user terminals, determine a beam center that is closest to a location of the respective user terminal; and
transmit radio signals to the user terminals among the selected subset of user terminals, in the beams corresponding to the determined beam centers,
the method comprising:
setting a ratio between a number of the plurality of antenna elements and a number of user terminals in the selected subset of user terminals to a predefined initial value for the ratio;
setting a normalized beam spacing of the beam pattern to an initial value for the normalized beam spacing;
assuming a given set of RF transmission parameters, determining throughput for a plurality of antenna element spacings between adjacent ones among the plurality of antenna elements for the set ratio and set normalized beam spacing, the antenna element spacings being selected from a predefined range of antenna elements spacings, and selecting an antenna element spacing from the predefined range of antenna element spacings that results in a largest throughput;
determining an optimized value of the ratio between the number of the plurality of antenna elements and the number of user terminals in the selected subset of user terminals that maximizes throughput for the set normalized beam spacing, wherein the optimized value of the ratio is chosen from a predefined range that includes the initial value of the ratio; and
determining an optimized value of the normalized beam spacing that maximizes throughput for the optimized ratio, wherein the optimized value of the normalized beam spacing is chosen from a predefined range that includes the initial value of the normalized beam spacing.

* * * * *